(12) United States Patent
Sato et al.

(10) Patent No.: US 7,688,363 B2
(45) Date of Patent: Mar. 30, 2010

(54) SUPER-RESOLUTION DEVICE, SUPER-RESOLUTION METHOD, SUPER-RESOLUTION PROGRAM, AND SUPER-RESOLUTION SYSTEM

(75) Inventors: Satoshi Sato, Osaka (JP); Katsuhiro Kanamori, Nara (JP); Hideto Motomura, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/080,230

(22) Filed: Mar. 31, 2008

(65) Prior Publication Data

US 2008/0186390 A1    Aug. 7, 2008

Related U.S. Application Data

(63) Continuation of application No. PCT/JP2007/060829, filed on May 28, 2007.

(30) Foreign Application Priority Data

May 29, 2006    (JP) ............................. 2006-147756

(51) Int. Cl.
H04N 5/262    (2006.01)
G06K 9/32    (2006.01)

(52) U.S. Cl. .................... 348/240.2; 382/299

(58) Field of Classification Search ............... None
See application file for complete search history.

(56) References Cited

U.S. PATENT DOCUMENTS 5,028,138 A    7/1991 Wolff

| | | |
|---|---|---|
| 5,717,789 A | 2/1998 | Anderson et al. |
| 7,319,467 B2 * | 1/2008 | Weyrich et al. ............. 345/426 |
| 7,340,098 B2 * | 3/2008 | Motomura et al. .......... 382/190 |
| 7,379,618 B2 * | 5/2008 | Motomura et al. .......... 382/274 |
| 7,486,837 B2 * | 2/2009 | Motomura et al. .......... 382/274 |

FOREIGN PATENT DOCUMENTS

| JP | 63-219281 A | 9/1988 |
|---|---|---|
| JP | 4-48879 A | 2/1992 |
| JP | 05-167993 | 7/1993 |

(Continued)

OTHER PUBLICATIONS

Nakashizuka, Makoto, et al., "Image Resolution Enhancement on Multiscale Gradient Planes", Journal of the Insititue of Electronics, Information and Communication Engineers, D-II vol. J81-D-II, No. 10, pp. 2249-2258, Oct. 1998.

(Continued)

*Primary Examiner*—Justin P Misleh
(74) *Attorney, Agent, or Firm*—Harness, Dickey & Pierce, P.L.C.

(57) ABSTRACT

An albedo estimating section produces an albedo image of an object from an original image captured by an image-capturing section by using light source information estimated by a light source information estimating section and shape information of the object obtained by a shape information obtaining section. An albedo super-resolution section performs super-resolution of the albedo image according to a conversion rule obtained from an albedo DB. A super-resolution section produces a high-resolution image obtained by performing super-resolution of the original image by using the super-resolution albedo image, the light source information and the shape information.

14 Claims, 47 Drawing Sheets

FOREIGN PATENT DOCUMENTS

| | | |
|---|---|---|
| JP | 05-342368 | 12/1993 |
| JP | 10-079029 | 3/1998 |
| JP | 10-302059 | 11/1998 |
| JP | 11-004413 | 1/1999 |
| JP | 2002-024818 | 1/2002 |
| JP | 3278881 | 2/2002 |
| JP | 2002-133446 | 5/2002 |
| JP | 2002-208029 | 7/2002 |
| JP | 2003-018398 | 1/2003 |
| JP | 2003-085531 | 3/2003 |
| JP | 3459981 B2 | 10/2003 |
| JP | 2005-346348 | 12/2005 |
| WO | WO 2006/033257 | 3/2006 |

OTHER PUBLICATIONS

Ishii, Yasunori; Fukui, Koutaro; Mukaigawa, Yasuhiro; Shakunaga, Takeshi, "Photmetric Linearization Based on Classification of Photometric Factors", Journal of Information Processing Society of Japan, vol. 44, No. SIG5 (CVIM6), pp. 11-21, 2003.

Kanbara, Masayuki; Yokoya, Naokazu, "Geometric and Photometric Registration For Vision-Based Augmented Reality", Technical Report of the Institute of Electronics, Information and Communication Engineers, Pattern Recognition and Media Understanding, PRMU2002-190, pp. 7-12, 2003.

Hayakawa, H., "Photometric Stereo Under A Light Source With Arbitrary Motion", Journal of the Optical Society of America A, vol. II, pp. 3079-3089, 1994.

Ikeuchi, K. and Sato, K., "Determining Reflectance Properties Of An Object Using Range And Brightness Images", IEEE Transactions on Pattern Analysis and Machine Intelligence, vol. 13, No. 11, pp. 1139-1153, 1991.

Nishino, K. and Nayar, S. K., "The World In An Eye", in Proc. of Computer Vision and Pattern Recognition CVPR '04, vol. I, pp. 444-451, Jul. 2004.

Tsai, Roger Y., "An Efficient and Accurate Camera Calibration Technique For 3D Machine Vision", Proceedings of IEEE Conference on Computer Vision and Pattern Recognition, Miami Beach, FL, 1986, pp. 364-374.

Longuet-Higgins, H. C., "A Computer Algorithm For Reconstructing A Scene From Two Projections", Nature, vol. 293, pp. 133-135, 1981.

Tomasi, Carlo and Kanade, Takeo, "Detection and Tracking of Point Features", Carnegie Mellon University Technical Report, CMU-CS-91-132, Apr. 1991.

Shinji Araya, "Clear Commentary on 3D Computer Graphics", Kyoritsu Shuppan Co., Ltd., pp. 144-146. Sep. 25, 2003.

Daisuke Miyazaki, Katsushi Ikeuchi, "A Method to Estimate Surface Shape of Transparent Objects by Using Polarization Raytracing Method", Journal of the Institute of Electronics, Information and Communication Engineers, vol. J88-D-II, No. 8, pp. 1432-1439, 2005.

Noboru Ota, "Basics of Color Reproduction Optics", pp. 90-92, Corona Publishing Co., Ltd.

Hiroki Unnten, Katsushi Ikeuchi, "Texuring 3D Geometric Model for Virtulization of Real-World Object", CVIM-149-34, pp. 301-315, 2005.

Takayuki Okatani, "3D Shape Recovery by Fusion of Mechanical and Image Sensors", Journal of Information Processing Society of Japan, 2005-CVIM-147, pp. 123-130, 2005.

Toshio Uchiyama, et al., "Capture of natural illumination environments and spectral-based image synthesis", Technical Report of the Institute of Electronics, Information and Communication Engineers, PRMU2005-138, pp. 7-12, 2006.

* cited by examiner

Input image

Diffuse reflection image

Specular reflection image

Original image

Conventional method

Using albedo

Conventional method

Using albedo

| Time | Angle sensor output | Focal distance | Light source image |
|---|---|---|---|
| $t_1$ | $(\alpha_1, \beta_1, \gamma_1)$ | $f_1$ | Image 1 |
| ⋮ | ⋮ | ⋮ | ⋮ |

(x, y, z):Coordinate system before rotation
(x_new, y_new, z_new):Coordinate system after rotation

FIG.48

|  | Touch sensor 1004B ON | Touch sensor 1004B OFF |
|---|---|---|
| Touch sensor 1004A ON | — | $\theta \geqq \theta_1$<br>Downward |
| Touch sensor 1004A OFF | $\theta \leqq -\theta_2$<br>Upward | $-\theta_2 < \theta < \theta_1$<br>Horizontal |

SUPER-RESOLUTION DEVICE, SUPER-RESOLUTION METHOD, SUPER-RESOLUTION PROGRAM, AND SUPER-RESOLUTION SYSTEM

CROSS REFERENCE TO RELATED APPLICATIONS

This is a continuation of Application PCT/JP2007/060829 filed on May 28, 2007 which claims priority under 35 U.S.C. §119(a) on Patent Application No. 2006-147756 filed in Japan on May 29, 2006, the entire contents of which are hereby incorporated by reference.

BACKGROUND OF THE INVENTION

1. Technical Field

The present invention relates to an image processing technique, and more particularly to a technique for performing a super-resolution process.

2. Background Art

The importance of image processing is increasing as the camera-equipped mobile telephones and digital cameras become widespread. One of such image processes is a super-resolution process, also known as "digital zooming". The super-resolution process is used for arbitrarily enlarging a captured image, and is important in the editing process performed after capturing images.

Various methods have been proposed for the super-resolution process. As ordinary methods, there are methods using interpolation such as, for example, the bilinear method (linear interpolation process) or the bicubic method (Non-Patent Document 1). With interpolation, however, the process can only produce intermediate values of sampled data. Therefore, when synthesizing an image enlarged by a factor of 2×2 or more, the sharpness of the edge, and the like, is likely to deteriorate, resulting in a blurred image. In view of this, there is proposed a method that uses an interpolated image as an initial enlarged image, and then extracts edge portions so as to enhance only the edges (Patent Document 1, Non-Patent Document 2). With this method, however, it is difficult to differentiate between an edge portion and noise, and the process is likely to also enhance noise as it enhances the edge portions, thus leading to a deterioration in the image quality.

In view of this, there is proposed a method that uses a database as a method for enlarging an image while suppressing the image quality deterioration. Specifically, the process captures a high-resolution image in advance by using a high-definition camera, or the like, and also obtains a low-resolution image of the same object under the same environment as the captured high-resolution image. The low-resolution image may be obtained by, for example, using another camera, capturing the high-resolution image with a zoom lens and then changing the zoom factor, and sub-sampling the high-definition image through a low-pass filter. Many such pairs of low-resolution images and high-resolution images are prepared, and the relationship therebetween is learned in a database as a super-resolution method. The super-resolution process is realized by using the database.

Such a method using a database does not require an enhancement process as described above, and is therefore capable of realizing a super-resolution with less image quality deterioration. For example, as such a process, a method in which an image is divided into blocks and the blocks of image are learned is known in the art (for example, Patent Document 2).

Patent Document 1: U.S. Pat. No. 5,717,789 (FIG. 5)
Patent Document 2: Japanese Patent No. 3278881
Non-Patent Document 1: Shinji Araya, "Meikai 3-Jigen Computer Graphics (3D Computer Graphics Elucidated)", Kyoritsu Shuppan Co., Ltd., pp. 144-146, Sep. 25, 2003
Non-Patent Document 2: Makoto Nakashizuka, et al., "Image Resolution Enhancement On Multiscale Gradient Planes", Journal of the Institute of Electronics, Information and Communication Engineers D-II Vol. J81-D-II, No. 10, pp. 2249-2258, October 1998

BRIEF SUMMARY OF THE INVENTION

Problems to be Solved by the Invention

However, super-resolution processes using a database have a problem as follows. That is, if the light source environment at the time of learning the database and that at the time of image capturing are different from each other, the image quality of the super-resolution image is not always guaranteed, and there may be an image quality deterioration.

In view of the problem set forth above, an object of the present invention is to provide a super-resolution process using a database, capable of realizing a super-resolution process without leading to an image quality deterioration even with an input image whose light source environment is different from that when the database is produced.

Means for Solving the Problems

The present invention realizes a super-resolution process using a database by using an albedo image or a pseudo-albedo image. Albedo means reflectance, and an albedo image refers to an image representing the reflectance characteristics that are inherent to the object and are not dependent on optical phenomena such as specular reflection of light and shading. Moreover, a pseudo-albedo image refers to an image obtained by normalizing an albedo image by a predetermined value such as, for example, the maximum luminance value of the specular reflection image.

An albedo or pseudo-albedo image of an object can be produced from an original image captured by using the light source information and the shape information of the object. Moreover, a database storing a conversion rule for the super-resolution process for an albedo or pseudo-albedo image is prepared in advance, and the resolution of the albedo or pseudo-albedo image of the object is increased by using the database. Then, a high-resolution image obtained by performing super-resolution of the original image is produced from the super-resolution albedo or pseudo-albedo image by using the light source information and the shape information of the object.

Effects of the Invention

According to the present invention, there is provided a super-resolution process using a database, in which a super-resolution process is performed by using an albedo or pseudo-albedo image of the object. An albedo or pseudo-albedo image is an image representing reflectance characteristics that are inherent to the object and does not include components related to the light source environment. Therefore, even if the light source environment at the time of learning the database and that at the time of image capturing are different from each other, the image quality does not deteriorate in the super-resolution process. Therefore, according to the present invention, it is possible to appropriately realize a super-resolution process even when receiving an input image under a light source environment that is not taken into consideration during the database production.

BRIEF DESCRIPTION OF THE SEVERAL VIEWS OF THE DRAWING

FIG. 48 is a diagram showing the relationship between the optical axis direction and the ON/OFF state of the touch sensors.

DETAILED DESCRIPTION OF THE INVENTION

Figure 1:
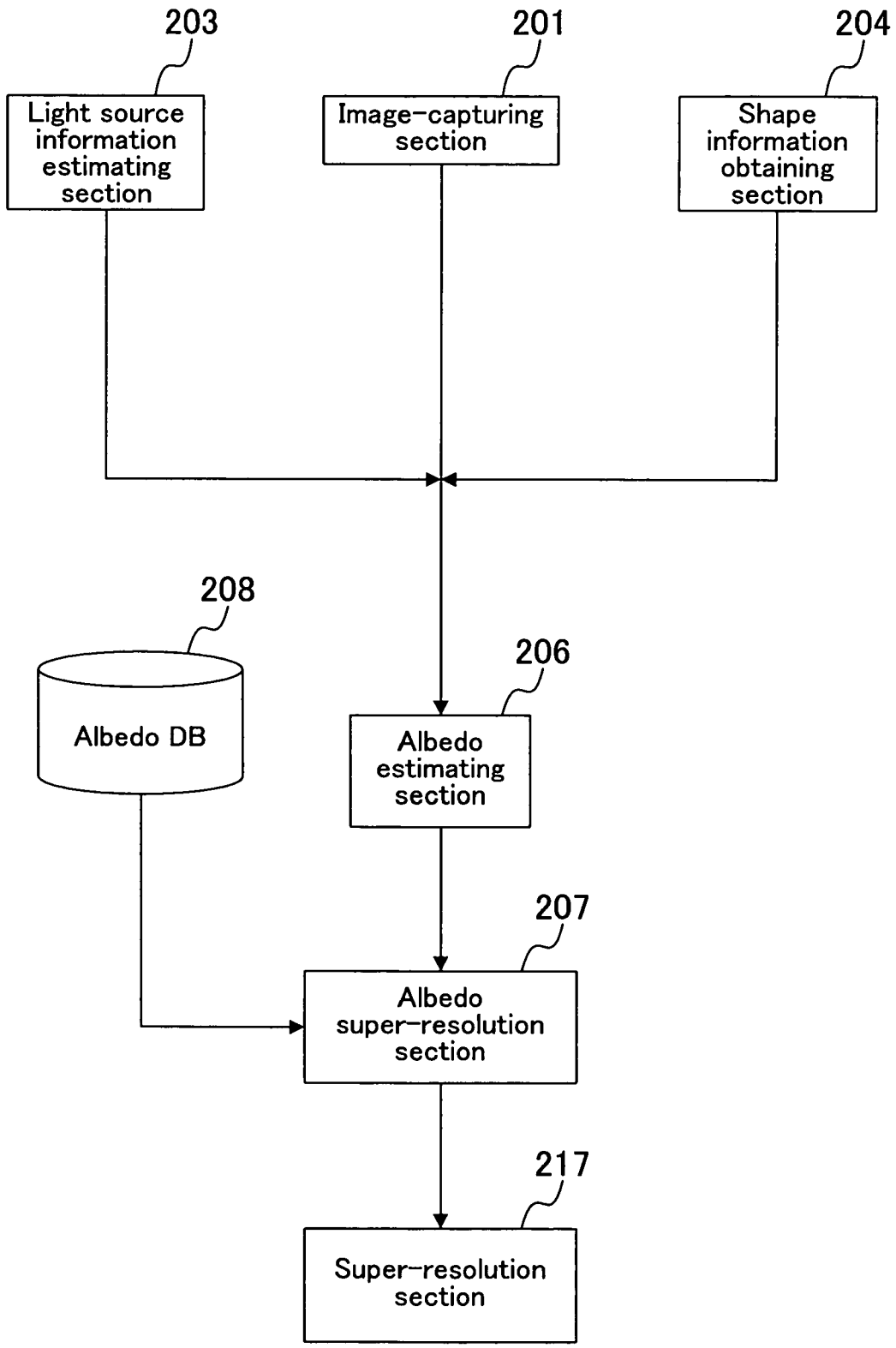
FIG. 1 is a block diagram showing a configuration of a super-resolution device according to a first embodiment of the present invention.

A first aspect of the present invention provides a super-resolution device, including: an image-capturing section for imaging an object by an imaging device; a light source information estimating section for estimating light source information including at least one of an illuminance, a direction and a position of a light source illuminating the object; a shape information obtaining section for obtaining, as shape information, surface normal information or three-dimensional position information of the object; an albedo estimating section for producing an albedo image of the object from an original image captured by the image-capturing section by using the light source information and the shape information; an albedo database storing a conversion rule for converting a low-resolution albedo image to a high-resolution albedo image; an albedo super-resolution section for obtaining the conversion rule from the albedo database to perform super-resolution of the albedo image produced by the albedo estimating section according to the conversion rule; and a super-resolution section for producing a high-resolution image resolution-increased from the original image by using the high-resolution albedo image obtained by the albedo super-resolution section, the light source information and the shape information.

A second aspect of the present invention provides the super-resolution device of the first aspect, including a diffuse reflection/specular reflection separating section for separating the original image into a diffuse reflection image and a specular reflection image, wherein the albedo estimating section produces an albedo image from the diffuse reflection image separated by the diffuse reflection/specular reflection separating section, instead of the original image.

A third aspect of the present invention provides the super-resolution device of the first aspect, including a diffuse reflection/specular reflection separating section for separating the original image into a diffuse reflection image and a specular reflection image, wherein: the image-capturing section obtains a polarization state of the object; and the diffuse reflection/specular reflection separating section performs the separation by using the polarization state obtained by the image-capturing section.

A fourth aspect of the present invention provides the super-resolution device of the first aspect, wherein the conversion rule stored in the albedo database is obtained by a learning process using an albedo image having the same resolution as the original image and an albedo image having a higher resolution than the original image.

A fifth aspect of the present invention provides the super-resolution device of the first aspect, including a super-resolution determination section for estimating a reliability of a super-resolution process according to the conversion rule stored in the albedo database for an albedo image produced by the albedo estimating section, wherein when the reliability is evaluated to be low by the super-resolution determination section, the albedo super-resolution section performs super-resolution of the albedo image without using the conversion rule stored in the albedo database.

A sixth aspect of the present invention provides a super-resolution device, including: an image-capturing section for imaging an object by an imaging device; a light source information estimating section for estimating light source information including at least one of a direction and a position of a light source illuminating the object; a shape information obtaining section for obtaining, as shape information, surface normal information or three-dimensional position information of the object; an albedo estimating section for producing a pseudo-albedo image of the object from an original image captured by the image-capturing section by using the light source information and the shape information; an albedo database storing a conversion rule for converting a low-resolution pseudo-albedo image to a high-resolution pseudo-albedo image; an albedo super-resolution section for obtaining the conversion rule from the albedo database to perform super-resolution of the pseudo-albedo image produced by the albedo estimating section according to the conversion rule; and a super-resolution section for producing a high-resolution image resolution-increased from the original image by using the high-resolution pseudo-albedo image obtained by the albedo super-resolution section, the light source information and the shape information.

A seventh aspect of the present invention provides the super-resolution device of the sixth aspect, including a diffuse reflection/specular reflection separating section for separating the original image into a diffuse reflection image and a specular reflection image, wherein the albedo estimating section produces a pseudo-albedo image from the diffuse reflection image separated by the diffuse reflection/specular reflection separating section, instead of the original image.

An eighth aspect of the present invention provides the super-resolution device of the sixth aspect, including a diffuse reflection/specular reflection separating section for separating the original image into a diffuse reflection image and a specular reflection image, wherein: the image-capturing section obtains a polarization state of the object; and the diffuse reflection/specular reflection separating section performs the separation by using the polarization state obtained by the image-capturing section.

A ninth aspect of the present invention provides the super-resolution device of the sixth aspect, wherein the conversion rule stored in the albedo database is obtained by a learning process using a pseudo-albedo image having the same resolution as the original image and a pseudo-albedo image having a higher resolution than the original image.

A tenth aspect of the present invention provides the super-resolution device of the sixth aspect, including a super-resolution determination section for estimating a reliability of a super-resolution process according to the conversion rule stored in the albedo database for a pseudo-albedo image produced by the albedo estimating section, wherein when the reliability is evaluated to be low by the super-resolution determination section, the albedo super-resolution section increases the resolution of the pseudo-albedo image without using the conversion rule stored in the albedo database.

An eleventh aspect of the present invention provides the super-resolution device of the first or sixth aspect, including a diffuse reflection/specular reflection separating section for separating the original image into a diffuse reflection image and a specular reflection image, wherein: the super-resolution section performs a super-resolution of the specular reflection image separated by the diffuse reflection/specular reflection separating section; and the super-resolution section produces the high-resolution image by using the super-resolution specular reflection image.

A twelfth aspect of the present invention provides the super-resolution device of the eleventh aspect, wherein the image resolution increasing section increases the resolution of the specular reflection image by using a process of increasing a density of the shape information.

A thirteenth aspect of the present invention provides a super-resolution method, including: a first step of obtaining an original image by imaging an object; a second step of estimating light source information including at least one of an illuminance, a direction and a position of a light source illuminating the object; a third step of obtaining, as shape information, surface normal information or three-dimensional position information of the object; a fourth step of producing an albedo image of the object from the original image by using the light source information and the shape information; a fifth step of obtaining a conversion rule from an albedo database storing a conversion rule for converting a low-resolution albedo image to a high-resolution albedo image to perform a super-resolution of the albedo image according to the conversion rule; and a sixth step of producing a high-resolution image resolution-increased from the original image by using the high-resolution albedo image obtained in the fifth step, the light source information and the shape information.

A fourteenth aspect of the present invention provides a super-resolution program for instructing a computer to perform: a first step of producing an albedo image of an object from an original image obtained by imaging the object by using light source information including at least one of an illuminance, a direction and a position of a light source illuminating the object, and shape information being surface normal information or three-dimensional position information of the object; a second step of obtaining a conversion rule from an albedo database storing a conversion rule for converting a low-resolution albedo image to a high-resolution albedo image to increase a resolution of the albedo image according to the conversion rule; and a third step of producing a high-resolution image resolution-increased from the original image by using the high-resolution albedo image obtained in the second step, the light source information and the shape information.

A fifteenth aspect of the present invention provides a super-resolution system for increasing a resolution of an image, including a communication terminal and a server, wherein: the communication terminal includes: an image-capturing section for imaging an object by an imaging device; a light source information estimating section for estimating light source information including at least one of an illuminance, a direction and a position of a light source illuminating the object; and a shape information obtaining section for obtaining, as shape information, surface normal information or three-dimensional position information of the object; the communication terminal transmits an original image captured by the image-capturing section, the light source information estimated by the light source information estimating section, and the shape information obtained by the shape information obtaining section; the server receives the original image, the light source information and the shape information transmitted from the communication terminal; and the server includes: an albedo estimating section for producing an albedo image of the object from the original image by using the light source information and the shape information; an albedo database storing a conversion rule for converting a low-resolution albedo image to a high-resolution albedo image; an albedo super-resolution section for obtaining the conversion rule from the albedo database to perform a super-resolution of the albedo image produced by the albedo estimating section according to the conversion rule; and a super-resolution section for producing a high-resolution image resolution-increased from the original image by using the high-resolution albedo image obtained by the albedo super-resolution section, the light source information and the shape information.

Embodiments of the present invention will now be described with reference to the drawings.

First Embodiment

Figure 2:
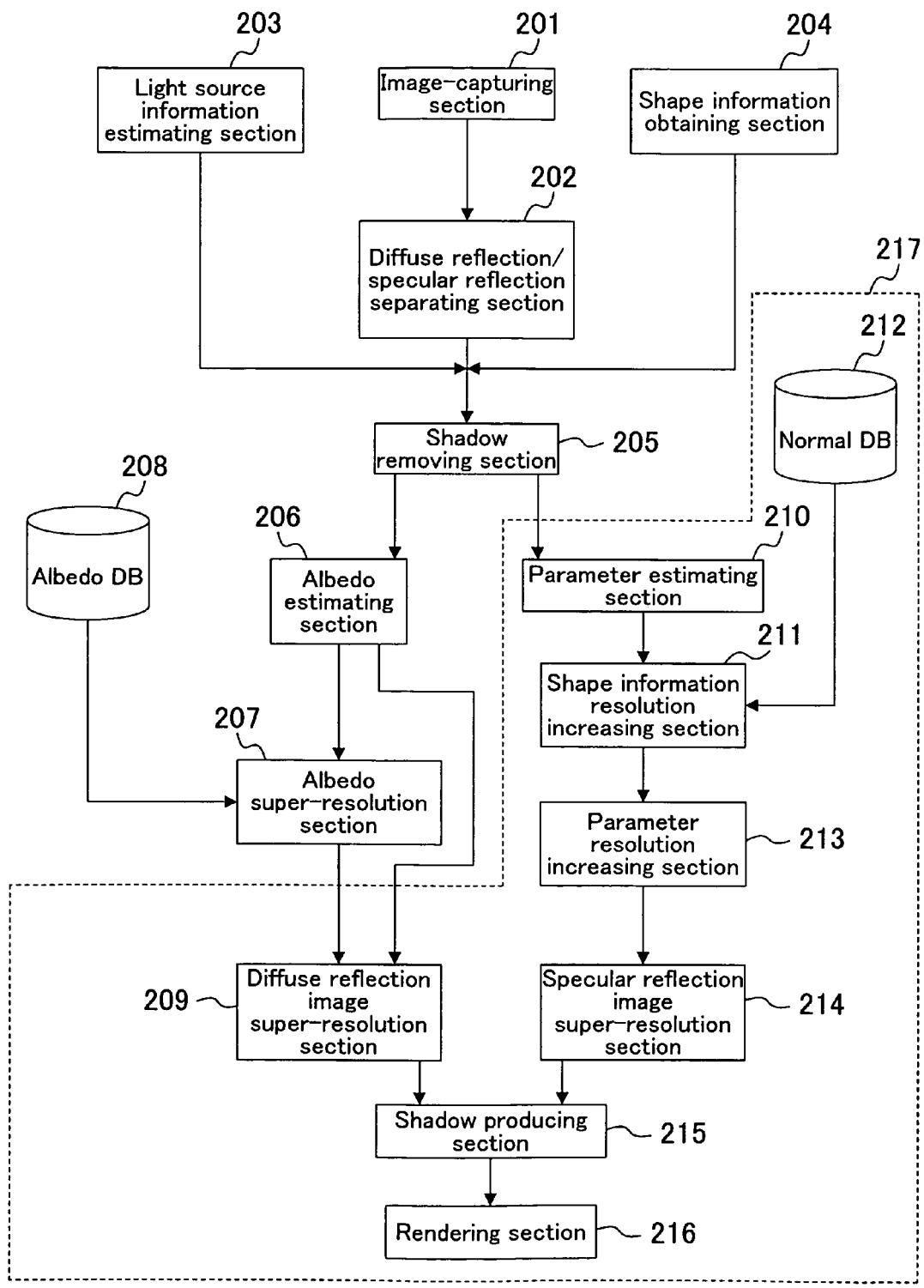
FIG. 2 is a block diagram showing a configuration of a super-resolution device according to the first embodiment of the present invention.
Figure 3:
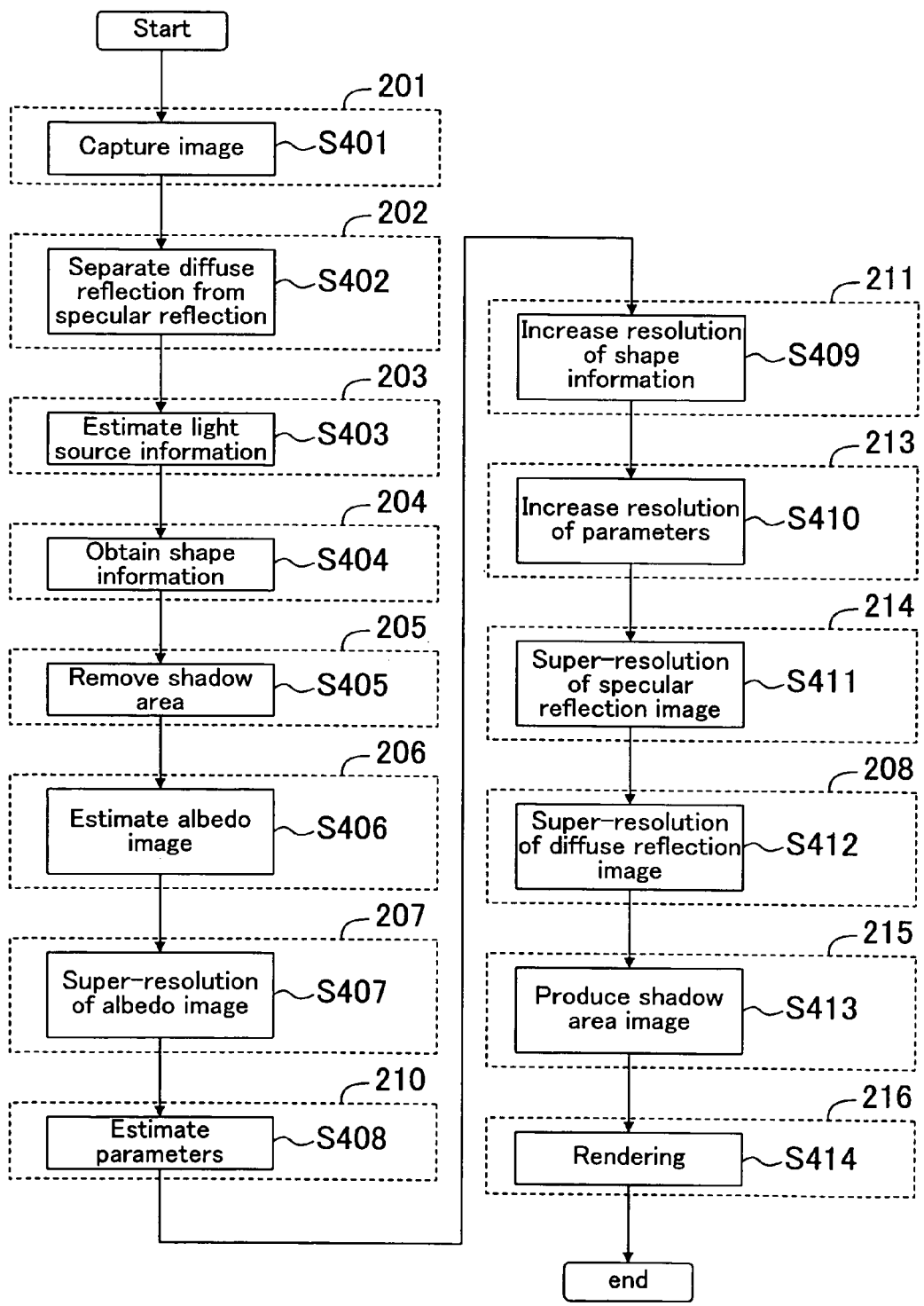
FIG. 3 is a flow chart showing the flow of the process of a super-resolution method according to the first embodiment of the present invention.
Figure 4:
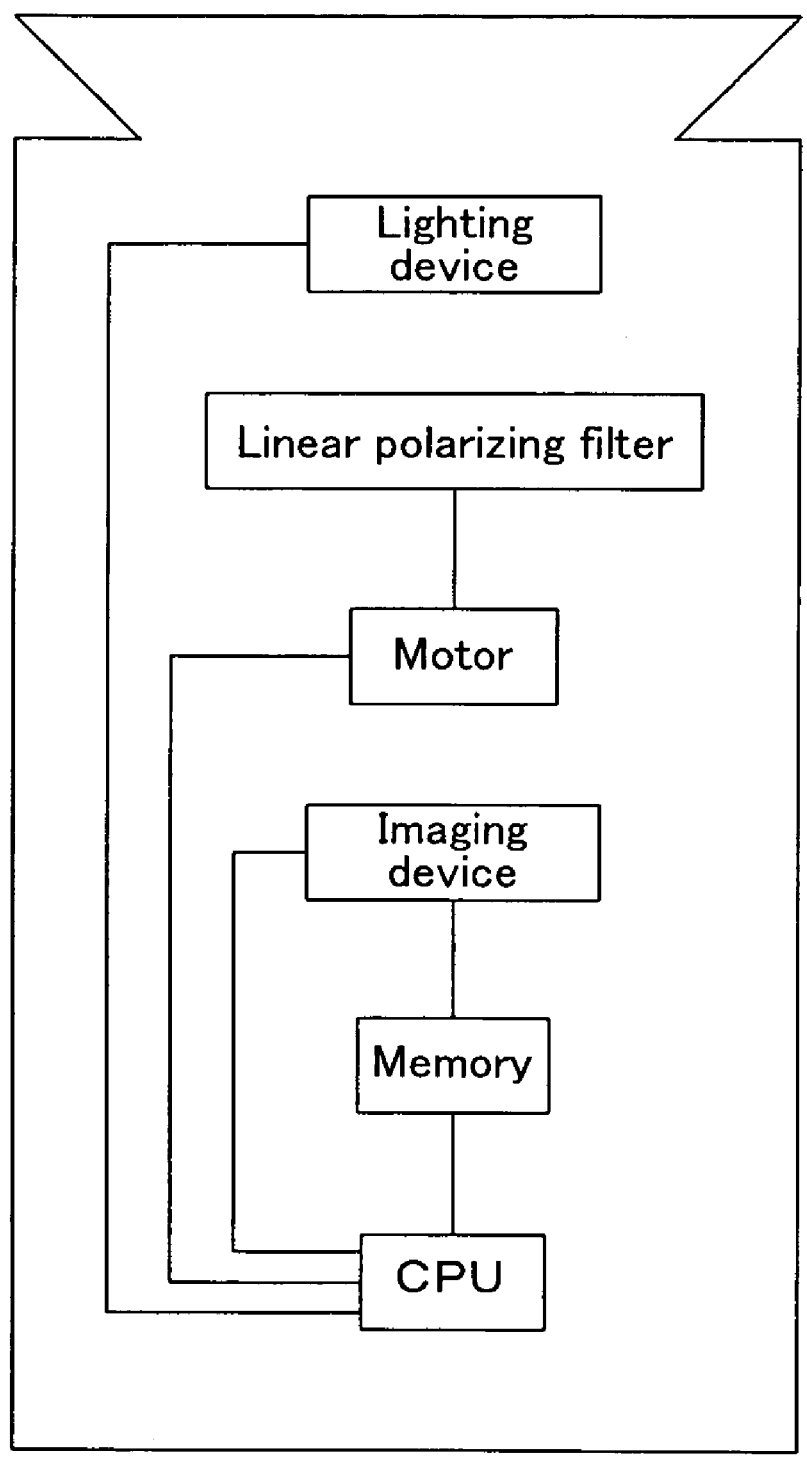
FIG. 4 shows an exemplary configuration of a camera provided with a super-resolution device according to first and second embodiments of the present invention.

FIGS. 1 and 2 show a configuration of an image resolution increasing device of the present embodiment. FIG. 3 is a flow chart showing the flow of the process of the super-resolution method of the present embodiment. FIG. 4 shows an exemplary configuration of a camera provided with the super-resolution device of the present embodiment.

The super-resolution device shown in FIG. 1 includes an image-capturing section 201 for imaging an object by an imaging device, a light source information estimating section 203 for estimating light source information regarding the light source illuminating the object, a shape information obtaining section 204 for obtaining the shape information of the object, an albedo estimating section 206 for producing an albedo image of the object from an original image captured by the image-capturing section 201 by using the light source information and the shape information, an albedo database (DB) 208 storing a conversion rule for converting a low-resolution albedo image to a high-resolution albedo image, an albedo super-resolution section 207 for obtaining the conversion rule from the albedo DB 208 to perform super-resolution of the albedo image produced by the albedo estimating section 206 according to the conversion rule, and a super-resolution section 217 for producing a high-resolution image obtained by performing super-resolution of the original image by using the high-resolution albedo image obtained by the albedo super-resolution section 207 and the light source information and the shape information.

The light source information estimated by the light source information estimating section 203 includes at least one of the illuminance, the direction and the position of the light source. The object information estimation section 204 obtains the surface normal information or the three-dimensional position information of the object as shape information.

A super-resolution device shown in FIG. 2 is based on the configuration of FIG. 1 and separates an original image into a diffuse reflection image and a specular reflection image, wherein the diffuse reflection image is subjected to a super-resolution process using an albedo image and the specular reflection image is subjected to a super-resolution process not using an albedo image. Moreover, the super-resolution process is performed after removing shadow areas from the original image and the shadow areas are added after the super-resolution process.

Specifically, the configuration includes, in addition to that of FIG. 1, a diffuse reflection/specular reflection separating section 202 for separating the original image captured by the image-capturing section 201 into a diffuse reflection image and a specular reflection image, and a shadow removing section 205 for estimating shadow areas from the separated images. An albedo estimating section 221 produces an albedo image, by using the light source information and the shape information, from the diffuse reflection image separated by the diffuse reflection/specular reflection separating section 202 instead of the original image captured by the image-capturing section 201.

The super-resolution section 217 includes a diffuse reflection image super-resolution section 209 for producing a super-resolution diffuse reflection image by using the high-resolution albedo image obtained by the albedo super-resolution section 207, a parameter estimating section 210 for estimating parameters representing the object by using the shape information obtained by the shape information obtaining section 204 and the diffuse reflection image and the specular reflection image separated by the diffuse reflection/specular reflection separating section 202, a shape information resolution increasing section 211 for increasing the resolution of the shape information obtained by the shape information obtaining section 204, a parameter resolution increasing section 213 for increasing the resolution of the parameters obtained by the parameter estimating section 210 by using a normal database (DB) 212 storing a conversion rule for converting low-resolution shape information to high-resolution shape information, a specular reflection image super-resolution section 214 for synthesizing a super-resolution specular reflection image by using the high-resolution shape information estimated by the shape information resolution increasing section 211 and the parameters whose resolution has been increased by the parameter resolution increasing section 213, a shadow producing section 215 for producing shadow areas, and a rendering section 216.

Based on the configuration of FIG. 2, processes performed by different components will now be described. While the configuration of FIG. 2 performs the super-resolution process after removing shadow areas from the original image and then adds the shadow areas after the super-resolution process, the removal and addition of shadow areas is not always necessary in the present invention. While the configuration of FIG. 2 separates the original image into a diffuse reflection image and a specular reflection image, wherein the diffuse reflection image is subjected to a super-resolution process using an albedo image and the specular reflection image is subjected to a super-resolution process not using an albedo image, the separation into a diffuse reflection image and a specular reflection image is not always necessary in the present invention. For example, where it can be assumed that the original image is substantially consisting only of the diffuse reflection component, it is not necessary to separate a diffuse reflection image and a specular reflection image from each other, but the original image may be subjected to. In such a case, the configuration of the device is as shown in FIG. 1.

The image-capturing section 201 images the object by using an imaging device such as CCD or a CMOS (step S401). In the captured image, it is preferred that the specular reflection component where the luminance is very high and the diffuse reflection component are recorded at the same time without saturation. Therefore, it is preferred to use an imaging device capable of capturing an image over a wide dynamic range, such as a cooled CCD camera or a multiple-exposure imaging. Moreover, it is preferred that the image-capturing section 201 captures an image by using a polarizing filter. Then, it is possible to obtain the polarization state of the object, and the diffuse reflection/specular reflection separating section 202 can perform the separation by using the polarization state obtained by the image-capturing section 201.

The diffuse reflection/specular reflection separating section 202 separates the original image captured by the image-capturing section 201 into a diffuse reflection image and a specular reflection image (step S402). A diffuse reflection image is what is obtained by imaging only a diffuse reflection component, being a mat reflection component, of the input image. Similarly, a specular reflection image is what is obtained by imaging only a specular reflection component, being a shine, of the input image. The diffuse reflection component is a component that is scattered evenly in all directions, as is a reflection at a mat object surface. The specular reflection component is a component that reflects strongly in the opposite direction to the direction of the incident light with respect to the normal as is a reflection at a mirror surface. Assuming a dichromatic reflection model, the luminance of an object is represented by the sum of a diffuse reflection component and a specular reflection component. As will be described later, the specular reflection image and the diffuse reflection image can be obtained by imaging an object while rotating the polarizing filter, for example.

Figure 5A:
FIG. 5 is a diagram showing an example of how an image is separated into a diffuse reflection image and a specular reflection image.
Figure 5B:
Figure 5C:
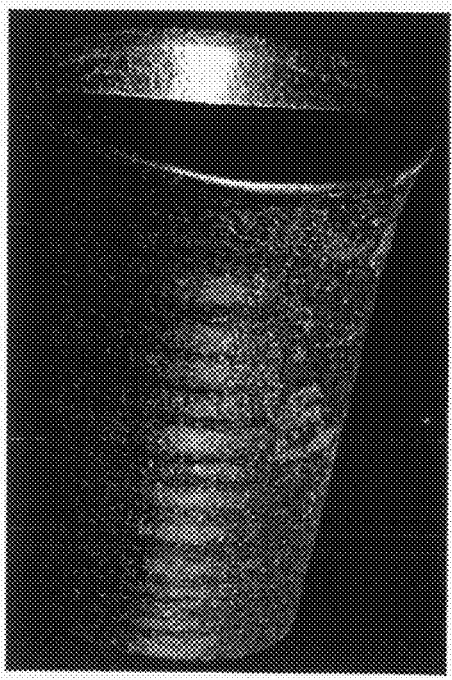

FIG. 5($a$) shows an image obtained by imaging an object (a tumbler) illuminated by a light source with an imaging device. It can be seen that a specular reflection, being a shine, appears in an upper portion of the figure. FIGS. 5($b$) and ($c$) are the results of separating the image of FIG. 5($a$) into a diffuse reflection image and a specular reflection image by a method to be described later. In the diffuse reflection image, the shine has been removed to make clear the surface texture information, but the stereoscopic effect has been lost. On the other hand, in the specular reflection image, detailed shape information appears clearly, but the texture information has been lost. Thus, an input image is an image obtained by laying these two images containing totally different information on each other. By separating an image into a diffuse reflection image and a specular reflection image and processing these images separately, it is possible to realize a super-resolution process with a higher definition.

As described above, assuming a dichromatic reflection model, the luminance of an object is represented as follows by the sum of a diffuse reflection component and a specular reflection component.

[Formula 1]

$$I = I_a + I_d + I_s \qquad \text{Expression 12)}$$

Herein, I is the luminance value of the object imaged by the imaging device, $I_a$ is an environmental light component, $I_d$ is a diffuse reflection component, and $I_s$ is a specular reflection component. The environmental light component refers to indirect light which is light from the light source being scattered by objects, etc. This is scattered to every part of the space, giving a slight brightness even to shaded areas where direct light does not reach. Therefore, normally, it is often treated as noise.

Assuming that the environmental light component is sufficiently small and negligible as noise, an image can be separated into a diffuse reflection component and a specular reflection component. As described above, these components exhibit very different characteristics from each other, as the diffuse reflection component depends on texture information, whereas the specular reflection image depends on detailed shape information. Therefore, if the super-resolution is performed by separating an input image into a diffuse reflection image and a specular reflection image and performing super-resolution by different methods, it is possible to perform super-resolution with a very high definition. For this, it is first necessary to separate the diffuse reflection image and the specular reflection image from each other.

Various separation methods have been proposed in the art. For example, they include:
- those using a polarizing filter utilizing the difference in degree of polarization between specular reflection and diffuse reflection (for example, Japanese Patent No. 3459981);
- those using a multispectral camera while rotating an object so as to separate the specular reflection area (for example, Japanese Laid-Open Patent Publication No. 2003-85531); and
- those using images of an object illuminated by the light source from various directions to synthesize a linearized image being an image in an ideal state where there is no specular reflection, and using the linearized image to separate specular reflection and shadow areas (for example, Yasunori Ishii, Koutaro Fukui, Yasuhiro Mukaigawa, Takeshi Shakunaga, "Classification of Photometric Factors Based on Photometric Linearization," Journal of Information Processing Society of Japan, vol. 44, no. SIG5 (CVIM6), pp. 11-21, 2003).

Figure 6:
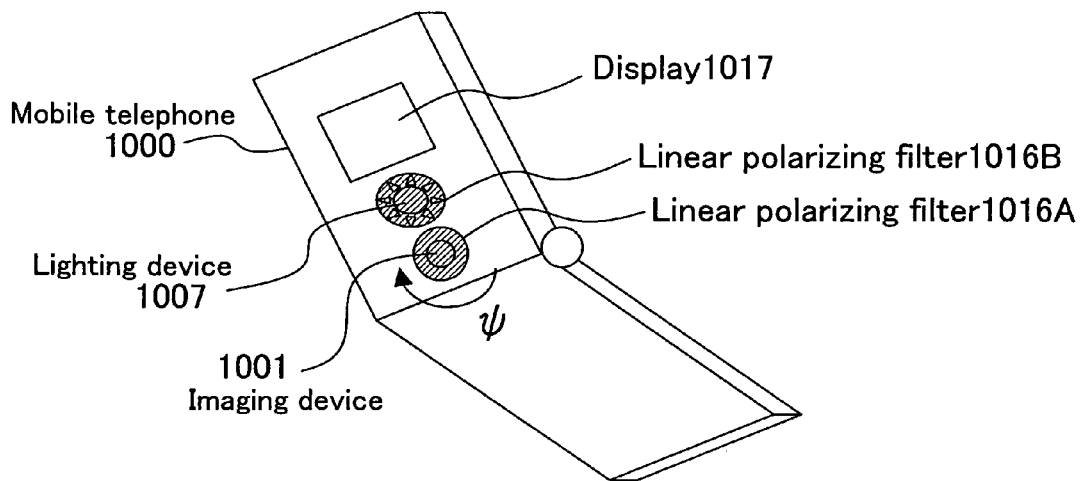
FIG. 6 is a diagram showing a camera-equipped mobile telephone provided with a super-resolution device according to the first embodiment of the present invention.

Herein, a method using a polarizing filter is employed. FIG. 6 shows the camera-equipped mobile telephone 1000 provided with a super-resolution device of the present embodiment. As shown in FIG. 6, the imaging device 1001 is provided with a linear polarizing filter 1016A having a rotation mechanism (not shown). The lighting device 1007 with a linear polarizing filter 1016B attached thereto is also provided. Moreover, 1017 denotes a liquid crystal display as a user interface.

Figure 7:
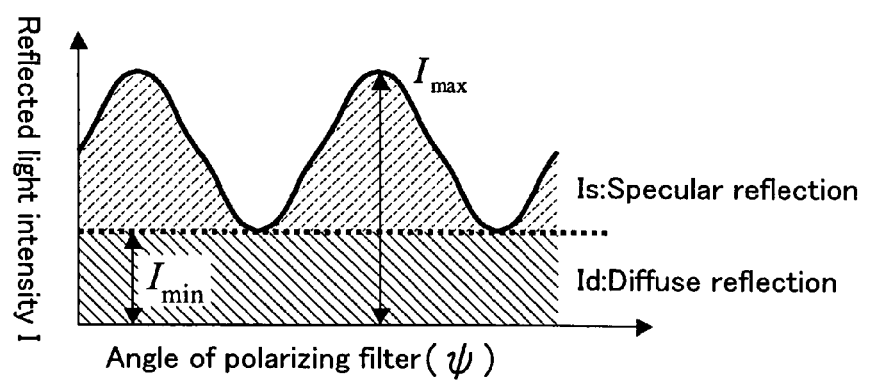
FIG. 7 is a graph showing variations in a reflected light intensity when a polarizing filter is rotated under linearly-polarized light.

The imaging device 1001 captures a plurality of images of an object being illuminated by the lighting device 1007 with the linear polarizing filter 1016B attached thereto while rotating the linear polarizing filter 1016A by means of the rotation mechanism. In view of the fact that the illumination is linearly polarized, the reflected light intensity changes as shown in FIG. 7 with respect to the angle of rotation $\psi$ of the polarizing filter 1016. Where $I_d$ denotes the diffuse component of the reflected light and $I_s$ the specular reflection component thereof, the maximum value $I_{max}$ and the minimum value $I_{min}$ of the reflection light luminance can be expressed as follows.

[Formula 2]
$$I_{max} = \frac{1}{2}I_d + I_s$$

[Formula 3]
$$I_{min} = \frac{1}{2}I_d$$

In other words, the diffuse component $I_d$ of the reflected light and the specular reflection component $I_s$ thereof are obtained as follows.

[Formula 4]
$$I_d = 2I_{min} \quad \text{(Expression 13)}$$

[Formula 5]
$$I_s = I_{max} - I_{min} \quad \text{(Expression 14)}$$

Figure 8:
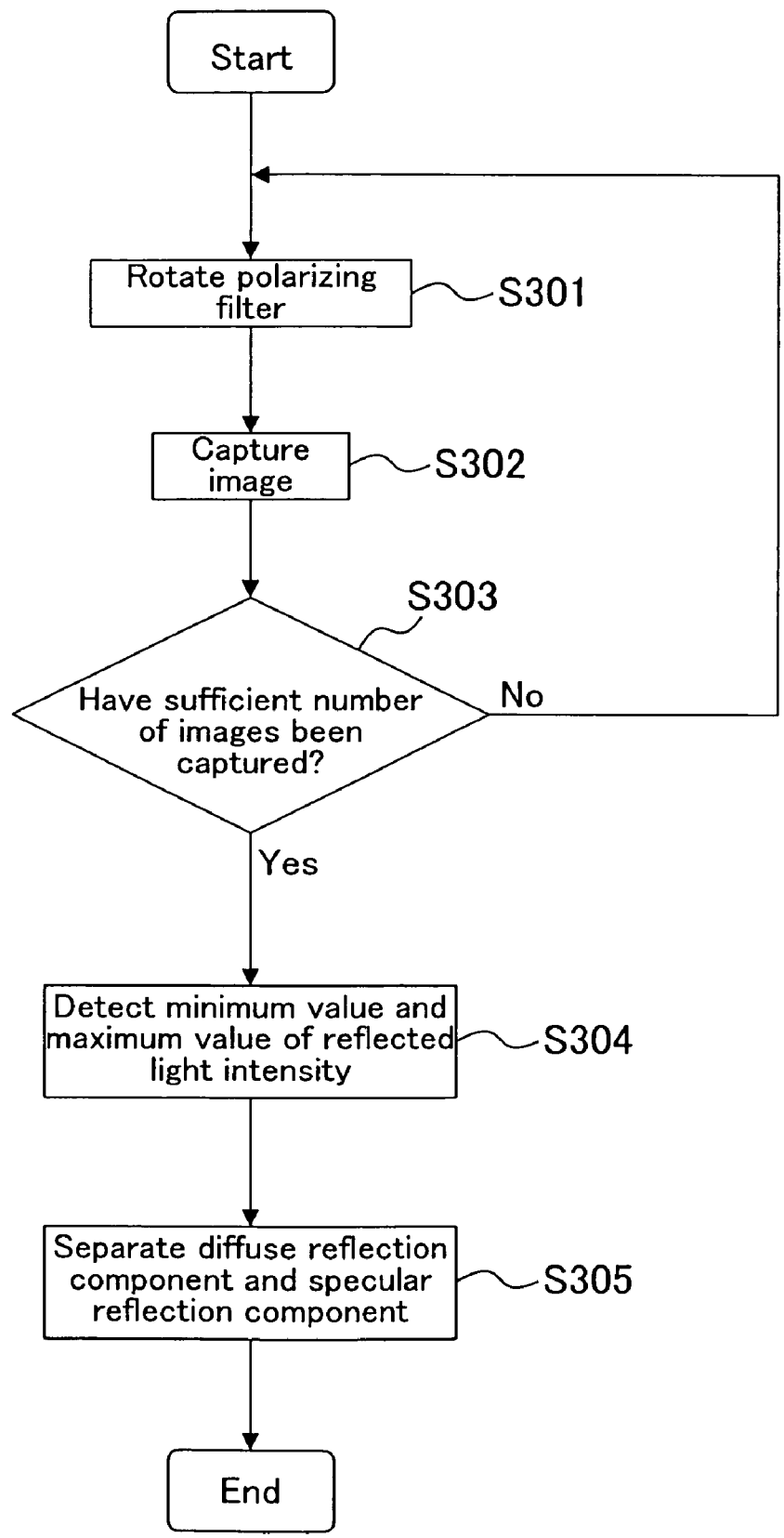
FIG. 8 is a flow chart showing the flow of a process of separating a specular reflection image and a diffuse reflection image from each other by using a polarizing filter.

FIG. 8 shows the flow of this process. First, the polarizing filter 1016A is rotated by the rotation mechanism (step S301), and images are captured and stored in a memory (step S302). Then, it is determined whether a predetermined number of images have been captured and stored in the memory (step S303). If a sufficient number of images for detecting the minimum value and the maximum value of the reflection light luminance have not been captured (No in step S303), the polarizing filter is rotated again (step S301) to repeat the image-capturing process. If a sufficient number of images have been captured (Yes in step S303), the minimum value and the maximum value of the reflection light luminance are detected by using the captured image data (step S304), and the diffuse reflection component and the specular reflection component are separated from each other by using (Expression 13) and (Expression 14) (step S305). While this process may be done by obtaining the minimum value and the maximum value for each pixel from the plurality of images, fitting of a sin function is used herein. This process will now be described.

Figure 29:
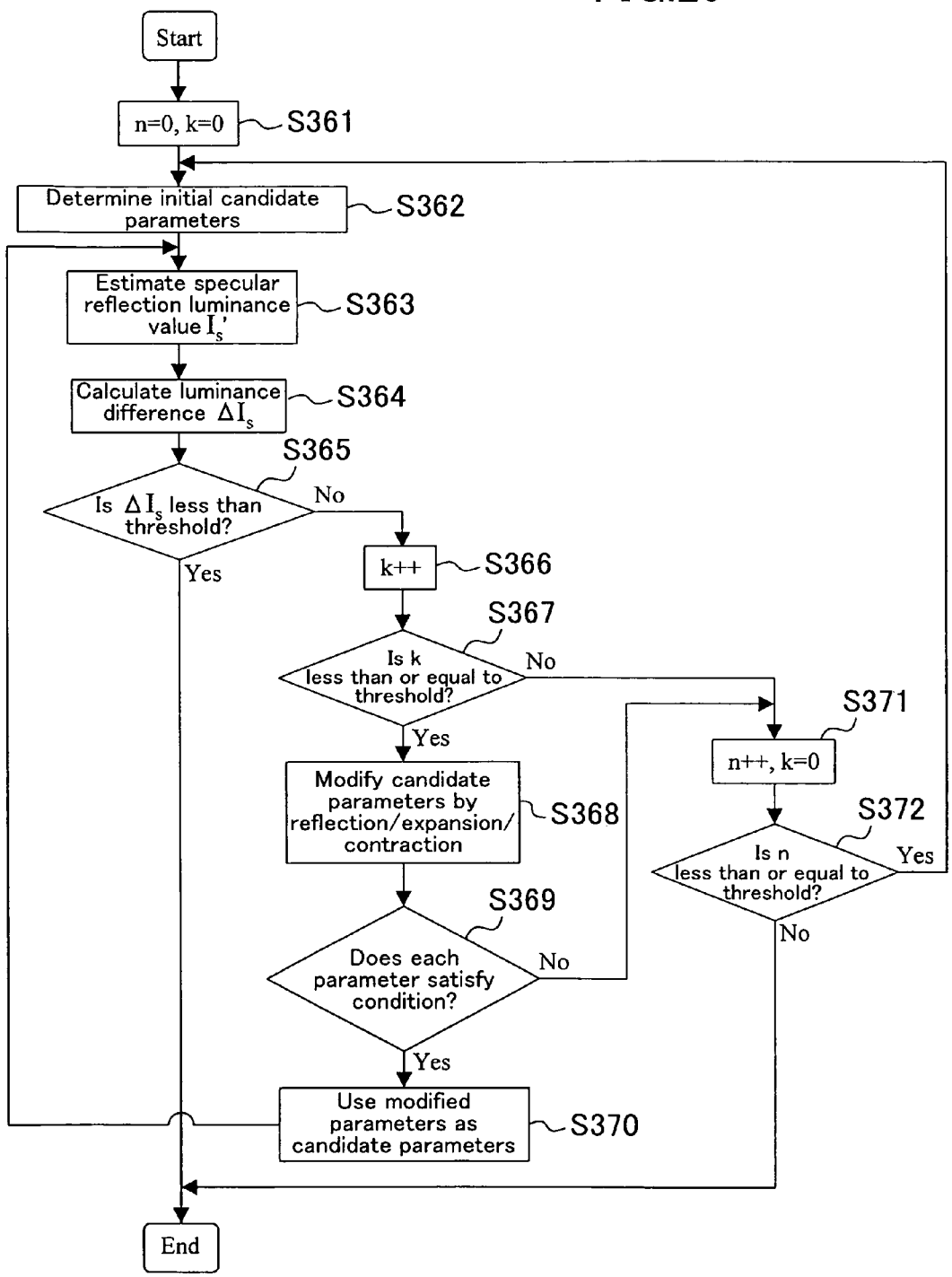
FIG. 29 is a flow chart showing the flow of a parameter estimating process by a simplex method.

The reflection light luminance I for the polarizing filter angle $\psi$ shown in FIG. 29 can be approximated by a sin function as follows.

[Formula 6]
$$I = A \cdot \sin 2(\psi - B) + C \quad \text{(Expression 15)}$$

Herein, A, B and C are constants, and the following expressions hold based on (Expression 13) and (Expression 14).

[Formula 7]
$$I_d = 2(C - A) \quad \text{(Expression 16)}$$

[Formula 8]
$$I_s = 2A \quad \text{(Expression 17)}$$

Thus, it is possible to separate the diffuse reflection component and the specular reflection component from each other by obtaining A, B and C of (Expression 15) from the captured images.

(Expression 15) can be expanded as follows.

[Formula 9]
$$I = a \cdot \sin 2\phi + b \cdot \cos 2\phi + C$$

Note however,

[Formula 10]
$$A = \sqrt{a^2 + b^2},$$
$$\sin(-2B) = \frac{b}{\sqrt{a^2 + b^2}},$$
$$\cos(-2B) = \frac{a}{\sqrt{a^2 + b^2}} \quad \text{(Expression 18)}$$

Thus, it is possible to separate the diffuse reflection component and the specular reflection component from each other by obtaining A, B and C that minimize the following evaluation expression.

[Formula 11]
$$f(a, b, C) = \sum_{i=0}^{N-1} (I_i - a \cdot \sin 2\phi_i - b \cdot \cos 2\phi_i - C)^2$$

Herein, $I_i$ denotes the reflected light intensity for the polarizing filter angle $\psi_i$. By using the method of least squares, the parameters are estimated as follows.

[Formula 12]
$$a = \frac{D}{E}, \quad b = \frac{F}{E}, \quad C = \frac{G}{E} \quad \text{(Expression 19)}$$

-continued

[Formula 13]

$$D = \left(\sum_{i=0}^{N-1}\sin 2\phi_i\right)\cdot\left(\sum_{i=0}^{N-1}\cos 2\phi_i\right)\cdot\left(\sum_{i=0}^{N-1}I_i\cdot\cos 2\phi_i\right) +$$
$$\left(\sum_{i=0}^{N-1}I_i\right)\cdot\left(\sum_{i=0}^{N-1}\cos 2\phi_i\right)\cdot\left(\sum_{i=0}^{N-1}\sin 2\phi_i\cdot\cos 2\phi_i\right) +$$
$$N\cdot\left(\sum_{i=0}^{N-1}I_i\cdot\sin 2\phi_i\right)\cdot\left(\sum_{i=0}^{N-1}(\cos 2\phi_i)^2\right) -$$
$$N\cdot\left(\sum_{i=0}^{N-1}I_i\cdot\cos 2\phi_i\right)\cdot\left(\sum_{i=0}^{N-1}\sin 2\phi_i\cdot\cos 2\phi_i\right) -$$
$$\left(\sum_{i=0}^{N-1}\cos 2\phi_i\right)\cdot\left(\sum_{i=0}^{N-1}\cos 2\phi_i\right)\cdot\left(\sum_{i=0}^{N-1}I_i\cdot\sin 2\phi_i\right) -$$
$$\left(\sum_{i=0}^{N-1}I_i\right)\cdot\left(\sum_{i=0}^{N-1}\sin 2\phi_i\right)\cdot\left(\sum_{i=0}^{N-1}(\cos 2\phi_i)^2\right)$$

(Expression 20)

[Formula 14]

$$E = 2\cdot\left(\sum_{i=0}^{N-1}\sin 2\phi_i\right)\cdot\left(\sum_{i=0}^{N-1}\cos 2\phi_i\right)\cdot\left(\sum_{i=0}^{N-1}\sin 2\phi_i\cdot\cos 2\phi_i\right) +$$
$$N\cdot\left(\sum_{i=0}^{N-1}(\sin 2\phi_i)^2\right)\cdot\left(\sum_{i=0}^{N-1}(\cos 2\phi_i)^2\right) -$$
$$\left(\sum_{i=0}^{N-1}\sin 2\phi_i\right)^2\cdot\left(\sum_{i=0}^{N-1}(\cos 2\phi_i)^2\right) -$$
$$\left(\sum_{i=0}^{N-1}\cos 2\phi_i\right)^2\cdot\left(\sum_{i=0}^{N-1}(\sin 2\phi_i)^2\right) -$$
$$N\cdot\left(\sum_{i=0}^{N-1}\sin 2\phi_i\cdot\cos 2\phi_i\right)^2$$

(Expression 21)

[Formula 15]

$$F = N\cdot\left(\sum_{i=0}^{N-1}I_i\cdot\cos 2\phi_i\right)\cdot\left(\sum_{i=0}^{N-1}(\sin 2\phi_i)^2\right) +$$
$$\left(\sum_{i=0}^{N-1}\sin 2\phi_i\right)\cdot\left(\sum_{i=0}^{N-1}\cos 2\phi_i\right)\cdot\left(\sum_{i=0}^{N-1}I_i\cdot\sin 2\phi_i\right) +$$
$$\left(\sum_{i=0}^{N-1}I_i\right)\cdot\left(\sum_{i=0}^{N-1}\sin 2\phi_i\right)\cdot\left(\sum_{i=0}^{N-1}\sin 2\phi_i\cdot\cos 2\phi_i\right) -$$
$$\left(\sum_{i=0}^{N-1}\sin 2\phi_i\right)^2\cdot\left(\sum_{i=0}^{N-1}I_i\cdot\cos 2\phi_i\right) -$$
$$\left(\sum_{i=0}^{N-1}I_i\right)\cdot\left(\sum_{i=0}^{N-1}\cos 2\phi_i\right)\cdot\left(\sum_{i=0}^{N-1}(\sin 2\phi_i)^2\right) -$$
$$N\cdot\left(\sum_{i=0}^{N-1}I_i\cdot\sin 2\phi_i\right)\cdot\left(\sum_{i=0}^{N-1}\sin 2\phi_i\cdot\cos 2\phi_i\right)$$

(Expression 22)

[Formula 16]

$$G = \left(\sum_{i=0}^{N-1}\sin 2\phi_i\right)\cdot\left(\sum_{i=0}^{N-1}\sin 2\phi_i\cdot\cos 2\phi_i\right)\cdot\left(\sum_{i=0}^{N-1}I_i\cdot\cos 2\phi_i\right) +$$
$$\left(\sum_{i=0}^{N-1}\cos 2\phi_i\right)\cdot\left(\sum_{i=0}^{N-1}\sin 2\phi_i\cdot\cos 2\phi_i\right)\cdot\left(\sum_{i=0}^{N-1}I_i\cdot\sin 2\phi_i\right) +$$
$$\left(\sum_{i=0}^{N-1}I_i\right)\cdot\left(\sum_{i=0}^{N-1}(\sin 2\phi_i)^2\right)\cdot\left(\sum_{i=0}^{N-1}(\cos 2\phi_i)^2\right) -$$
$$\left(\sum_{i=0}^{N-1}\cos 2\phi_i\right)\cdot\left(\sum_{i=0}^{N-1}(\sin 2\phi_i)^2\right)\cdot\left(\sum_{i=0}^{N-1}I_i\cdot\cos 2\phi_i\right) -$$
$$\left(\sum_{i=0}^{N-1}I_i\right)\cdot\left(\sum_{i=0}^{N-1}\sin 2\phi_i\cdot\cos 2\phi_i\right)^2 -$$
$$\left(\sum_{i=0}^{N-1}\sin 2\phi_i\right)\cdot\left(\sum_{i=0}^{N-1}(\cos 2\phi_i)^2\right)\cdot\left(\sum_{i=0}^{N-1}I_i\cdot\sin 2\phi_i\right)$$

(Expression 23)

As described above, the diffuse reflection component and the specular reflection component are separated from each other by using (Expression 16) to (Expression 23). In such a case, since the number of unknown parameters is three, it is sufficient to capture at least three images with different angles of rotation of the polarizing filter.

Figure 9:
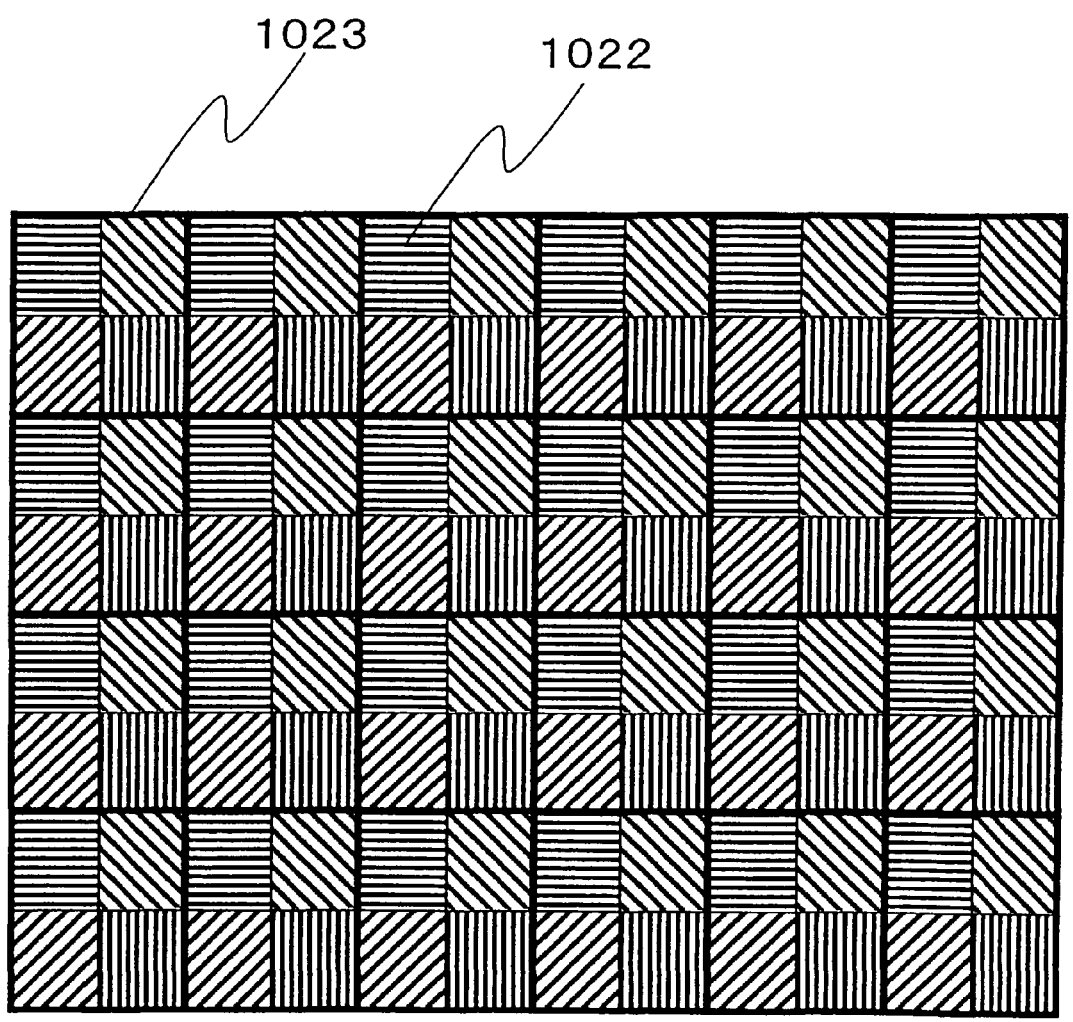
FIG. 9 is a schematic diagram illustrating an imaging device in which a polarization direction is varied from one pixel to another.

Therefore, instead of providing a rotation mechanism for the linear polarizing filter 1016A, one may employ an imaging device in which the polarization direction is varied from one pixel to another. FIG. 9 schematically shows pixels of such an imaging device. Herein, 1022 denotes one pixel, and straight lines in each pixel denote the polarization direction. Specifically, the imaging device has pixels of four different polarization directions of 0°, 45°, 90° and 135°. If pixels of four different kinds are treated to be a single pixel as in a Bayer arrangement as represented by a thick line 1023 in FIG. 9, it is possible to simultaneously capture images with four different polarization directions. Such an imaging device may be, for example, a photonic crystal device, or the like.

Figure 10:
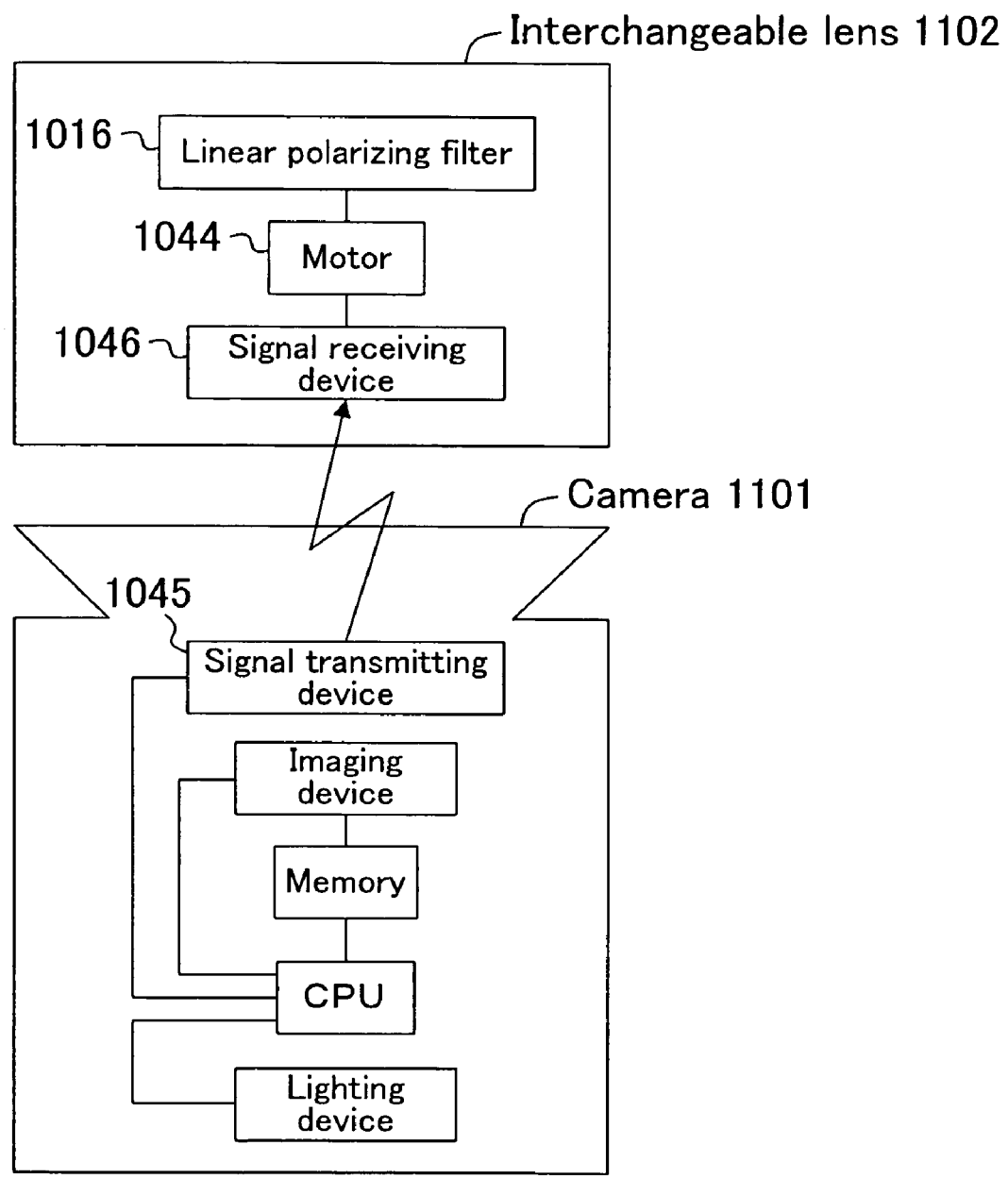
FIG. 10 shows an exemplary configuration of a camera and an interchangeable lens provided with a polarizing filter and a rotation device.

The polarizing filter and the rotation device may be provided in a detachable configuration, instead of being provided in the camera itself. For example, the polarizing filter and the rotation device may be provided in an interchangeable lens of a single-lens reflex camera. FIG. 10 shows an exemplary configuration of a camera and an interchangeable lens provided with a super-resolution device as described above. A camera 1101 includes a signal transmitting device 1045 for transmitting a signal instructing the rotation of the linear polarizing filter 1016 to an interchangeable lens 1102. The interchangeable lens 1102 includes the linear polarizing filter 1016, a signal receiving device 1046 for receiving a signal transmitted from the signal transmitting device 1045, and a motor 1044 for rotating the linear polarizing filter 1016 when the signal receiving device 1046 receives a signal instructing the rotation of the linear polarizing filter 1016.

Figure 11:
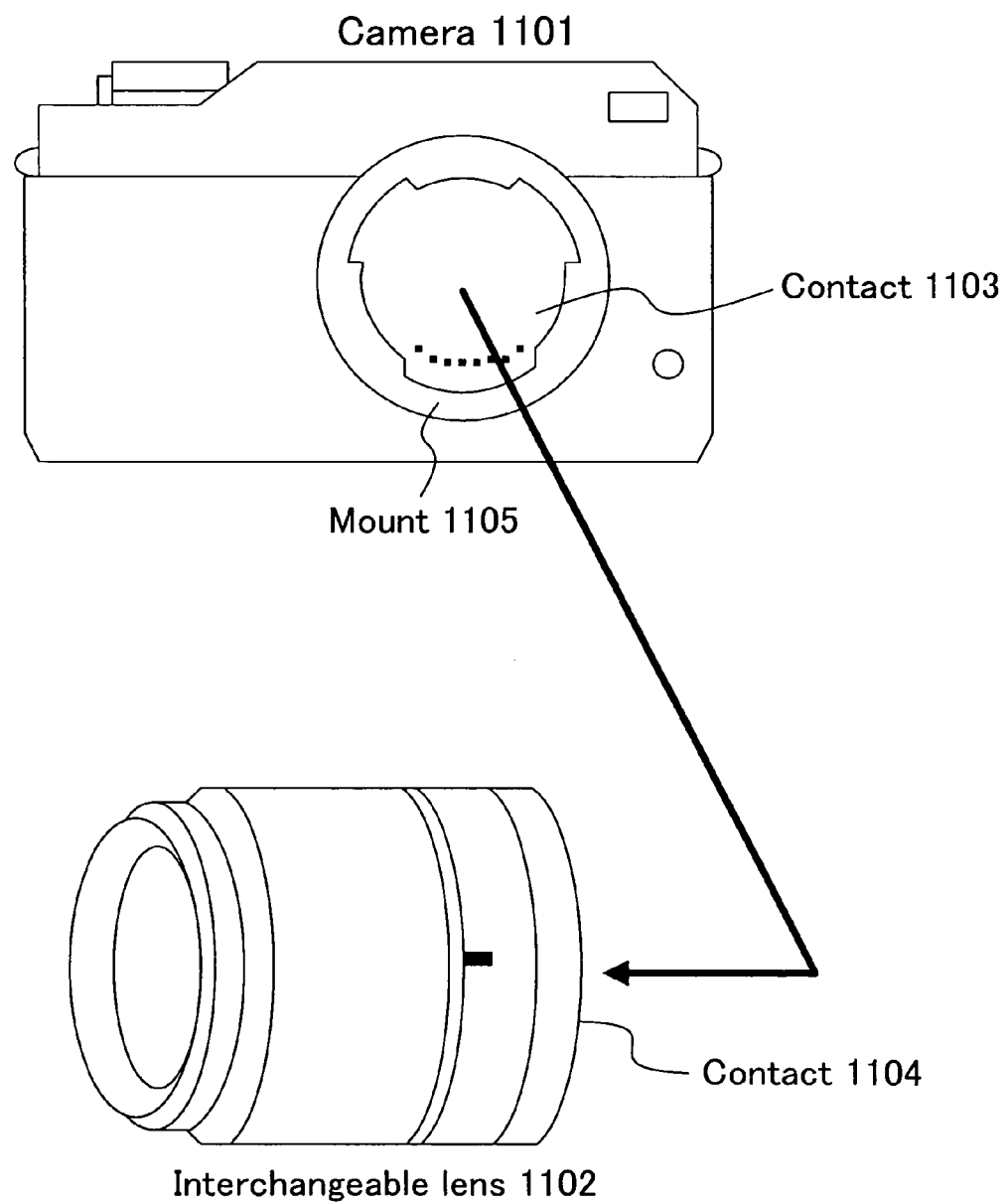
FIG. 11 is a schematic diagram showing a camera and an interchangeable lens provided with a polarizing filter and a rotation device.

FIG. 11 is a schematic diagram showing a camera and an interchangeable lens provided with a super-resolution device as described above. The camera 1101 is provided with a contact 1103 for transmitting an electric signal, and the interchangeable lens 1102 is provided with a contact 1104 for receiving an electric signal. When the camera 1101 and the interchangeable lens 1102 are connected together by a mount 1105, the contacts 1103 and 1104 come into contact with each other. Thus, it becomes possible to transmit a signal from the camera 1101 to the interchangeable lens 1102, and it is possible to transmit from the camera 1101 a signal instructing the rotation of the linear polarizing filter 1016, whereby the linear polarizing filter 1016 is rotated by the motor 1044.

A polarized illumination, e.g., a liquid crystal display, may be used as the lighting device 1007. For example, the liquid crystal display 1017 provided in the mobile telephone 1000 can be used. In such a case, it is preferred that the luminance value of the liquid crystal display 1017 is made higher than that when it is used as a user interface.

Of course, the polarizing filter 1016B of the lighting device 1007 may be rotated instead of rotating the polarizing filter 1016A of the imaging device 1001. Moreover, instead of providing a polarizing filter both for the imaging device 1001 and for the lighting device 1007, a polarizing filter may be provided only for one of them, i.e., for the imaging device, and the diffuse reflection component and the specular reflection component may be separated from each other by using an independent component analysis (see, for example, Japanese Patent No. 3459981).

The light source information estimating section 203 obtains, as the light source information, the direction, color information and illuminance information of the light source (step S403). This can be done by, for example, providing, in the vicinity of the object, a mirror surface, or the like, of a known shape for estimating the light source information, and estimating the information from the image of the mirror surface captured by the image-capturing section 201 (for example, Masayuki Kanbara, Naokazu Yokoya, "Geometric And Photometric Registration For Vision-Based Augmented Reality", Technical Report of the Institute of Electronics, Information and Communication Engineers, Pattern recognition and Media Understanding, PRMU2002-190, pp. 7-12, 2003). This process will now be described in detail.

Figure 12:
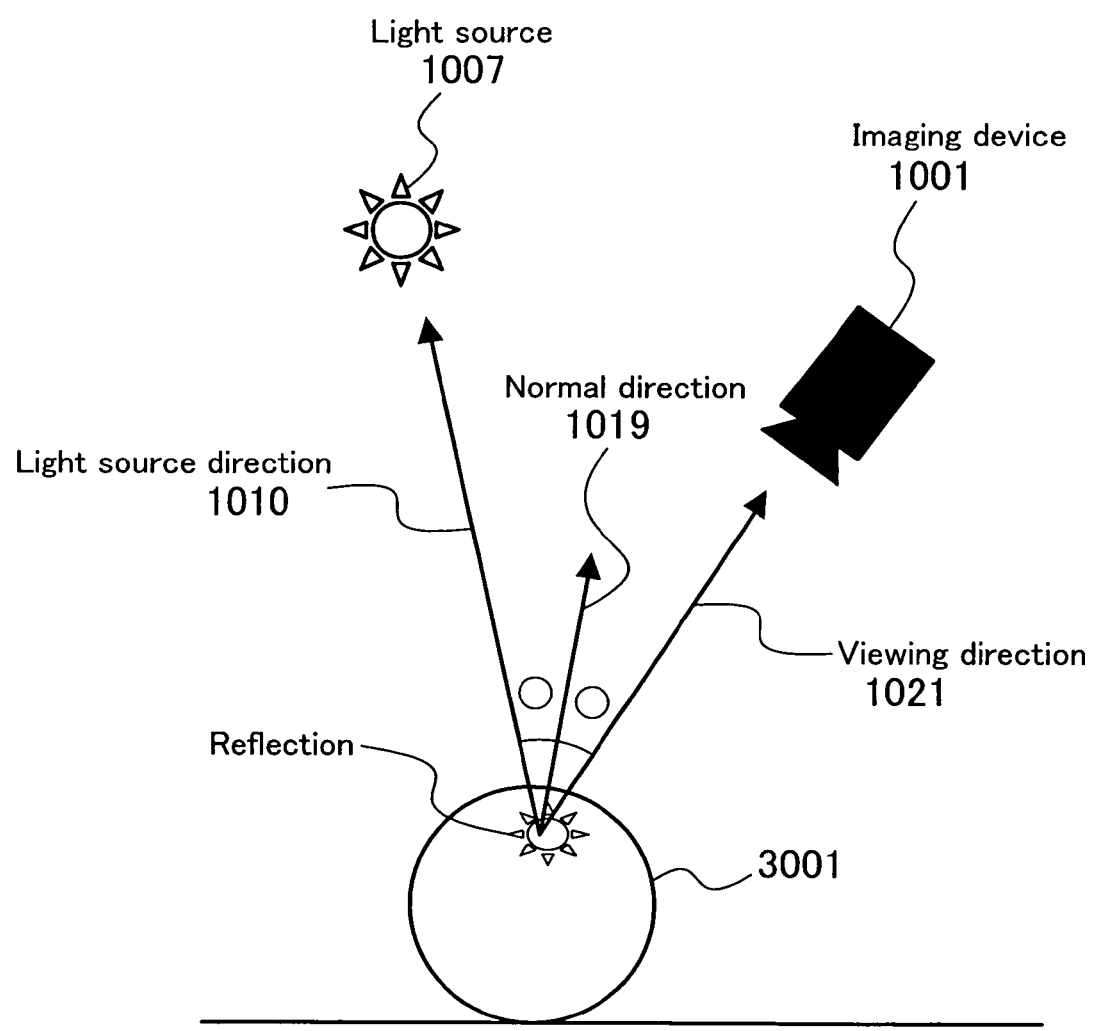
FIG. 12 is a schematic diagram illustrating a light source estimation method using a mirror surface sphere.

The light source information estimating section 203 performs the process by using a sphere 3001 that can be considered a mirror surface as shown in FIG. 12. The mirror surface sphere 3001 is provided in the vicinity of the object, and it is assumed that the position and the normal direction thereof are known. The mirror surface sphere 3001 is imaged by the image-capturing section 201. At this point, an imaging environment is reflected on the mirror surface sphere 3001. The position at which the reflection occurs is such that the viewing direction and the direction of the object being reflected are in a regular reflection relationship with respect to the normal direction on the mirror surface sphere. Therefore, if the position of the mirror surface sphere and the normal direction thereof are known, the direction of the object being reflected can be detected from the reflection image on the mirror surface. Considering the fact that the light source has a high luminance value, the direction of the light source can be obtained by detecting a high-luminance pixel from the captured image of the mirror surface sphere. Moreover, if the reflectance of the mirror surface is known, it is possible to obtain light source illuminance information such as the color information and the radiance of the light source.

Of course, the process may obtain, as the light source information, light source position information in addition to, or instead of, the light source direction. This can be done by, for example, employing a stereo process widely known in the field of image processing using two of the mirror surface spheres described above. If the distance to the light source is known, the position of the light source can be estimated by estimating the light source direction by a method described above.

Of course, the process may use light source information that has previously been obtained by image capturing, instead of imaging such a mirror surface sphere each time. This is effective in a case where the light source environment does not change, e.g., an indoor surveillance camera. In such a case, the light source information may be obtained by imaging the mirror surface sphere when the camera is installed.

The shape information obtaining section 204 obtains the surface normal information of the object or the three-dimensional position information of the object, as shape information of the object (step S404). Means for obtaining shape information of an object may be an existing method such as, for example, a slit-ray projection method, a pattern projection method or a laser radar method.

Of course, the shape information obtaining method is not limited to these methods. For example, the method may be a stereoscopic method using a plurality of cameras, a motion-stereo method using the motion of a camera, a photometric stereo method using images captured while varying the position of the light source, a method in which the distance from an object is measured using a millimeter wave or an ultrasonic wave, or a method using polarization characteristics of reflected light (for example, U.S. Pat. No. 5,028,138, and Daisuke Miyazaki, Katsushi Ikeuchi, "A Method To Estimate Surface Shape Of Transparent Objects By Using Polarization Raytracing Method", Journal of the Institute of Electronics, Information and Communication Engineers, vol. J88-D-II, No. 8, pp. 1432-1439, 2005). Herein, a photometric stereo method and a method using polarization characteristics will be described.

The photometric stereo method is a method for estimating the normal direction and the reflectance of an object by using three or more images of different light source directions. For example, H. Hayakawa, "Photometric Stereo Under A Light Source With Arbitrary Motion", Journal of the Optical Society of America A, vol. 11, pp. 3079-89, 1994 describes a method where six or more points of an equal reflectance are obtained from an image as known information and they are used as constraints, thereby estimating the following parameters even if the light source position information is unknown:

the object information: the normal direction and the reflectance at each point of the image; and the light source information: the light source direction and the illuminance at an object-observing point.

Herein, a photometric stereo method using only the diffuse reflection image separated by the diffuse reflection/specular reflection separating method described above is performed. Naturally, this method assumes that an object gives total diffuse reflection, and it therefore will result in a significant error with an object with specular reflection. Nevertheless, by using only the separated diffuse reflection image, it is possible to eliminate the estimation error due to the presence of specular reflection. Of course, the process may be performed on a diffuse reflection image from which shadow areas have been removed by a shadow removing section 205 as will be described later.

Diffuse reflection images of different light source directions are represented by the luminance matrix $I_d$ as follows.

[Formula 17]

$$I_d = \begin{bmatrix} i_{d1(1)} & \cdots & i_{dF(1)} \\ \vdots & \ddots & \vdots \\ i_{d1(P)} & \cdots & i_{dF(P)} \end{bmatrix} \quad \text{(Expression 24)}$$

Herein, $i_{df(p)}$ denotes the luminance value of a pixel p in the diffuse reflection image of the light source direction f. The number of pixels in the image is P, and the number of images captured with different light source directions is F. Using a Lambertian model, the luminance value of a diffuse reflection image can be expressed as follows.

[Formula 18]

$$i_{f(p)} = (\rho_p \cdot n_p) \cdot (t_f L_f) \quad \text{(Expression 25)}$$

Herein, $\rho_p$ denotes the reflectance (albedo) of the pixel p, $n_p$ the normal vector of the pixel p, $t_f$ the incident illuminance of the light source f, and $L_f$ the direction vector of the light source f.

The following expression is derived from (Expression 24) and (Expression 25).

[Formula 19]

$$I = R \cdot N \cdot L \cdot T = S \cdot M \quad \text{(Expression 26)}$$

Herein,

[Formula 20]

$$R = \begin{bmatrix} \rho_1 & & 0 \\ & \ddots & \\ 0 & & \rho_P \end{bmatrix}$$

[Formula 21]

$$N = [n_1 \ldots n_P]^T = \begin{bmatrix} n_{1x} & n_{1y} & n_{1z} \\ \vdots & \vdots & \vdots \\ n_{Px} & n_{Py} & n_{Pz} \end{bmatrix}$$

[Formula 22]

$$L = [L_1 \ldots L_F] = \begin{bmatrix} l_{x1} & \ldots & l_{xF} \\ l_{y1} & \ldots & l_{yF} \\ l_{z1} & \ldots & l_{zF} \end{bmatrix}$$

[Formula 23]

$$T = \begin{bmatrix} t_1 & & 0 \\ & \ddots & \\ 0 & & t_F \end{bmatrix}$$

[Formula 24]

$$S = [s_1 \ldots s_P]^T = \begin{bmatrix} s_{1x} & s_{1y} & s_{1z} \\ \vdots & \vdots & \vdots \\ s_{Px} & s_{Py} & s_{Pz} \end{bmatrix} = R \cdot N \quad \text{(Expression 27)}$$

[Formula 25]

$$M = [M_1 \ldots M_F] = \begin{bmatrix} m_{x1} & \ldots & m_{1xF} \\ m_{y1} & \ldots & m_{1yF} \\ m_{z1} & \ldots & m_{1zF} \end{bmatrix} = L \cdot T$$

Herein, R refers to a surface reflection matrix, N a surface normal matrix, L a light source direction matrix, T a light source intensity matrix, S a surface matrix, and M a light source matrix.

Using the singular value decomposition, (Expression 26) can be expanded as follows.

[Formula 26]

$$I = U \cdot \Sigma \cdot V \quad \text{(Expression 28)}$$

[Formula 27]

$$U = [U' \; U'']$$

$$\Sigma = \begin{bmatrix} \Sigma' & 0 \\ 0 & \Sigma'' \end{bmatrix}$$

$$V = \begin{bmatrix} V' \\ V'' \end{bmatrix}$$

Herein,

[Formula 28]

$$U^T \cdot U = V^T \cdot V = V \cdot V^T = E$$

and E denotes a unit matrix. Moreover, U' is a P×3 matrix, U'' a P×(F−3) matrix, Σ' a 3×3 matrix, Σ'' a (F−3)×(F−3) matrix, V' a 3×F matrix, and V'' a (F−3)×F matrix. Herein, it can be assumed that U'' and V'' are orthogonal bases, i.e., noise components, of U' and V' being signal components. Using the singular value decomposition, (Expression 28) can be rearranged as follows.

[Formula 29]

$$\hat{I} = U' \cdot \Sigma' \cdot V' = \hat{S} \cdot \hat{M} \quad \text{(Expression 29)}$$

[Formula 30]

$$\hat{S} = U' \cdot (\pm [\Sigma']^{1/2})$$

$$\hat{M} = (\pm [\Sigma']^{1/2}) \cdot V'$$

Thus, the shape information and the light source information can be obtained at once by solving (Expression 29), but the uncertainty of the 3×3 matrix A remains as follows.

[Formula 31]

$$S = \hat{S} \cdot A \quad \text{(Expression 30)}$$

[Formula 32]

$$M = A^{-1} \cdot \hat{M} \quad \text{(Expression 31)}$$

Herein, A is a 3×3 matrix. In order to obtain the shape information and the light source information, the matrix A needs to be obtained. This is satisfied if it is known that six or more points on the image have an equal reflectance. For example, if six points k1 to k6 have an equal reflectance, the following holds.

[Formula 33]

$$(s_{k1})^2 = (s_{k2})^2 = (s_{k3})^2 = (s_{k4})^2 = (s_{k5})^2 = (s_{k6})^2 = 1 \quad \text{(Expression 32)}$$

From (Expression 27), (Expression 30) and (Expression 32), the following holds.

[Formula 34]

$$(s_{ki})^2 = (\hat{s}_{ki}^T \cdot A)^2 = (\hat{s}_{ki}^T \cdot A)^T \cdot (\hat{s}_{ki}^T \cdot A) = (\hat{s}_{ki}^T \cdot A) \cdot (\hat{s}_{ki}^T \cdot A)^T = \hat{s}_{ki}^T \cdot A \cdot A^T \hat{s}_{ki} = 1 \quad \text{(Expression 33)}$$

Moreover, with

[Formula 35]

$$B = A \cdot A^T \quad \text{(Expression 34)}$$

(Expression 33) is rearranged as follows.

[Formula 36]

$$\hat{s}_{ki}^T \cdot B \cdot \hat{s}_{ki} = 1 \quad \text{(Expression 35)}$$

Herein, since the matrix B is a symmetric matrix from (Expression 34), the number of unknowns of the matrix B is six. Therefore, (Expression 35) can be solved if it is known that six or more points on the screen have an equal reflectance.

If the matrix B is known, the matrix A can be solved by applying the singular value decomposition to (Expression 34).

Moreover, the shape information and the light source information are obtained from (Expression 30) and (Expression 31).

Thus, the following information can be obtained by capturing three or more images of an object of which six or more pixels having an equal reflectance are known while changing the light source direction.

the object information: the normal vector and the reflectance of each point on the image; and the light source information: the light source vector and the radiance at an object-observing point.

Note however that the reflectance of the object and the radiance of the light source obtained by the above process are relative values, and obtaining absolute values requires known information other than the above, such as the reflectance being known for six or more points on the image.

Where the positional relationship between the light source and the imaging device is known, the distance or the three-dimensional position between the imaging device and the object may be obtained. This will now be described with reference to the drawings.

Figure 13:
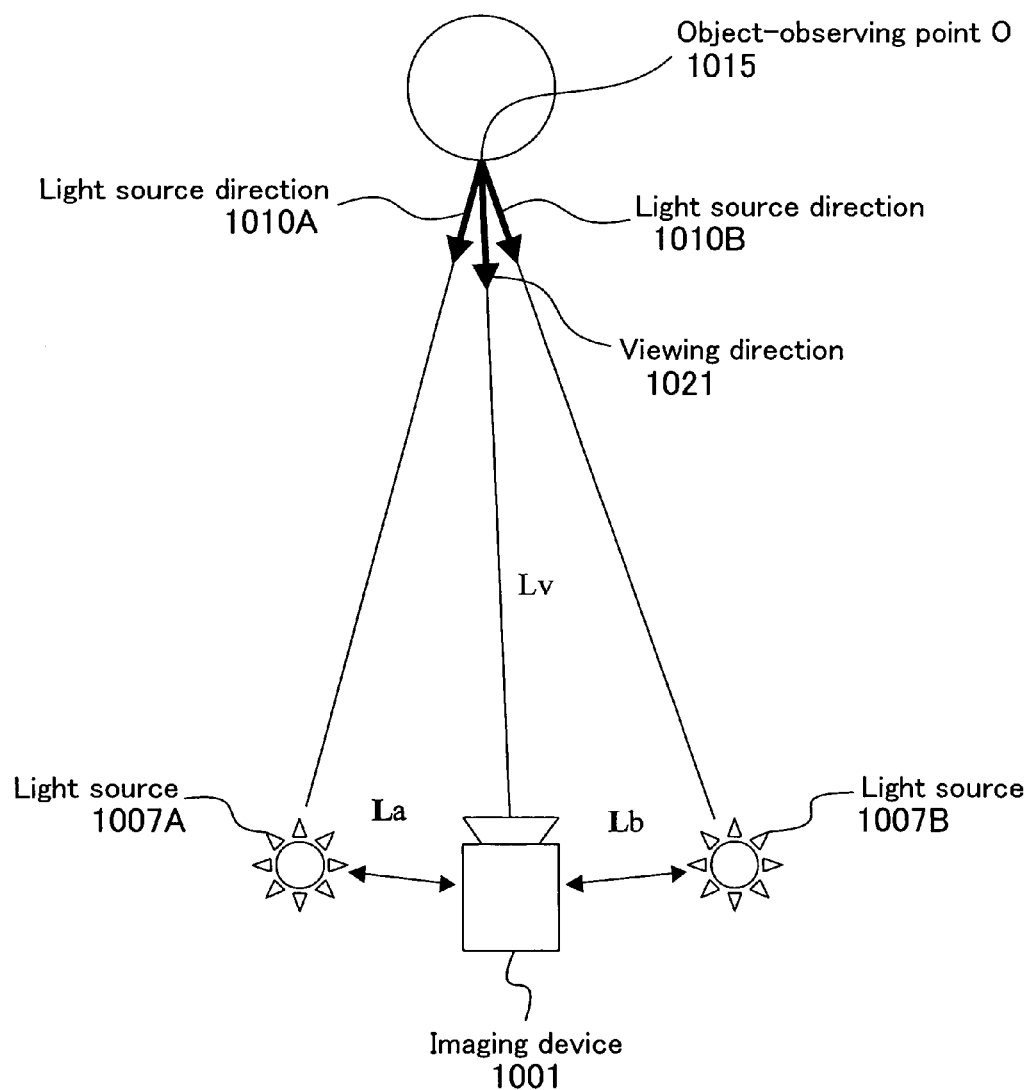
FIG. 13 is a schematic diagram illustrating a process of obtaining a distance and a three-dimensional position of an object by using a photometric stereo method.

FIG. 13 is a schematic diagram illustrating this process. In FIG. 13, 1001 denotes an imaging device, 1007A and 1007B light sources, 1015 the object-observing point O, 1010A and 1010B the light source directions of the light sources at the object-observing point O, and 1021 the viewing direction of the imaging device at the object-observing point O.

First, since the positional relationship between the light source and the imaging device is known, the three-dimensional positional relationships La and Lb between the imaging device 1001 and the light sources 1007A and 1007B are known. Assuming that the imaging device 1001 has been calibrated, the viewing direction 1021 of the imaging device 1001 is also known. Therefore, the object-observing point O 1015 exists on the viewing direction 1021. Moreover, by the photometric stereo method described above, the light source directions 1010A and 1010B of the light sources at the object-observing point O are known. Assuming that the distance Lv between the imaging device 1001 and the observing point O 1015 is positive (Lv>0), there exists only one observing point O that satisfies such a positional relationship. Therefore, the position of the observing point O 1015 can be known, and the distance Lv between the imaging device 1001 and the observing point O 1015 can be obtained.

In a case where a light source is provided in the imaging device, e.g., a flashlight of a digital camera, for example, the positional relationship between the light source and the imaging device can be obtained from the design information.

The shape information obtaining section 204 may obtain the surface normal direction of the object by using the polarization characteristics of the reflected light. This process will now be described with reference to FIG. 14.

Figure 14:
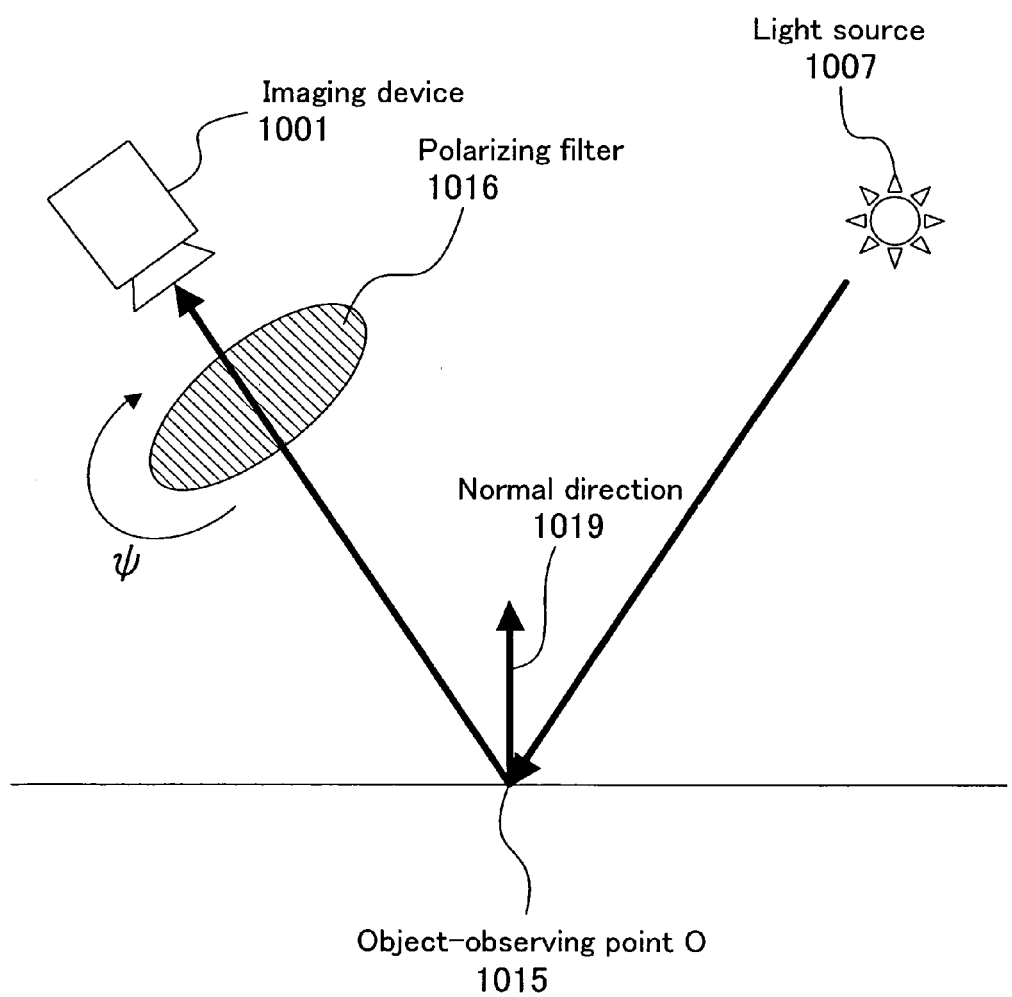
FIG. 14 is a schematic diagram illustrating a process of obtaining shape information by using polarization characteristics of reflected light.
Figure 15:
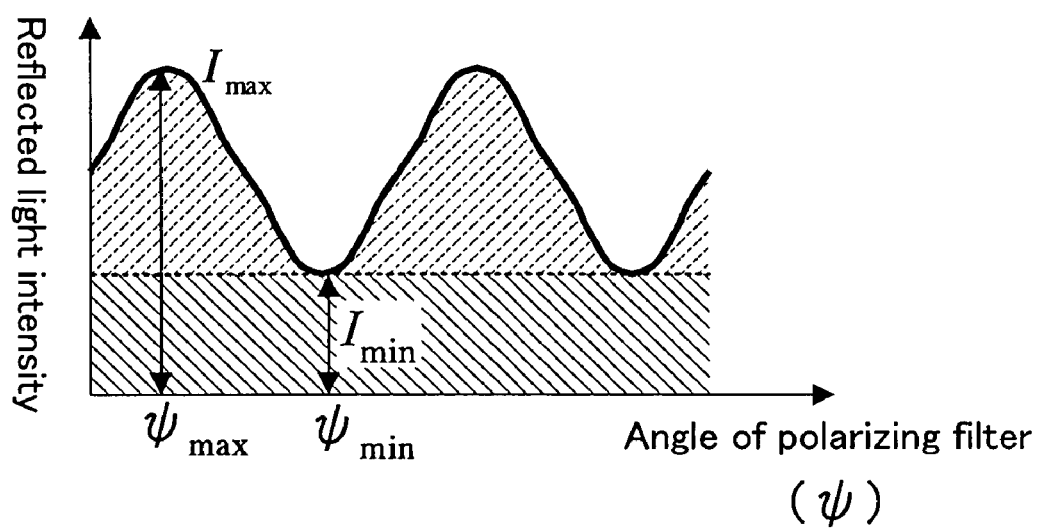
FIG. 15 is a graph showing variations in a reflected light intensity when a polarizing filter is rotated under natural light.

In FIG. 14, 1001 denotes an imaging device, 1007 a light source, 1015 an observing point O, 1016 a linear polarizing filter having a rotation mechanism (not shown) such as a motor, and 1019 the normal direction. In a state where the natural light is illuminating as the light source, if images are captured while rotating the polarizing filter 1016 by means of the rotation mechanism, the reflected light intensity will be a sin function of the period π, as shown in FIG. 15.

Consider the angles $\psi_{max}$ and $\psi_{min}$ of the polarizing filter at which the maximum value $I_{max}$ and the minimum value $I_{min}$ of the reflected light intensity are measured. Assuming that a plane containing the imaging device 1001, the light source 1007 and the observing point O 1015 is the plane of incidence and the specular reflection component is dominant for the object, it is known that $\psi_{max}$ is such a direction that the polarization direction of the polarizing filter 1016 is perpendicular to the plane of incidence and $\psi_{min}$ is such a direction that the polarization direction of the polarizing filter 1016 is parallel to the plane of incidence.

As described above, where the light source is a polarized light source, a reflected light component that has polarized characteristics is the specular reflection component reflected at the surface of the observing point O and a non-polarized component is the diffuse reflection component. Thus, it can be seen that the observing point O at which there occurs an intensity difference between the maximum value $I_{max}$ and the minimum value $I_{min}$ of the reflected light intensity is an observing point where the specular reflection component is strong, i.e., where light is regularly reflected (the normal direction 1019 of the observing point O is a bisector between the light source direction from the observing point O and the imaging device direction from the observing point O). Therefore, the normal direction 1019 also exists within the plane of incidence. Thus, by estimating $\psi_{max}$ or $\psi_{min}$, it can be assumed that the normal direction 1019 exists within the following plane:

a plane passing through the imaging device 1001 and containing the polarization direction $\psi_{min}$ of the polarizing filter 1016 (or the direction perpendicular to $\psi_{max}$)

Herein, $\psi_{max}$ or $\psi_{min}$ are estimated by performing the process of fitting a sin function.

Moreover, it is possible to estimate two different planes containing the normal direction 1019 by performing a similar process while changing the position of the imaging device 1001. The normal direction 1019 is estimated by obtaining the line of intersection between the two estimated planes. In this process, it is necessary to estimate the amount of movement of the imaging device 1001, but it can be done by using the 8-point method, or the like.

Of course, as with the diffuse reflection/specular reflection separating section 202, an imaging device having a different polarization direction for each pixel may be used.

Of course, the normal direction 1019 may be obtained by providing a plurality of imaging devices, instead of changing the position of the imaging device 1001.

The object surface normal information is obtained as described above by the photometric stereo method and the method using polarization characteristics. With a method such as the slit-ray projection method or the stereoscopic method, the three-dimensional position information of the object is obtained. The object surface normal information is information on the gradient of the three-dimensional position of the object within a small space, and these are both object shape information.

By the process described above, the shape information obtaining section 204 obtains the object surface normal information or the three-dimensional position information of the object, as shape information of the object.

The shadow removing section 205 estimates shadow areas in an image and performs the shadow removing process (step S405). While various methods have been proposed for such a shadow removing and shadow area estimating process, it is possible for example to utilize the fact that a shadow area has a low luminance value, and to estimate that a pixel whose luminance value is less than or equal to a threshold is a shadow area.

Where the three-dimensional shape information has been obtained by the shape information obtaining section 204, one may employ ray tracing, which is a rendering method being widely used in the field of computer graphics. While a rendering process is done by calculating coordinate data of the object or data relating to the environment such as the position of the light source or the point of view, a ray tracing process is done by tracing backwards light rays that reach the point of view. Thus, it is possible with ray tracing to calculate where a shadow is formed and the degree of the shadow.

Then, the resolutions of the diffuse reflection image and the specular reflection image separated by the diffuse reflection/specular reflection separating section 202 are separately increased by different methods. Specifically, the diffuse reflection image is subjected to a super-resolution process using an albedo image, and the specular reflection image is subjected to a super-resolution process not using an albedo image. First, the super-resolution process for the diffuse reflection image will be described.

<Super-Resolution Process for Diffuse Reflection Images>

An albedo estimating section 206 estimates the albedo of the object by using the diffuse reflection image separated by the diffuse reflection/specular reflection separating section 202, and produces an albedo image of the object (step S406). Since the albedo is not influenced by the light source information, it is possible to realize a process that is robust against light source variations by performing the process using an albedo image.

This process will now be described. From (Expression 25), the following relationship holds for the diffuse reflection component.

[Formula 37]

$$r_p = \frac{i_{df(p)}}{t_f \cdot \cos\theta_i} \qquad \text{(Expression 36)}$$

Herein, $\theta_i$ denotes the angle formed between the object normal vector and the light source vector. With the light source information estimating section 203 and the shape information obtaining section 204, the angle $\theta_i$ is known. Moreover, since the incident illuminance $t_f$ of the light source can also be estimated as will be described later, the albedo $r_p$ of the object is obtained from (Expression 36).

In this process, where $\cos\theta_i$ has a value less than or equal to zero, i.e., where it is an attached shadow, (Expression 36) becomes meaningless, as the albedo $r_p$ becomes negative or a division by zero occurs. However, since such pixels have been removed by the shadow removing section 205 described above, such a problem does not occur.

Of course, it is possible to use a pseudo-albedo $r_p'$ obtained by normalizing the albedo with the maximum luminance value of the specular reflection image by the following expression, instead of obtaining the albedo of the object.

[Formula 38]

$$r_p' = \frac{i_{df(p)}}{i_{sf\_max} \cdot \cos\theta_i}$$

Figure 16:
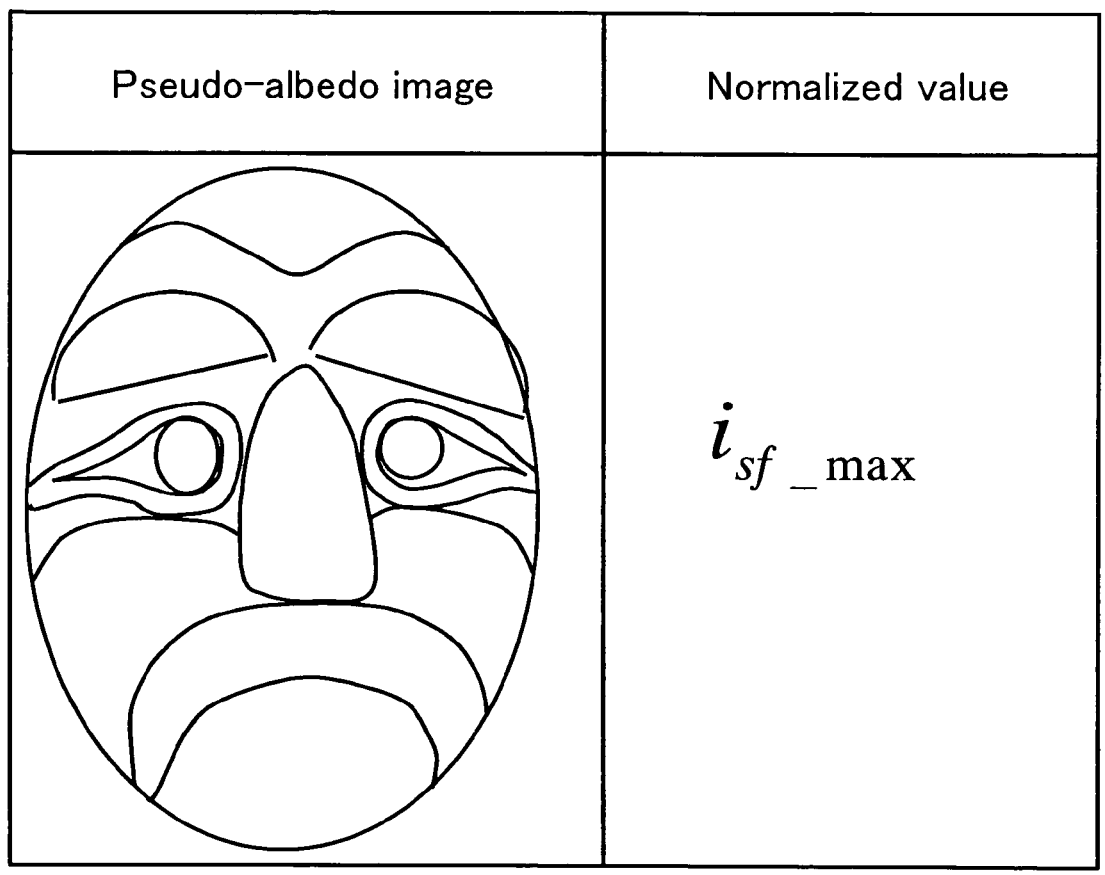
FIG. 16 is a diagram showing data stored in a memory where a pseudo-albedo is used.

Herein, $i_{sf\_max}$ denotes the maximum luminance value of the specular reflection image. Such a pseudo-albedo is effective in cases where the radiance (illuminance) of the light source cannot be obtained by the light source information estimating section 203. Where a pseudo-albedo image is used, the maximum luminance value $i_{sf\_max}$ of the specular reflection image used for the normalization is stored in a memory. FIG. 16 is a diagram showing data to be stored in the memory in a case where the albedo estimating section 206 uses a pseudo-albedo. The produced pseudo-albedo images and the maximum luminance value $i_{sf\_max}$ of the specular reflection image used for the normalization are stored.

Assuming that the specular reflection parameter is uniform over a wide area of the object and there exist normals of various directions to the object surface, there exists a regular reflection pixel that causes regular reflection as long as the light source exists at such a position that it illuminates the object for the camera. Thus, the maximum luminance value $i_{sf\_max}$ of the specular reflection image is the luminance value of the regular reflection pixel.

Where the reflection characteristics are uniform and the viewing direction 1021 is substantially uniform, the ratio between the luminance value of the regular reflection pixel at one light source position and that of the regular reflection pixel at another light source position is substantially equal to the flight source radiance ratio between these light sources. Therefore, there remains the influence of the light source radiance if the luminance value $i_{df(p)}$ of the diffuse reflection image is simply divided by $\theta_i$. However, by using a pseudo-albedo image obtained by further normalizing with the maximum luminance value $i_{sf\_max}$ of the specular reflection image, which is the luminance value of the regular reflection pixel, it is possible to produce a diffuse component image that is not influenced by the light source even in a case where the radiance of the light source cannot be obtained.

It is also possible to produce a pseudo-albedo by normalizing with the maximum luminance value of the diffuse reflection image or the maximum luminance value of the input image, instead of normalizing with the maximum luminance value $i_{sf\_max}$ of the specular reflection image.

Next, the super-resolution process for an albedo image obtained as described above will be described.

The albedo super-resolution section 207 performs the super-resolution of the albedo image produced by the albedo estimating section 206 by using the albedo DB 208 storing a conversion rule for converting a low-resolution albedo image to a high-resolution albedo image (step S407). This process will now be described in detail.

As described above, an albedo image is an image representing the reflectance characteristics that are inherent to the object and are not dependent on optical phenomena such as specular reflection of light and shading. Since object information is indispensable for the super-resolution process herein, the process is based on learning the object in advance. Herein, a super-resolution process based on the texton (the texture feature quantity of an image) is used.

Figure 17:
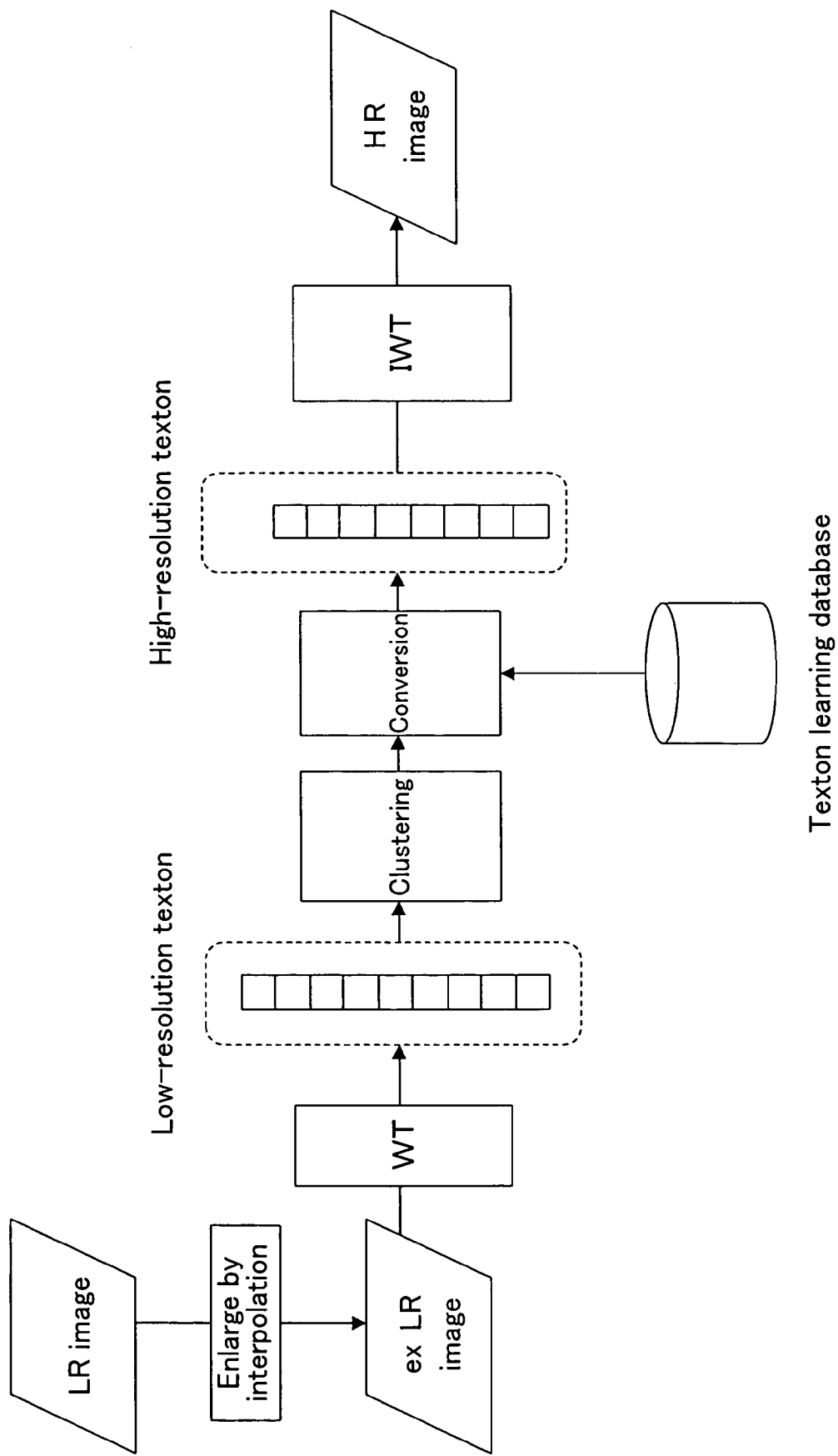
FIG. 17 is a schematic diagram showing the concept of a texton-based super-resolution process.

FIG. 17 is a diagram showing the concept of the texton-based super-resolution process. The low-resolution image (the LR image; the number of pixels: N×N) input upon execution of the process is enlarged by interpolation by a factor of M×M so that the number of pixels is matched with the target number of pixels. The image whose number of pixels is MN×MN is referred to as an "exLR image". The high-frequency component of the image is lost in the exLR image, and the exLR image will be a blurred image. Sharpening this blurred image is nothing but a super-resolution process.

Then, the luminance value of the exLR image is transformed for each pixel to the T-dimensional texton based on multiple resolutions by using the multiple-resolution transformation WT. This transformation uses a process such as a wavelet transformation or a pyramid structure decomposition. As a result, a total of MN×MN T-dimensional texton vectors are produced for each pixel of the exLR image. Then, in order to improve the generality, clustering is performed on the texton vectors to selectively produce L input representative texton vectors. These L texton vectors are subjected to a transformation based on database information learned in advance to produce a T-dimensional resolution-increased texton vector. The transformation uses a table lookup process, and a linear or non-linear transformation in the T-dimensional multidimensional feature vector space. The resolution-increased texton vector is converted back to image luminance values by an inverse transformation IWT such as an inverse wavelet transformation or a pyramid structure reconstruction, thus forming a high-resolution image (the HR image).

Since a very large amount of time is required for the searching in the process of clustering MN×MN T-dimensional texton vectors and for the table lookup process, it has been difficult with this process to realize a high processing speed for videos, and the like. In view of this, the following improvements have been introduced: 1) performing the clustering process on the LR image; and 2) replacing the table lookup process with a linear matrix transformation. With this process, by using the fact that one pixel of an LR image corresponds to a cell of M×M pixels of an HR image, the linear matrix transformation from T-dimensional to T-dimensional can be performed by cells, thereby maintaining the spatial continuity within a cell. The linear matrix to be used is optimally selected based on the result of clustering. In a case where the discontinuity at the cell boundary imposes a problem, there may be added a process such as partially overlapping matrix processing unit blocks with one another.

Figure 18:
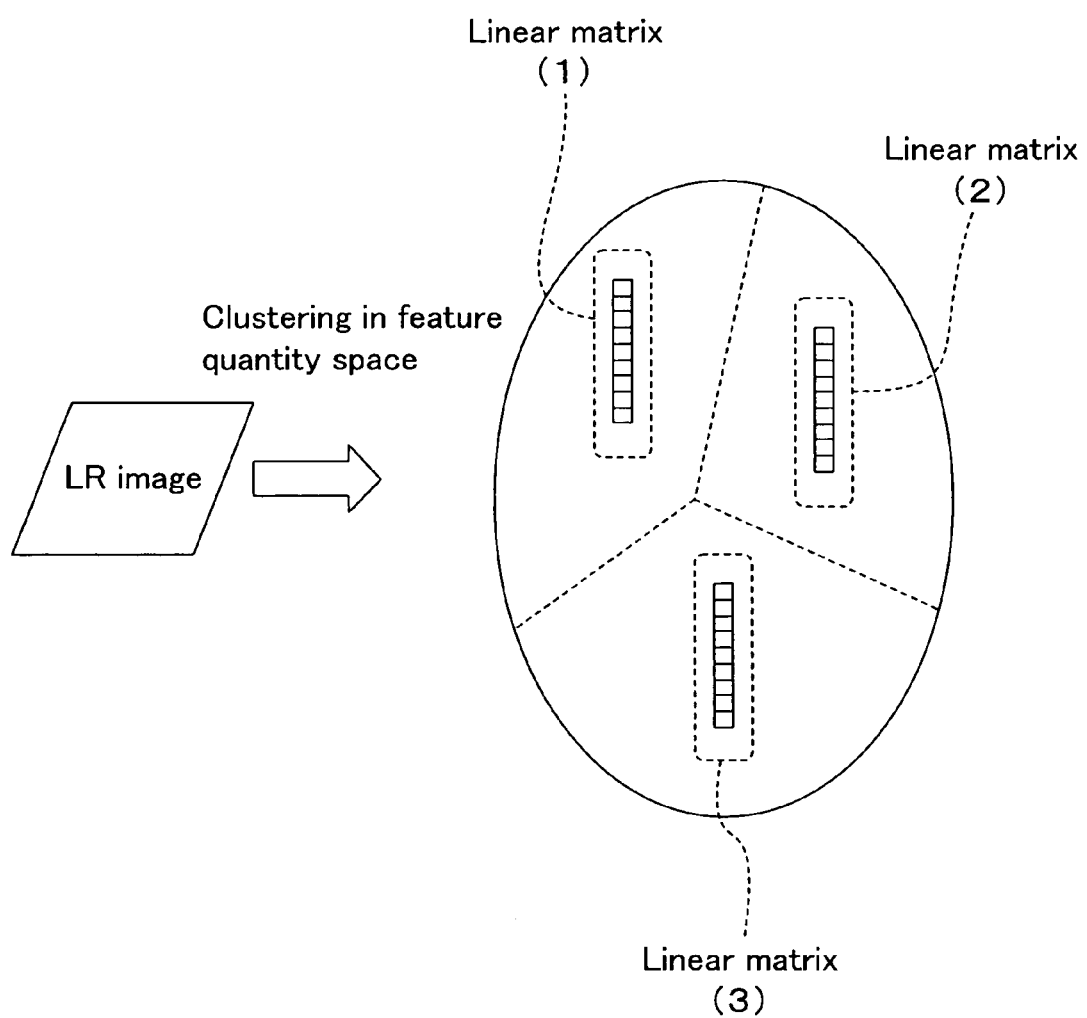
FIG. 18 is a conceptual diagram illustrating a texton-based super-resolution process using a linear matrix transformation.

FIG. 18 schematically illustrates the improvement above. The LR image is WT-transformed into L (herein, L=3) representative feature vectors in the T-dimensional feature quantity space. Each feature vector is assigned a different linear matrix. This, when stored, is nothing but a resolution-increasing database.

The details of the image processing process will now be described with reference to an example where a 4×4 resolution-increasing process is performed on a low-resolution image of N=32 and M=4, i.e., 32×32 pixels. It is assumed that while the albedo image is an RGB color image, the color image is handled as independent color component images obtained by converting RGB to luminance/color difference (YCrCB). Normally, no awkwardness is introduced by using a high resolution only for the luminance Y component while the color component is the low-resolution color difference signal as it is, for a factor of about 2×2. For 4×4 or higher, however, it is necessary to also increase the resolution of the color signal, and the components are therefore treated similarly. A process for only one component of a color image will now be described.

(Learning Process)

Figure 19:
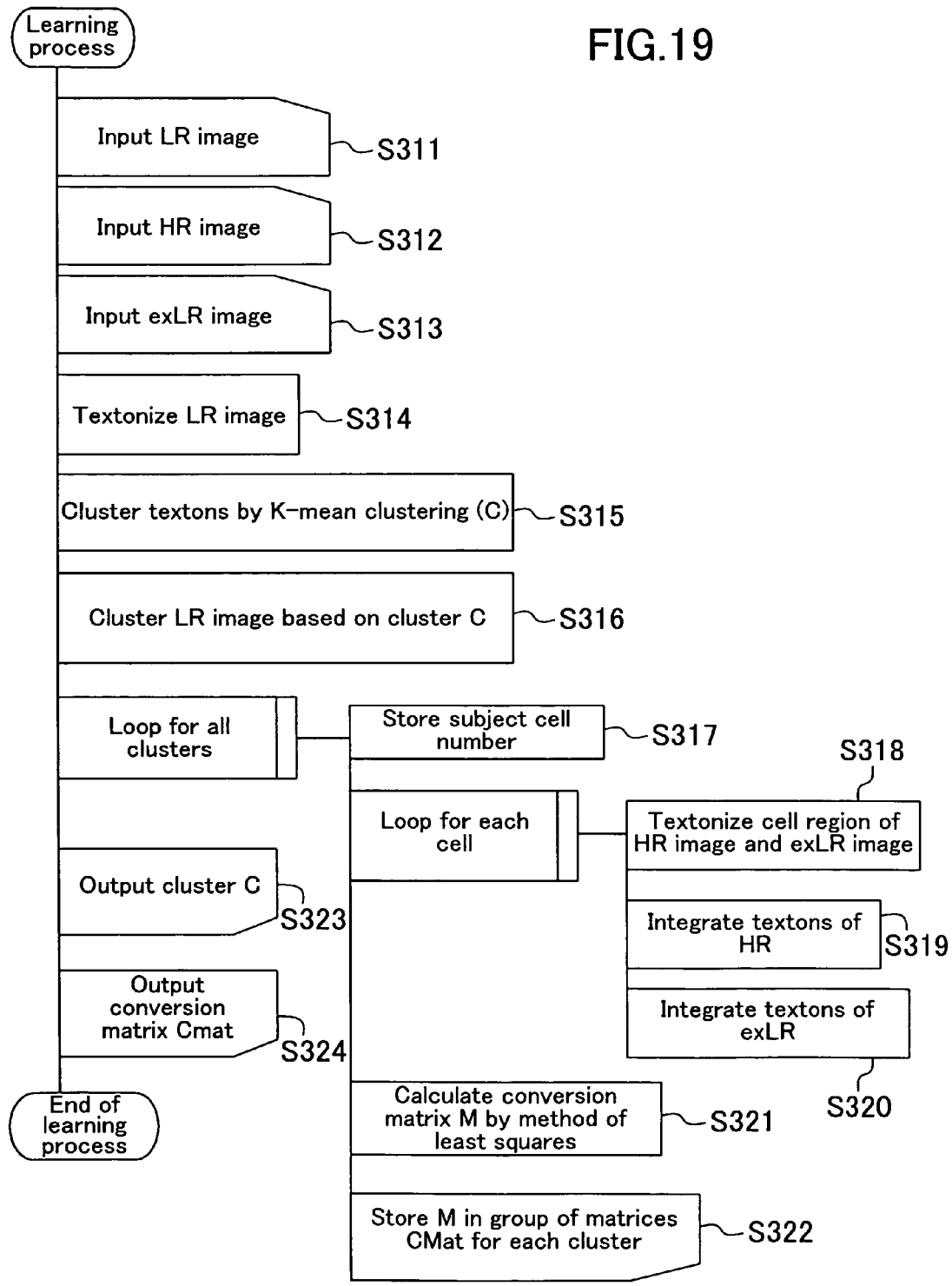
FIG. 19 is a PAD diagram showing the flow of a learning process in a texton-based super-resolution process.
Figure 20:
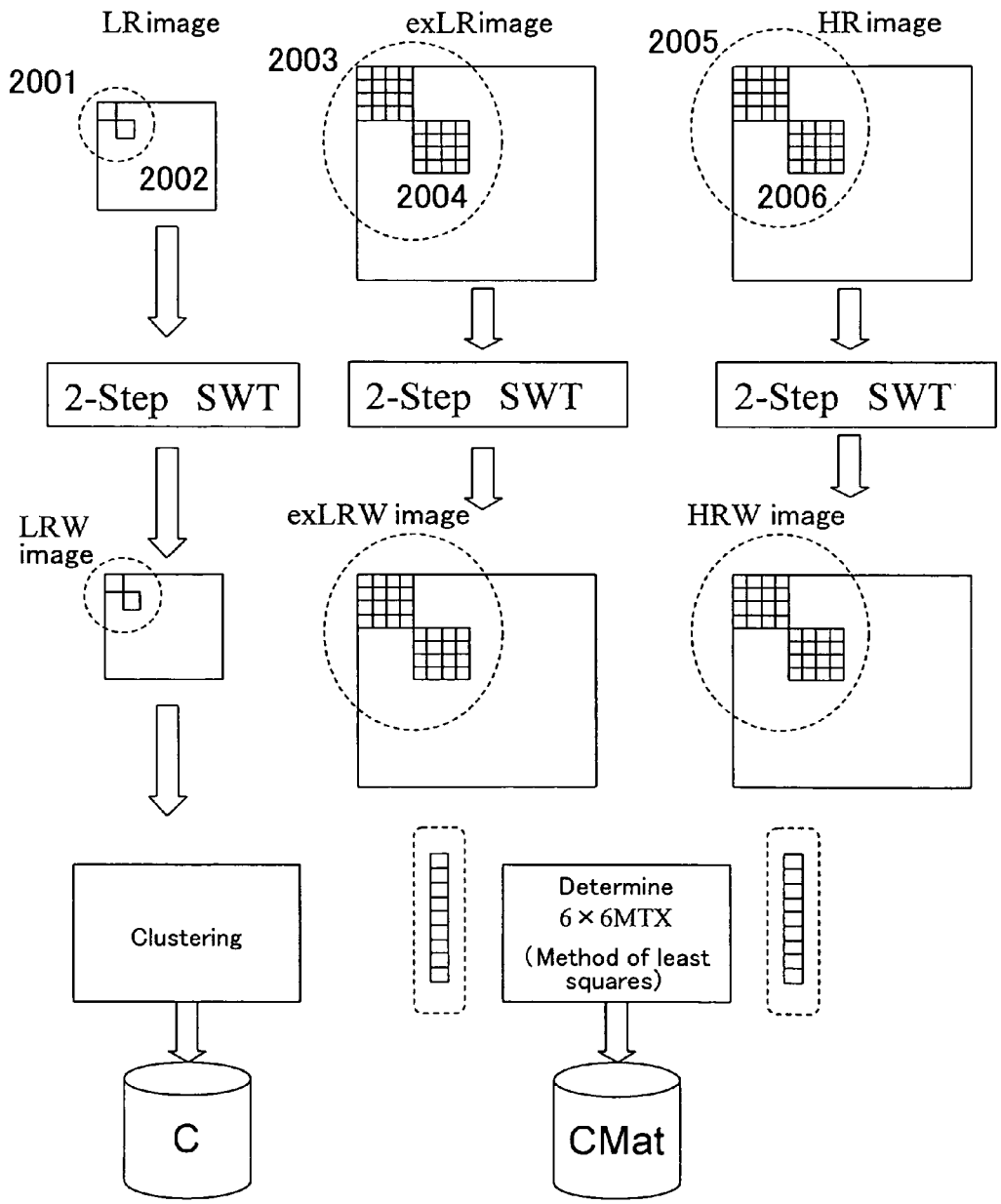
FIG. 20 is a schematic diagram illustrating a learning process in a texton-based super-resolution process.

FIG. 19 is a PAD diagram illustrating the flow of the learning process, and FIG. 20 is a diagram illustrating the relationship between a pixel to be processed and a cell to be processed in the processed image. The process will now be described referring to FIGS. 19 and 20 alternately.

First, in S311 to S313, the low-resolution image (the LR image), the high-resolution image (the HR image), and the enlarged image (the exLR image) being a low-resolution image are input. These images are all produced from the HR image, and it is ensured that there is no pixel shifting at the time of image capturing. Bicubic interpolation is used for producing the exLR image from the LR image. In FIG. 20, three different images are provided, i.e., the HR image (the number of pixels: 128×128), the LR image (the number of pixels: 32×32), and the exLR image (the number of pixels: 128×128) that is obtained by matching the LR image to the HR image in terms only of the number of pixels. The LR image is an albedo image having the same resolution as the original image captured by the image-capturing section 201, and the HR image is an albedo image having a higher resolution than the original image captured by the image-capturing section 201.

In S314, the LR image is textonized. Specifically, a two-dimensional discrete stationary wavelet transformation (SWT transformation) using a Haar basis is performed. Assuming that the number of stages of the SWT transformation is two (2-step), there is produced a six-dimensional LRW image (the number of pixels: 32×32=1024). Naturally, a 2-step two-dimensional discrete stationary wavelet transformation yields a seven-dimensional feature vector. However, the LL component image of the lowest frequency is near the average luminance information of the image, and in order to store this, only the remaining six components are used.

In S315, a total of 1024 six-dimensional vectors of the textonized LRW image are clustered down to Cmax vectors. Herein, a K-means clustering is used to cluster them down to Cmax=512, for example. The collection of the resulting 512 texton vectors is referred to as the "cluster C". All of the 1024 textons may be used without clustering.

In S316, the process determines LR pixels identified to be the same cluster as the cluster C. Specifically, the pixel values of the LR image are replaced by the texton numbers of the cluster C.

In S317, while repeatedly performing the process on all textons of the cluster C, the process searches for a pixel cell of exLR and a pixel cell of the HR image corresponding to the subject texton, and stores the subject cell number. This searching process needs to be performed only for the number of pixels of the LR image, thus providing a significant reduction in the searching time in processes with high factors.

The relationship between a pixel of the LR image, a pixel cell of the exLR image and a pixel cell of the HR image will be described with reference to FIG. 20. In FIG. 20, assume that two pixels 2001 and 2002 on the LR image are identified to be the same cluster as C (cluster number: Ci=0). Then, it can be assumed that they correspond to pixel cells 2003 and 2004 on the exLR image, which is obtained by simply enlarging the image while maintaining the positional relationship and that they correspond to pixels 2005 and 2006 on the HR image. Then, the numbers of the two cell positions are stored as having the subject texton. The number of pixels included in one pixel cell is equal to the factor of magnification, i.e., 4×4=16.

Then, in S318, these groups of pixel cells are textonized by pairs of exLR images and HR images. Specifically, a two-dimensional discrete stationary wavelet transformation is performed, thereby producing an exLRW image and an HRW image.

In S319 and S320, pairs of textons obtained from the HRW image and the exLRW image are integrated each in the form of a matrix. Each one is in the form of a 6×Data_num matrix. Herein, Data_num is (the number of pixels in one cell)×(the number of cells searched), and in the above example where Ci=0, it is 16×2=32 because two cells are searched.

In S321, the process calculates, by the method of least squares, a 6×6 matrix M from a total of 2×4×4=128 feature vectors belonging to these integrated matrices, and the calculated matrix is stored in the database CMat(K) together with the cluster number K=0 in S322. Where the exLR and HR texton matrices integrated in S319 and S320 are denoted as Lf and Hf (size: 6×Data_num), respectively, and the matrix to be obtained as M(6×6), the method of least squares in S322 can be performed as follows.

[Formula 39]

$$M = Hf \cdot Lf^T (Lf \cdot Lf^T)^{-1}$$

Then, a similar process is repeated for the cluster number K=1, and this is repeated until K=511. Thus, CMat is a group of 6×6 conversion matrices each defined for one cluster number.

Finally, in S323 and S324, the cluster C used and the conversion matrix CMat learned are output. Thus, the obtained cluster C and the learned conversion matrix CMat are stored in the albedo DB 208, as a conversion rule for converting a low-resolution albedo image to a high-resolution albedo image.

Figure 21:
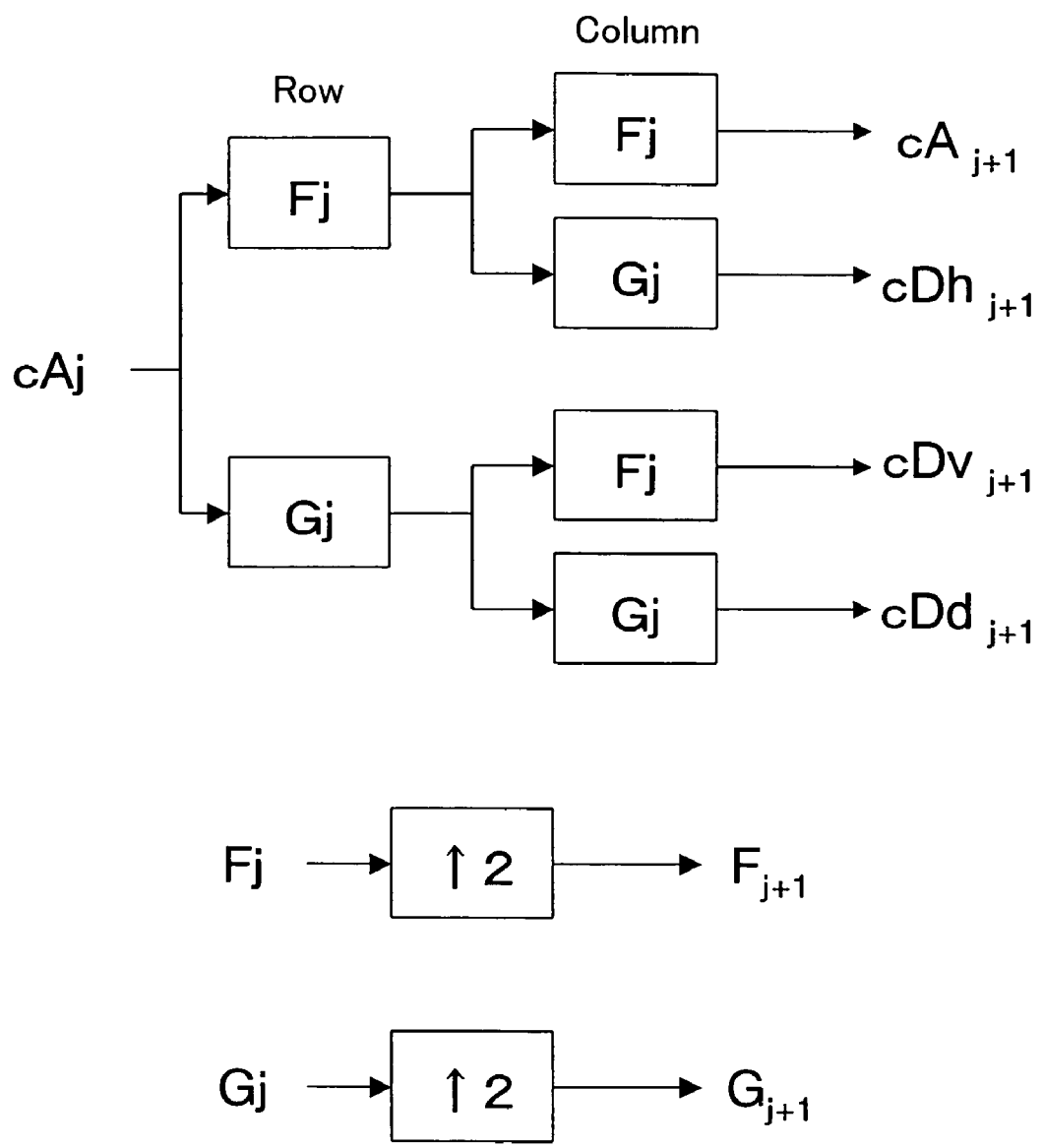
FIG. 21 is a diagram showing a process of a two-dimensional discrete stationary wavelet transformation.

FIG. 21 is a diagram showing the process of the two-dimensional discrete stationary wavelet transformation. With a normal wavelet transformation, the image shrinks as the stage of decomposition progresses while the filter bank configuration remains the same. However, with a two-dimensional discrete stationary wavelet transformation, the transformed image size remains unchanged as the stage of decomposition progresses, and the two filters, i.e., the scaling function F and the wavelet function G, are upsampled (↑) and elongated by a power of 2, thus realizing a multiple-resolution analysis. With the Haar basis, the specific values of F and G and how the upsampling is performed are as shown in Table 1.

TABLE 1

| | F | G |
|---|---|---|
| 1-STEP (j = 0) | $\left(\frac{1}{\sqrt{2}} \ \frac{1}{\sqrt{2}}\right)$ | $\left(-\frac{1}{\sqrt{2}} \ \frac{1}{\sqrt{2}}\right)$ |
| 2-STEP (j = 1) | $\left(\frac{1}{\sqrt{2}} \ 0 \ \frac{1}{\sqrt{2}} \ 0\right)$ | $\left(-\frac{1}{\sqrt{2}} \ 0 \ \frac{1}{\sqrt{2}} \ 0\right)$ |

Where the cA image being the LL component is subjected to wavelet decomposition one stage further, four different images are produced as shown in FIG. 21 by alternately one-dimensionally convoluting the F and G filters: 1) F in row direction and F in column direction: cA image (LL component); 2) F in row direction and G in column direction: Dh image (LH component); 3) G in row direction and F in column direction: cDv image (HL component); and 4) G in row direction and G in column direction: cDd image (HH component).

Figure 22:
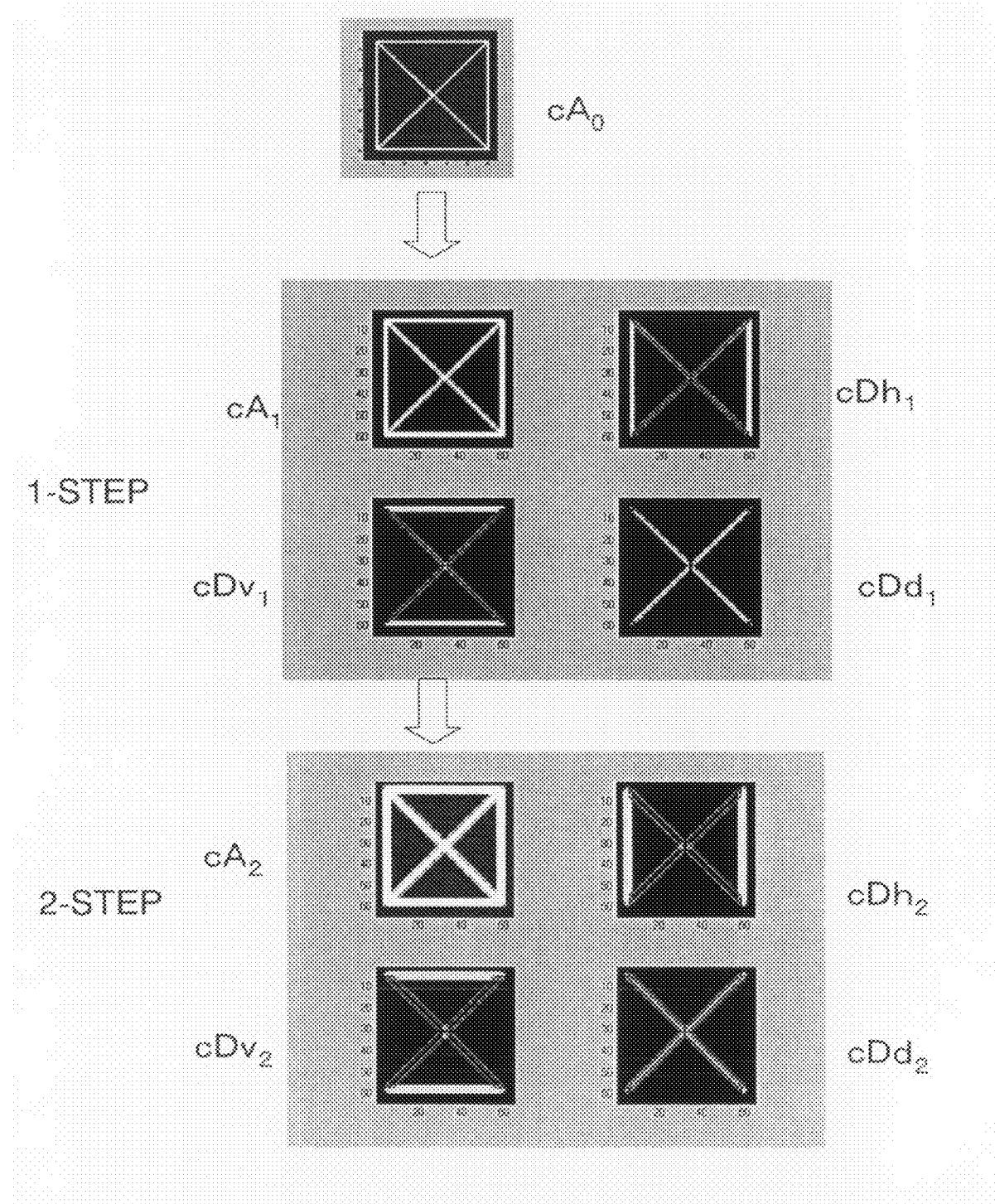
FIG. 22 shows an exemplary image result when a two-dimensional discrete stationary wavelet transformation is performed on a test image.

FIG. 22 shows an exemplary resulting image obtained when performing a two-dimensional discrete stationary wavelet transformation on a test image. A texton vector is what is obtained by arranging corresponding values for each pixel of 1-STEP and 2-STEP transformed images of these wavelets, and is a seven-dimensional vector as follows.

[Formula 40]

(cDh1,cDv1,cDd1,cDh2,cDv2,cDd2,cA2)

Note however that the high-resolution transformation is performed by using only the six-dimensional vector portion, except for cA2 being the 2-STEP LL component, while the cA2 component is stored.

The number of steps of the wavelet transformation is set to 2-STEP both in S314 and in S318. The larger the number of steps is, the more general features of the image can be represented by textons. While the number of steps is variable in the present invention, 2-STEP is used in S314 for clustering the LR image because it may not be possible with 1-STEP to obtain sufficient information for the surrounding pixels. In S318 for producing textons used for increasing the resolution of the exLR image, it has been experimentally confirmed that a better image can be obtained with 3-STEP than with 2-STEP for a factor of 8×8. Thus, it is preferred to determine the number of steps in view of the factor of magnification.

Of course, in a case where a pseudo-albedo image, but not an albedo image, is estimated by the albedo estimating section 206, the learning process described above is performed by using the pseudo-albedo image. As described above, a pseudo-albedo is a diffuse component image that is not influenced by the light source, and it is therefore possible to produce a conversion rule that is not influenced by light source variations. Moreover, in the leaning process, a predetermined value used for normalization in producing a pseudo-albedo, i.e., the maximum luminance value $i_{sf\_max}$ of the specular reflection image, does not need to be stored.

(Super-Resolution Process)

Figure 23:
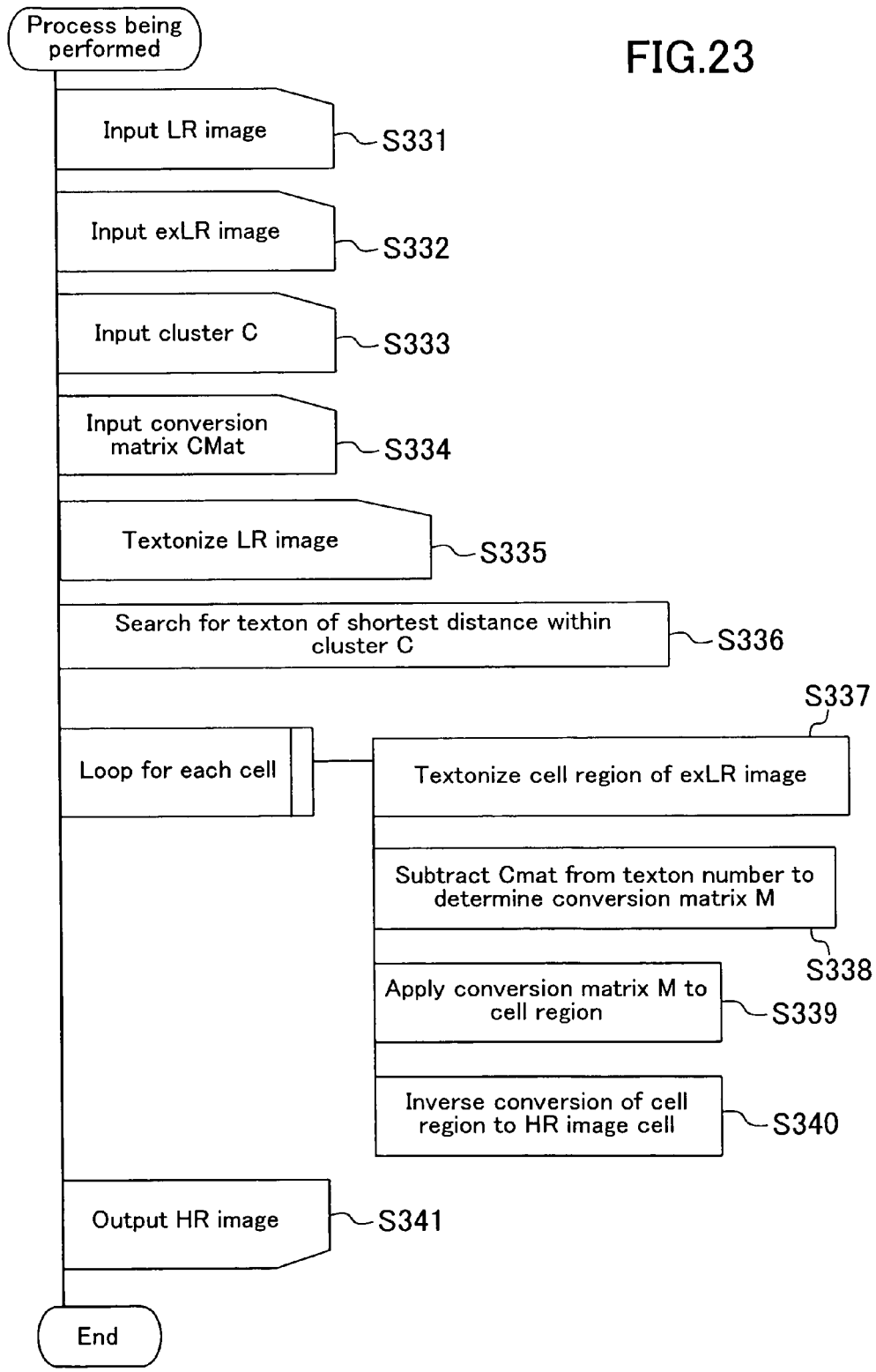
FIG. 23 is a PAD diagram showing the flow of a texton-based super-resolution process being performed.
Figure 24:
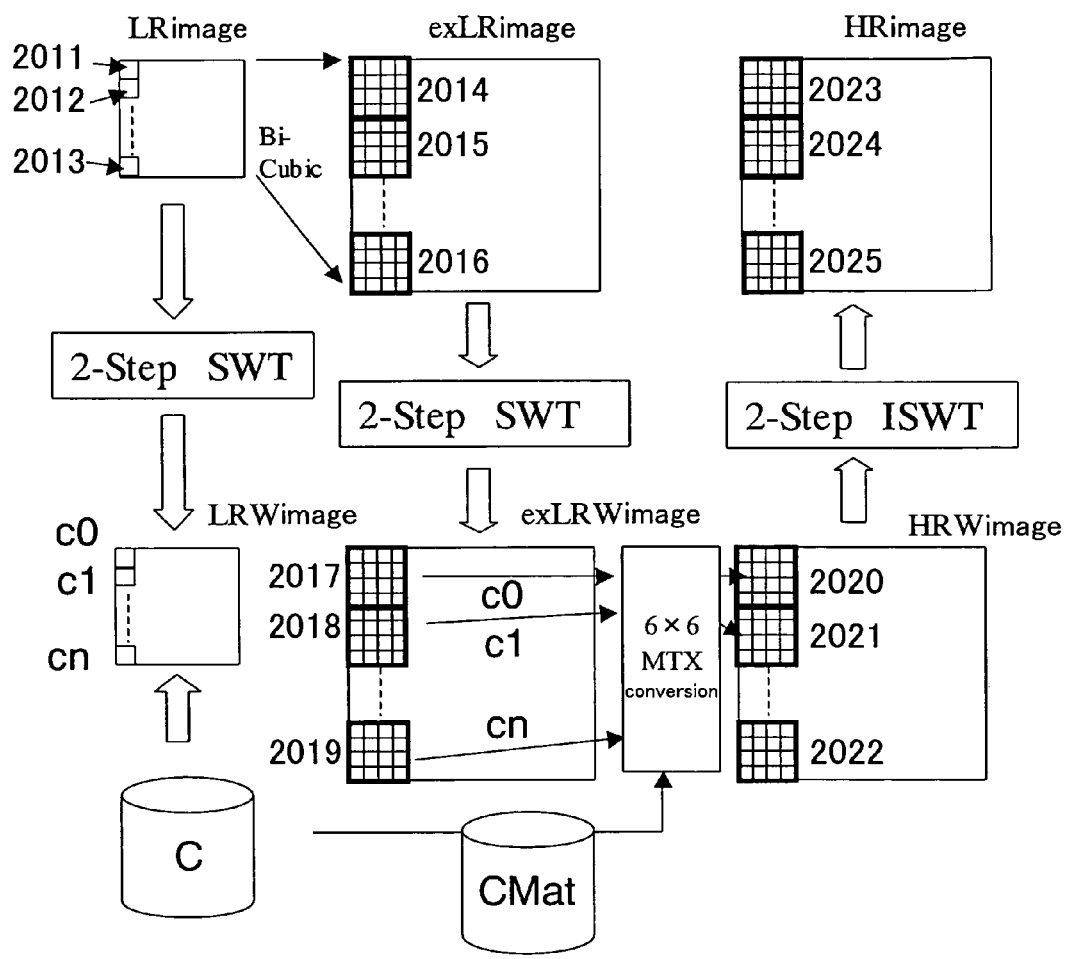
FIG. 24 is a schematic diagram illustrating a texton-based super-resolution process being performed.

FIG. 23 is a PAD diagram illustrating the flow of the process being performed, and FIG. 24 is a diagram showing the relationship of pixel cells when the process is performed.

First, in S331 and S332, an LR image and an exLR image obtained by enlarging the LR image are input. As in the learning process, the number of pixels of the LR image is 32×32 and the number of pixels of the exLR image is 128×128. The exLR image is produced by a bicubic method as is the method for producing the exLR image, which is an image learned, in S313 of FIG. 19.

Then, in S333 and S334, the cluster C obtained during the learning process and the conversion matrix CMat are read out and input from the albedo DB 208.

In S335, the LR image is textonized. Specifically, a two-dimensional discrete stationary wavelet transformation (SWT transformation) using a Haar basis is performed, as shown in FIG. 24. Assuming that the number of stages of the SWT transformation is two (2-step), there is produced a six-dimensional LRW image (the number of pixels: 32×32=1024). Naturally, a 2-step two-dimensional discrete stationary wavelet transformation yields a seven-dimensional feature vector. However, the LL component image of the lowest frequency is near the average luminance information of the image, and in order to store this, only the remaining six components are used.

Then, in S336, a texton vector of the shortest distance within the cluster C (Cmax textons) is searched for each texton to obtain the texton number (Ci). This is equivalent to texton numbers of C0, C1, . . . , Cn being assigned to pixels 2011, 2012, . . . , 2013 along one line of the LR image in FIG. 24.

Then, the process proceeds to S337. From this step onward, the process is to repeatedly process each cell of the HR image from one scanning line to another. Specifically, in FIG. 24, as cells 2014, 2015, . . . , 2016 of the exLR image are processed, the resolutions of corresponding cells 2023, 2024, . . . , 2025 of the HR image are successively increased.

In S337, the subject cell region of the exLR image is textonized. Specifically, a two-dimensional discrete stationary wavelet transformation is performed to produce an exLRW image. Cells 2017, 2018, . . . , 2019, etc., are produced.

In S338, the conversion matrix CMat is subtracted from the texton number to thereby determine the conversion matrix M in the subject cell. The process is performed as shown in FIG. 24. In the LRW image, texton numbers are already assigned, i.e., the pixel 2011=C0, the pixel 2012=C1, . . . , the pixel 2013=Cn. With this being applied to the cells 2017, 2018, . . . , 2019 of the exLRW image for which the positional relationship is stored, a separate 6×6 conversion matrix M can be selected from Mat using C0, C1, . . . , Cn as texton numbers for the cells.

In S339, the conversion matrix M is applied to each cell. This can be done by applying the following expression for all of the textons LTi (i=1–16) in the cell.

[Formula 41]

$$HT_i = M \cdot LT_i$$

By repeating this process, cells 2020, 2021, . . . , 2022 of the HRW image are produced from the cells 2017, 2018, . . . , 2019 of the exLRW image, respectively.

Then, the seven-dimensional texton is produced by adding the LL component of 2-STEP of the exLRW image to the six-dimensional texton in these resolution-increased cells.

In S340, the seven-dimensional texton in each cell is subjected to an inverse SWT transformation, thus converting the textons to an image. This is repeated for all the cells of the exLR image.

Figure 25:
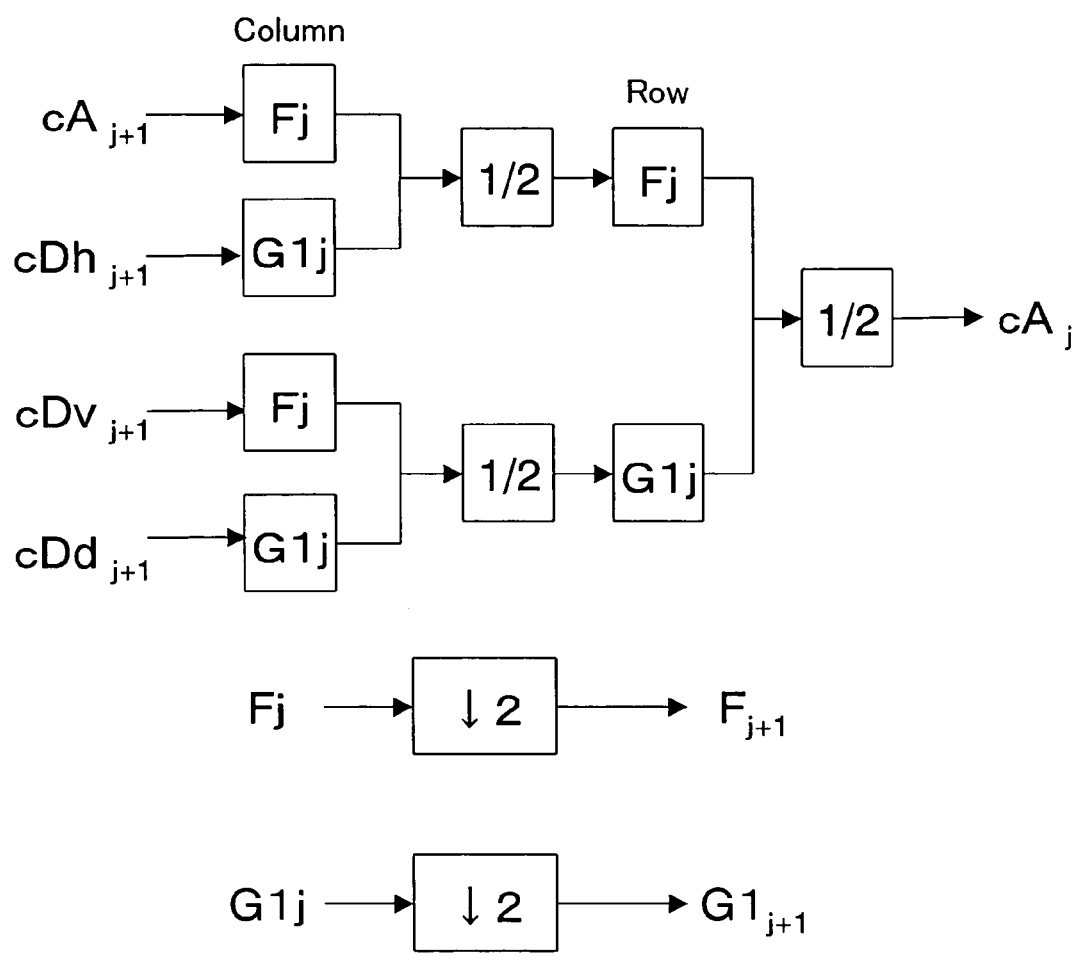
FIG. 25 is a diagram showing a process of a two-dimensional discrete stationary inverse wavelet transformation.

The inverse SWT (ISWT) transformation can be realized by the signal flow shown in FIG. 25. This is substantially the same representation as FIG. 21. With a normal wavelet inverse transformation, the image is enlarged as the stage of decomposition progresses while the filter bank configuration remains the same. In contrast, with the present inverse transformation, the transformed image size remains unchanged as the stage of decomposition progresses, and the two filters, i.e., the scaling function F and the wavelet function G1, are downsampled ($\downarrow$) and shortened by a power of 2, thus realizing a multiple-resolution analysis. With the Haar basis, the specific values of F and G1 and how the downsampling is performed are as shown in Table 2.

TABLE 2

| | F | G1 |
|---|---|---|
| 1-STEP (j = 0) | $\left(\frac{1}{\sqrt{2}}\ 0\ \frac{1}{\sqrt{2}}\ 0\right)$ | $\left(\frac{1}{\sqrt{2}}\ 0\ -\frac{1}{\sqrt{2}}\ 0\right)$ |
| 2-STEP (j = 1) | $\left(\frac{1}{\sqrt{2}}\ \frac{1}{\sqrt{2}}\right)$ | $\left(\frac{1}{\sqrt{2}}\ -\frac{1}{\sqrt{2}}\right)$ |

The resolution of one component of an albedo image is increased as described above. By performing this process for the entire albedo image, a resolution-increased albedo image is synthesized.

In this process, the image may be normalized so that the process can be performed even if the size, orientation, direction, etc., of the object included in the albedo image change. It can be assumed that a texton-based super-resolution process may not exhibit a sufficient super-resolution precision when the size or the orientation in the albedo image are different from those of the learned data. In view of this, a plurality of pairs of albedo images are provided to solve this problem. Specifically, the process synthesizes images obtained by rotating an albedo image by 30 degrees, and the super-resolution process is performed on all of the images, so as to accommodate changes in the orientation or the direction. In such a case, in the process of searching for a texton of the shortest distance in step S336 of FIG. 23 being a PAD diagram for "Super-resolution Process" as described above, the process may search for a texton of the shortest distance for each of the textons of a plurality of LR images obtained from images resulting from the rotation process to thereby search for one with the shortest distance, thus obtaining the texton number (Ci).

Moreover, in order to accommodate changes in size, the process may synthesize albedo images obtained while varying the image size.

Alternatively, based on the actual size, an enlarging/shrinking process may be performed so that a 5 cm×5 cm image is always turned to an 8×8 pixels, for example, and textons may be produced for such an image. Since the size of the object is known by the shape information obtaining section 204, the size variations may be accommodated by producing textons from images of the same size for "Learning Process" and for "Super-resolution Process".

Alternatively, a plurality of pairs of textons may be produced while rotating the albedo image "Learning Process" instead of rotating the albedo image "Super-resolution Process", and the cluster C and the learned conversion matrix CMat may be stored in the albedo DB 208.

Moreover, the process may estimate what the input object is, and perform an orientation estimation to estimate how the estimated object is rotating. Such a process can be realized by widely-used image recognition techniques. For example, this can be done by placing a tag such as RFID on the object so that the process can recognize the object by recognizing the tag information and further estimate the shape information of the object from the tag information, whereby an orientation estimation is performed based on the image or the shape information of the object (see, for example, Japanese Laid-Open Patent Publication No. 2005-346348).

<Super-Resolution Process for Specular Reflection Images>

Next, a super-resolution process for specular reflection images will be described. Herein, the process of increasing the resolution of estimated parameters, and the process of increasing the resolution of the shape information are used.

Using the object surface normal information obtained by the shape information obtaining section 204 and the diffuse reflection image and the specular reflection image separated by the diffuse reflection/specular reflection separating section 202, the parameter estimating section 210 estimates parameters representing the object (S408). Herein, a method using the Cook-Torrance model, which is widely used in the field of computer graphics, will be described.

In the Cook-Torrance model, a specular reflection image is modeled as follows.

[Formula 42]

$$I_s = K_s \rho_{s,\lambda} \qquad \text{(Expression 37)}$$

[Formula 43]

$$K_s = \frac{1}{\pi} E_i k_s \qquad \text{(Expression 38)}$$

[Formula 44]

$$\rho_{s,\lambda} = \frac{F_\lambda DG}{n \cdot V} \qquad \text{(Expression 39)}$$

[Formula 45]

$$F_\lambda = \frac{1}{2} \frac{(g_\lambda - c)^2}{(g_\lambda + c)^2}\left(1 + \frac{[c(g_\lambda + c) - 1]^2}{[c(g_\lambda - c) + 1]^2}\right) \qquad \text{(Expression 40)}$$

[Formula 46]

$$c = L \cdot H \qquad \text{(Expression 41)}$$

[Formula 47]

$$g_\lambda = \sqrt{n_\lambda^2 - 1 + c^2} \qquad \text{(Expression 42)}$$

[Formula 48]

$$D = \frac{1}{4m^2\cos^4\beta}\exp\left\{-\frac{\tan^2\beta}{m^2}\right\} \qquad \text{(Expression 43)}$$

[Formula 49]

$$G = \min\left\{1, \frac{2(n \cdot H)(n \cdot V)}{(V \cdot H)}, \frac{2(n \cdot H)(n \cdot L)}{(V \cdot H)}\right\} \qquad \text{(Expression 44)}$$

-continued

[Formula 50]

$$E_i = \sum_{j=0}^{n-1} I_j n \cdot L_j \quad \text{(Expression 45)}$$

Herein, $E_i$ denotes the incident illuminance, $\rho_{s,\lambda}$ the bidirectional reflectance of the specular reflection component at the wavelength $\lambda$, n the normal vector of the object, V the viewing vector, L the light source vector, H the halfway vector between the viewing vector and the light source vector, and $\beta$ the angle between the halfway vector H and the normal vector n. $F_\lambda$ is the Fresnel coefficient being the ratio of the reflected light from the dielectric surface obtained from the Fresnel formula, D is the microfacet distribution function, and G is the geometric attenuation factor representing the influence of shading by the irregularities on the object surface. Moreover, $n_\lambda$ is the refractive index of the object, m is a coefficient representing the roughness of the object surface, and $I_j$ is the radiance of the incident light. Moreover, $k_s$ is a coefficient of the specular reflection component.

Furthermore, by using the Lambertian model of (Expression 25), (Expression 12) is expanded as follows.

[Formula 51]

$$I = I_a + I_d + I_s = I_a + K_D + K_s \rho_{s,\lambda} \quad \text{(Expression 46)}$$

Herein,

[Formula 52]

$$K_D = \frac{1}{\pi} S_r E_i k_d \rho_d \quad \text{(Expression 47)}$$

[Formula 53]

$$S_r = \frac{dpx \cdot dpy}{2\pi r^2} \quad \text{(Expression 48)}$$

Herein, $\rho_d$ denotes the reflectance (albedo) of the diffuse reflection component, dpx and dpy the length of one pixel of the imaging device in the x direction and the y direction, respectively, and r the distance from the observing point O to the imaging device. Moreover, $k_d$ is a coefficient satisfying the following relationship.

[Formula 54]

$$k_d + k_s = 1 \quad \text{(Expression 49)}$$

Figure 26:
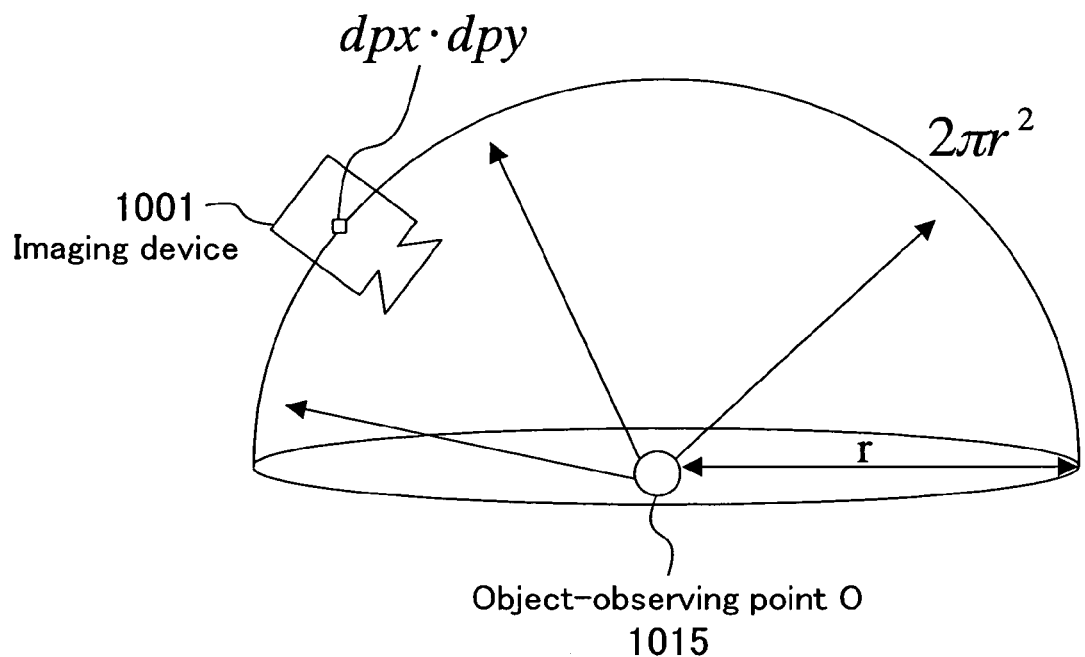
FIG. 26 is a schematic diagram illustrating a constant Sr for representing a difference in the luminance value between a diffuse reflection component and a specular reflection component.

Sr is a constant representing the difference between the luminance value of the diffuse reflection component and that of the specular reflection component, indicating that the diffuse reflection component reflects energy in every direction from the object. FIG. 26 is a schematic diagram illustrating the constant Sr. In FIG. 26, the diffuse reflection component energy reflected at the observing point O spreads hemispherically. As the imaging device 1001 is spaced apart from the observing point O by r, the ratio $S_r$ between the energy reaching one imaging element of the imaging device and the total energy reflected at the observing point O is expressed by (Expression 48).

As described above, the parameter estimating section 210 estimates parameters from (Expression 37) to (Expression 45), (Expression 46), (Expression 47) and (Expression 48).

Combining these relationships together, the known parameter for parameter estimation and parameters to be estimated are as follows:

(Known Parameters)
Environmental light component $I_a$;
Diffuse reflection component $I_d$;
Specular reflection component $I_s$;
Normal vector n of object;
Light source vector L;
Viewing vector V;
Halfway vector H;
Angle $\beta$ between halfway vector H and normal vector n;
Lengths dpx and dpy of one pixel of imaging device 1001 in x and y directions;
Distance r between imaging device 1001 and observing point O;

(Parameters To Be Estimated)
Incident illuminance $E_i$;
Coefficient $k_s$ of specular reflection component;
Roughness m of object surface; and
Refractive index $\eta_\lambda$ of object.

Herein, the coefficient $k_d$ of diffuse reflection component and the reflectance (albedo) $\rho_d$ of the diffuse reflection component are also unknown parameters, but these are not estimated so as to estimate only the parameters of the specular reflection component.

Figure 27:
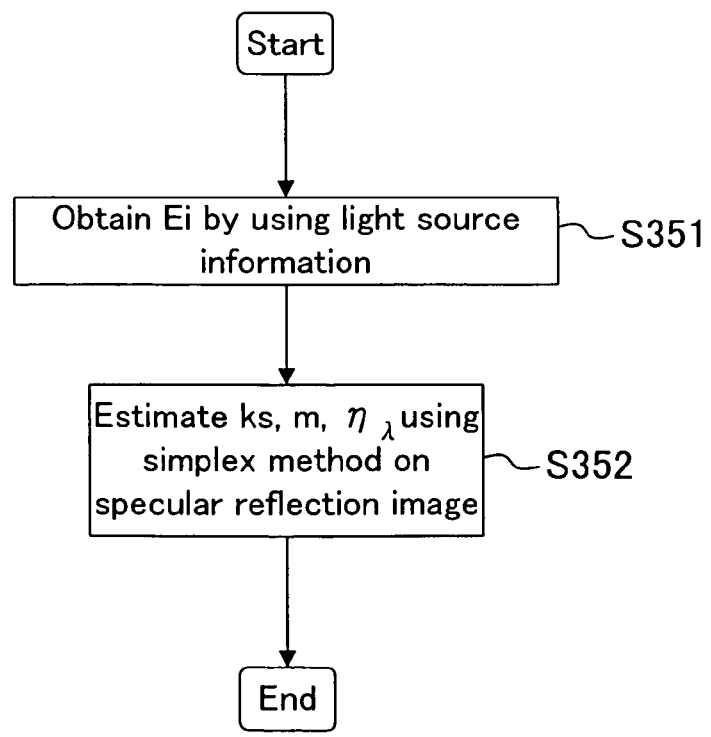
FIG. 27 is a diagram showing the flow of a parameter estimating process for a specular reflection image according to the first embodiment of the present invention.

FIG. 27 is a flow chart showing the process of the parameter estimating section 210.

The process includes the following two steps.

First, the incident illuminance $E_i$ is obtained by using the light source information (step S351). Herein, the process uses the light source position information obtained by the light source information estimating section 203, the distance information between the imaging device and the object obtained by the shape information obtaining section 204, and the light source illuminance obtained by the light source information obtaining section 203. This is obtained from the following expression.

[Formula 55]

$$E_i = \frac{R_1^2}{R_2^2} \cdot \frac{\cos\theta_1}{\cos\theta_2} \cdot I_i \quad \text{(Expression 50)}$$

Figure 28:
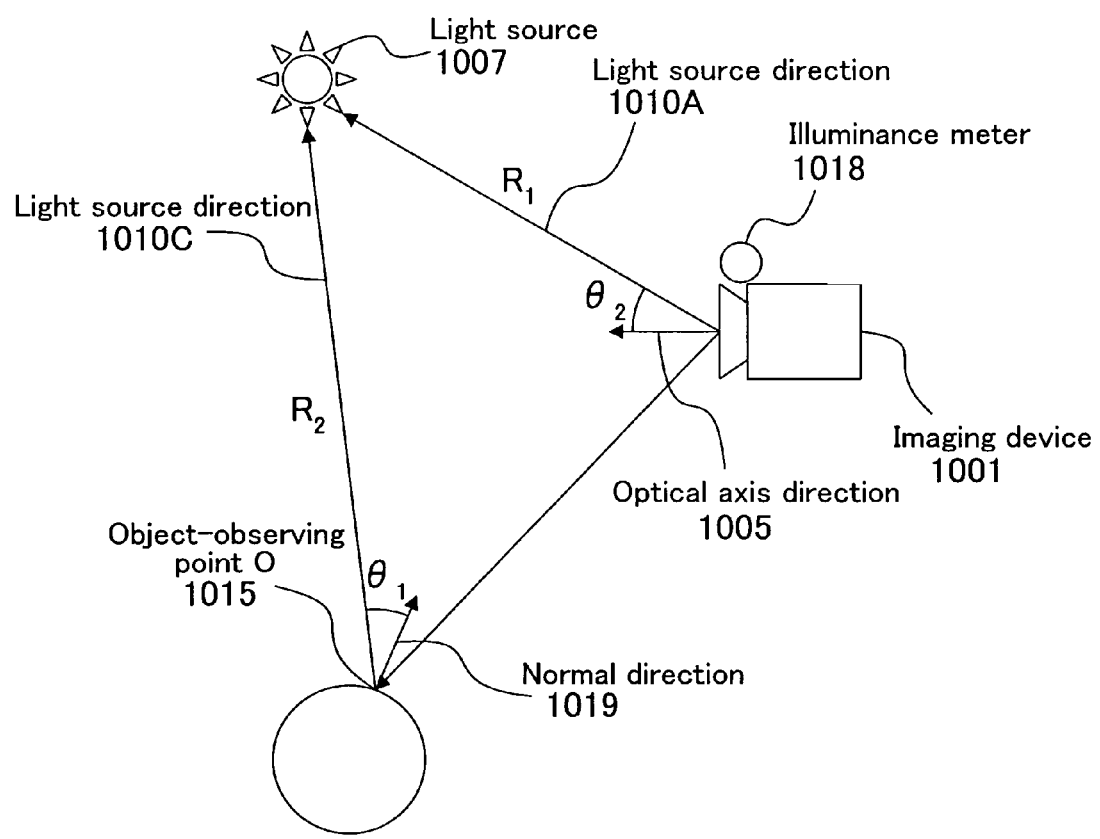
FIG. 28 is a conceptual diagram illustrating parameters of an expression representing the incident illuminance.

Herein, $I_i$ denotes the incident illuminance of the light source 1007 measured by an illuminance meter 1018 provided in the imaging device 1001, $R_1$ the distance between the imaging device 1001 and the light source 1007, $R_2$ the distance between the light source 1007 and the observing point O, $\theta_1$ the angle between the normal 1019 at the observing point O and the light source direction 1010C, and $\theta_2$ the angle between the optical axis direction 1005 in the imaging device 1001 and the light source direction 1010A (see FIG. 28). Where it can be assumed that the size of the object is sufficiently smaller than the distance R2 between the light source 1007 and the observing point O, the distance R2 will be equal at all the observing points O on the object. Therefore, $(R_1/R_2)$ in (Expression 50) becomes a constant, and no longer needs to be actually measured.

Next, the unknown parameters m, $\eta_\lambda$ and $k_s$ are estimated by using the simplex method (step S352). The simplex method is a method in which variables are assigned to vertices of a shape called a "simplex", and a function is optimized by changing the size and shape of the simplex (Noboru Ota, "Basics Of Color Reproduction Optics", pp. 90-92, Corona Publishing Co., Ltd.). A simplex is a collection of (n+1) points in an n-dimensional space. Herein, n is an unknown number to be estimated and is herein "3". Therefore, the simplex is a tetrahedron. With vectors $x_i$ representing the vertices of the simplex, new vectors are defined as follows.

[Formula 56]

$$x_h = \operatorname*{argmax}_{x_i}\{f(x_i)\},\ i=1,2,\ldots,n+1 \quad \text{(Expression 51)}$$

[Formula 57]

$$x_s = \operatorname*{argmax}_{x_i}\{f(x_i)\},\ i \neq h$$

[Formula 58]

$$x_l = \operatorname*{argmin}_{x_i}\{f(x_i)\},\ i=1,2,\ldots,n+1$$

[Formula 59]

$$x_0 = \sum \frac{x_i}{n+1},\ i \neq h,\ 1,2,\ldots,n+1 \quad \text{(Expression 52)}$$

Herein,

[Formula 60]

$$\operatorname*{argmax}_{x_i}\{f(x_i)\}$$

[Formula 61]

$$\operatorname*{argmin}_{x_i}\{f(x_i)\}$$

denote $x_i$ that maximize and minimize the function $f(x_i)$, respectively.

The three operations used in this method are defined as follows.

1. Reflection:
[Formula 62]

$$x_r = (1+\alpha)x_0 - \alpha x_h \quad \text{(Expression 53)}$$

2. Expansion
[Formula 63]

$$x_e = \beta x_r + (1-\beta)x_h \quad \text{(Expression 54)}$$

3. Contraction
[Formula 64]

$$x_c = \gamma x_h + (1-\gamma)x_0 \quad \text{(Expression 55)}$$

Herein, $\alpha(>0)$, $\beta(>1)$ and $\gamma(1>\gamma>0)$ are coefficients.

The simplex method is based on the assumption that by selecting one of the vertices of the simplex that has the greatest function value, the function value in the reflection will be small. If this assumption is correct, it is possible to obtain the minimum value of the function by repeating the same process. Specifically, parameters given by initial values are updated by the three operations repeatedly until the error with respect to the target represented by the evaluation function becomes less than the threshold. Herein, $m$, $\eta_\lambda$ and $k_s$ are used as parameters, and the difference $\Delta I_s$ between the specular reflection component image calculated from (Expression 37) and the specular reflection component image obtained by the diffuse reflection/specular reflection separating section 202, represented by (Expression 56), is used as the evaluation function.

[Formula 65]

$$\Delta I_s = \sum_j \sum_i M_{s(i,j)}(i'_{s(i,j)} - i_{s(i,j)})^2 \quad \text{(Expression 56)}$$

Herein, $i_{s(i,j)}'$ and $i_{s(i,j)}$ are the calculated specular reflection image estimate value $I_s'$, and the luminance value of the pixel (i,j) of the specular reflection component image $I_s$ obtained by the diffuse reflection/specular reflection separating section 202, and $M_{s(i,j)}$ is a function that takes 1 when the pixel (i,j) has a specular reflection component and 0 otherwise.

This process will now be described in detail. FIG. 29 is a flow chart illustrating the flow of this process.

First, the counters n and k for storing the number of times the updating operation has been repeated are initialized to 0 (step S361). The counter n is a counter for storing the number of times the initial value has been changed, and k is a counter for storing the number of times the candidate parameter has been updated by the simplex for an initial value.

Then, random numbers are used to determine the initial values of the candidate parameters m', $\eta_\lambda'$ and $k_s'$ of estimate parameters (step S362). Based on the physical constraint conditions of the parameters, the range of initial values was determined as follows.

[Formula 66]

$$m \geq 0$$

$$\eta_\lambda \geq 1.0$$

$$0 \leq k_s \leq 1.0$$

$$0 \leq F_\lambda \leq 1.0$$

$$0 \leq D \quad \text{(Expression 57)}$$

Then, the obtained candidate parameters are substituted into (Expression 37) to obtain the specular reflection image estimate value $I_s'$ (step S363). Furthermore, the difference $\Delta I_s$ between the calculated specular reflection image estimate value $I_s'$ and the specular reflection component image obtained by the diffuse reflection/specular reflection separating section 202 is obtained from (Expression 56), and this is used as the evaluation function of the simplex method (step S364). If the obtained $\Delta I_s$ is sufficiently small (Yes in step S365), the candidate parameters m', $\eta_\lambda'$ and $k_s'$ are selected as the estimate parameters m, $\eta_\lambda$ and $k_s$, assuming that the parameter estimation has been succeeded, thus terminating the process. If $\Delta I_s$ is large (No in step S365), the candidate parameters are updated by the simplex method.

Before the candidate parameters are updated, the number of times update has been done is evaluated. First, 1 is added to the counter k storing the number of times update has been done (step S366), and the value of the counter k is judged (step S367). If the counter k is sufficiently great (No in step S367), it is determined that the operation has been repeated sufficiently, but the value has dropped to the local minimum and the optimal value will not be reached by repeating the update operation, whereby the initial values are changed to attempt to escape from the local minimum. Therefore, 1 is added to the counter n and the counter k is set to 0 (step S371). It is determined whether the value of the counter n is higher than the threshold to thereby determine whether the process is continued as it is or the process is terminated as being unprocessable (step S372). If n is greater than the threshold (No in step S372), the process is terminated determining that the image cannot be estimated. If n is smaller than the threshold (Yes in step S372), initial values are re-selected from random numbers within the range of (Expression 57) (step S362) to repeat the process. Such a threshold for k may be, for example, 100, or the like.

In step S367, if the counter k is less than or equal to the threshold (Yes in step S367), the candidate parameters are changed by using (Expression 53) to (Expression 55) (step S368). This process will be described later.

Then, it is determined whether the modified candidate parameters are meaningful as a solution (step S369). Specifically, the modified parameters may become physically meaningless values (for example, the roughness parameter m being a negative value) as the simplex method is repeated, and such a possibility is eliminated. For example, the following conditions may be given so that a parameter is determined to be meaningful if it satisfies the condition and meaningless otherwise.

[Formula 67]

$$0 \leq m$$

$$1.0 \leq \eta_\lambda$$

$$0.0 \leq k_s \leq 1.0$$

$$0.0 \leq D$$

$$0.0 \leq F_\lambda \leq 1.0 \quad \text{(Expression 58)}$$

These values can be obtained from the object. For example, the refractive index $\eta_\lambda$ is a value determined by the material of the object. For example, it is known to be 1.5-1.7 for plastic and 1.5-1.9 for glass, and these values can be used. Thus, if the object is plastic, the refractive index $\eta_\lambda$ can be set to 1.5-1.7.

If the modified parameters satisfy (Expression 58) (Yes in step S369), it can be assumed that the candidate parameters are meaningful values, and they are set as new candidate parameters (step S370), and the update process is repeated (step S363). If the modified parameters do not satisfy (Expression 58) (No in step S369), the update process for the initial values is canceled, and the update is performed with new initial values (step S371).

Figure 30:
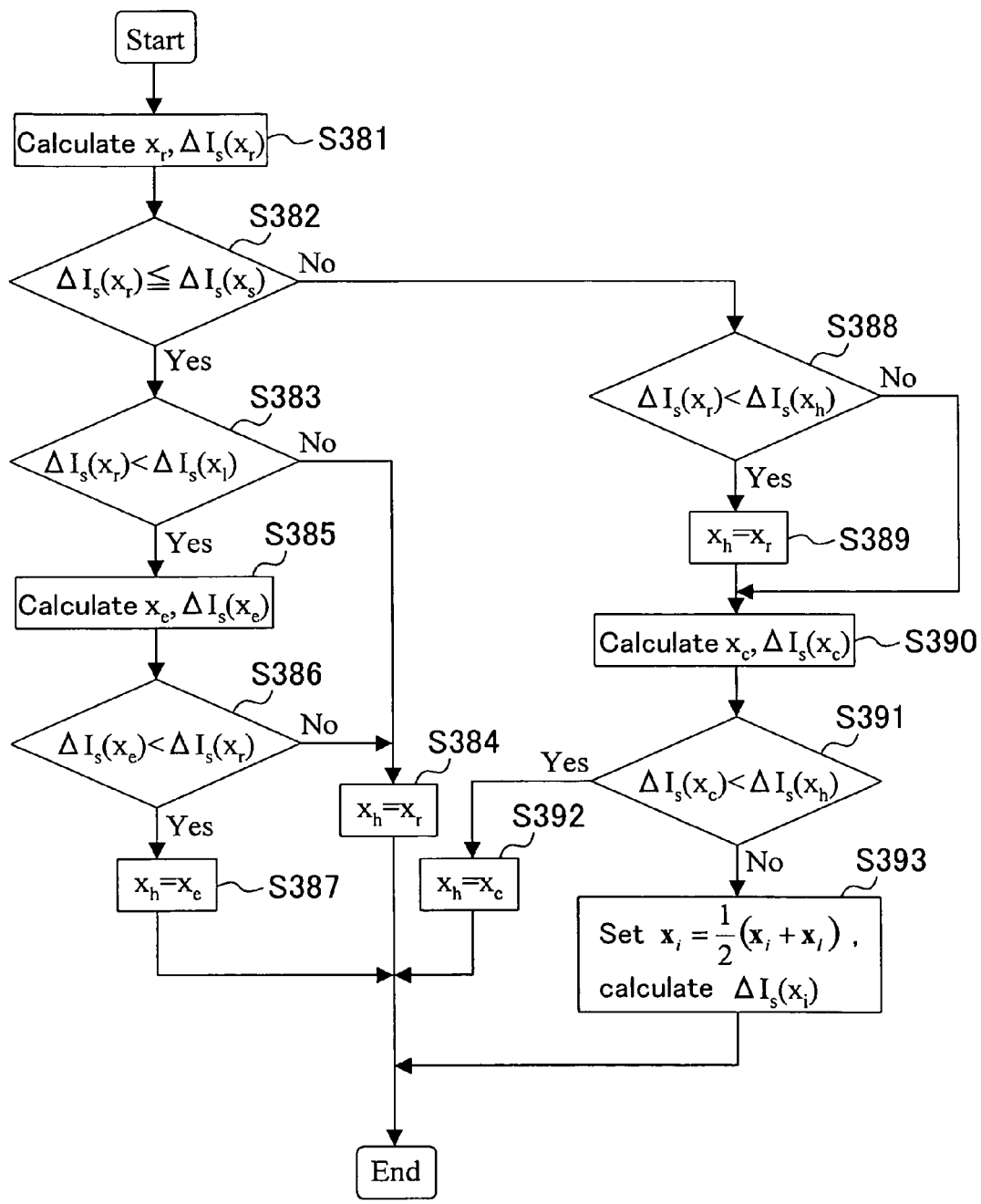
FIG. 30 is a flow chart showing the flow of a parameter updating process in a simplex method.

The modifying process in step S368 will now be described in detail. FIG. 30 is a flow chart showing the flow of the process. Herein, the candidate parameters m', $\eta_\lambda$' and $k_s$' are represented as a vector and it is used as the parameter x. Thus,

[Formula 68]

$$x = [m' \ \eta_{s,\lambda}' \ k_s']^T$$

First, by using (Expression 51), (Expression 52) and (Expression 53), the parameter $x_r$ having gone through the reflection operation is calculated, and (Expression 56) is used to calculate the difference $\Delta I_s(x_r)$ with respect to the specular reflection component image with $x_r$ (step S381). Then, the obtained $\Delta I_s(x_r)$ and $\Delta I_s(x_s)$ of which the evaluation function was the second worst are compared with each other (step S382). If $\Delta I_s(x_r)$ is smaller than $\Delta I_s(x_s)$ (Yes in step S382), the evaluation value $\Delta I_s(x_r)$ having gone through the reflection operation and $\Delta I_s(x_l)$ whose evaluation value is currently the best are compared with each other (step S383). If $\Delta I_s(x_r)$ is larger (No in step S383), $x_h$ of which the evaluation value is worst is changed to $x_r$ (step S384), and the process is terminated.

If $\Delta I_s(x_r)$ is smaller than $\Delta I_s(x_l)$ (Yes in step S383), (Expression 54) is used to perform the expansion process and to calculate the difference $\Delta I_s(x_e)$ between the parameter $x_e$ and the specular reflection component image with $x_e$ (step S385). Then, the obtained $\Delta I_s(x_e)$ and $\Delta I_s(x_r)$ obtained by the reflection operation are compared with each other (step S386). If $\Delta I_s(x_e)$ is smaller than $\Delta I_s(x_r)$ (Yes in step S386), $x_h$ of which the evaluation value has been worst is changed to $x_e$ (step S387), and the process is terminated.

If $\Delta I_s(x_e)$ is greater than $\Delta I_s(x_r)$ (No in step S386), $x_h$ of which the evaluation value has been worst is changed to $x_r$ (step S387), and the process is terminated.

In step S382, if $\Delta I_s(x_r)$ is greater than $\Delta I_s(x_s)$ (No in step S382), the evaluation value $\Delta I_s(x_r)$ having gone through the reflection operation and $\Delta I_s(x_h)$ of which the evaluation value is currently worst are compared with each other (step S388). If $\Delta I_s(x_r)$ is smaller than $\Delta I_s(x_h)$ (Yes in step S388), $x_h$ of which the evaluation value has been worst is changed to $x_r$ (step S389), and (Expression 55) is used to calculate the difference $\Delta I_s(x_c)$ between the parameter $x_c$ having gone through the contraction operation and the specular reflection component image with $x_c$ (step S390). If $\Delta I_s(x_r)$ is greater than $\Delta I_s(x_h)$ (No in step S388), the difference $\Delta I_s(x_c)$ between the parameter $x_c$ having gone through the contraction operation and the specular reflection component image with $x_c$ is calculated (step S390) without changing $x_h$.

Then, the obtained $\Delta I_s(x_c)$ and $\Delta I_s(x_h)$ of which the evaluation value is worst are compared with each other (step S391). If $\Delta I_s(x_c)$ is smaller than $\Delta I_s(x_h)$ (Yes in step S391), $x_h$ of which the evaluation value has been worst is changed to $x_c$ (step S392), and the process is terminated.

If $\Delta I_s(x_c)$ is greater than $\Delta I_s(x_h)$ (No in step S391), all the candidate parameters $x_i$ (i=1,2,3,4) are changed as follows, and the process is terminated.

[Formula 69]

$$x_i = \frac{1}{2}(x_i + x_l)$$

By repeating the process described above, m, $\eta_\lambda$ and $k_s$, being unknown parameters in the specular reflection image, are estimated.

By the process described above, it is possible to estimate all the unknown parameters.

The model used for the parameter estimation does not need to be the Cook-Torrance model, but may be, for example, the Torrance-Sparrow model, the Phong model, or the simplified Torrance-Sparrow model (for example, K. Ikeuchi and K. Sato, "Determining Reflectance Properties Of An Object Using Range And Brightness Images", IEEE Transactions on Pattern Analysis and Machine Intelligence, vol. 13, no. 11, pp. 1139-1153, 1991).

The parameter estimating method does not need to be the simplex method, but may be an ordinary parameter estimating method, such as, for example, the gradient method or the method of least squares.

The process described above may be performed for each pixel, or an equal set of parameters may be estimated for each of divided regions. Where the process is performed for each pixel, it is preferred to obtain samples in which known parameters such as the normal vector n of the object, the light source vector L or the viewing vector V are varied by moving the light source, the imaging device or the object. Where the process is performed for each region, it is preferred that the division of regions is changed so that variations in the parameters obtained for each region are little so as to realize an optimal parameter estimation.

The shape information resolution increasing section 211 increases the resolution of the shape information of the object obtained by the shape information obtaining section 204 (step S409). This is realized as follows.

First, the surface shape information obtained by the shape information obtaining section 204 is projected onto the image obtained by the image-capturing section 201 to obtain the normal direction corresponding to each pixel in the image. Such a process can be realized by performing a conventional camera calibration process (for example, Hiroki Unten, Katsushi Ikeuchi, "Texturing 3D Geometric Model For Virtualization Of Real-World Object", CVIM-149-34, pp. 301-316, 2005).

Figure 31:
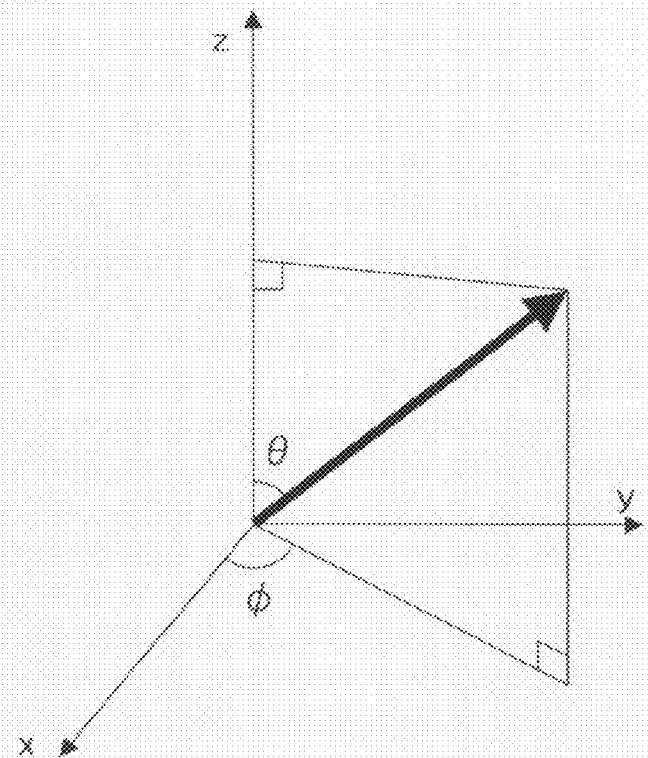
FIG. 31 is a schematic diagram illustrating a polar coordinates representation.

In this process, the normal vector $n_p$ is represented by polar coordinates, and the values are denoted as $\theta_p$ and $\phi_p$ (see FIG. 31). The images of $\theta$ and $\phi$ being the normal components are produced by the process described above. The resolutions of the obtained $\theta$ and $\phi$ images are increased by a method similar to the albedo super-resolution section 207 described above to thereby estimate high-resolution shape information. In this process, a learning process is performed before the resolution increasing process to store the cluster C for the normal $\theta$ and $\phi$ components and the learned conversion matrix CMat in a normal DB 212.

The process described above is preferably performed only for those areas that are not removed by the shadow removing section 205 as being shadows. This is for preventing an error in the parameter estimating process from occurring due to the presence of shadows.

Moreover, the parameter estimating section 210 may use a controllable light source provided in the vicinity of the imaging device. The light source may be a flashlight of a digital camera. In this case, a flashlighted image captured with a flashlight and a non-flashlighted image captured without a flashlight may be captured temporally continuously, and the parameter estimation may be performed by using the differential image therebetween. The positional relationship between the imaging device and the flashlight being the light source is known, and the light source information of the flashlight such as the three-dimensional position, the color and the intensity can also be measured in advance. Since the imaging device and the flashlight are provided at positions very close to each other, it is possible to capture an image with little shadow. Therefore, parameters can be estimated for most of the pixels in the image.

Moreover, a parameter resolution increasing section 213 increases the resolution of the parameter obtained by the parameter estimating section 210 (step S410). Herein, a simple linear interpolation is performed for increasing the resolution of all the parameters. Of course, a learning-based super-resolution method such as the albedo super-resolution section 207 described above may be used.

The resolution increasing method may be switched from one to another for different parameters. For example, it can be assumed that the value of the refractive index $\eta_\lambda$ of the object being an estimate parameter will not change even if the resolution thereof is increased. Therefore, the resolution may be increased by simple interpolation for the refractive index $\eta_\lambda$ of the object, whereas a learning-based super-resolution process may be performed for the diffuse reflection component coefficient $k_d$, the specular reflection component coefficient $k_s$ and the reflectance (albedo) $\rho_d$ of the diffuse reflection component.

The specular reflection image super-resolution section 214 synthesizes a high-resolution specular reflection image by using the high-resolution shape information estimated by the shape information resolution increasing section 211 and parameters whose densities have been increased by the parameter resolution increasing section 214 (step S411). The high-resolution specular reflection image is synthesized by substituting resolution-increased parameters into (Expression 37) to (Expression 45).

For example, only for the incident illuminance $E_i$, the estimated value may be multiplied by a coefficient 1 (e.g., 1=2) so as to obtain a higher luminance value than the actual specular reflection image. This is for enhancing the texture of the object by increasing the luminance value of the specular reflection image. Similarly, the roughness m of the object surface may be set to a greater value than the estimated value so as to synthesize a specular reflection image in which the shine is stronger than it actually is.

The diffuse image super-resolution section 209 synthesizes a high-resolution diffuse reflection image from a high-resolution albedo image synthesized by the albedo super-resolution section 207 (step S412). This process will now be described.

As described above, an albedo image is what is obtained by dividing the diffuse component image by the inner product between the light source vector and the normal vector of the object. Therefore, the process synthesizes a high-resolution diffuse reflection image by multiplying the albedo image by the inner product between the light source vector estimated by the light source information estimating section 203 and the high-resolution normal vector of the object obtained by the shape information resolution increasing section 211. Where a plurality of light sources are estimated by the light source information estimating section 203, the process synthesizes a high-resolution diffuse reflection image for each of the light sources and combines together the images to synthesize a single super-resolution diffuse image.

In a case where a pseudo-albedo image is used instead of an albedo image, the process multiplies the pseudo-albedo image by the inner product between the light source vector estimated by the light source information estimating section 203 and the high-density normal vector of the object obtained by a shape information resolution increasing section 211, and further multiplies it by the maximum luminance value $i_{sf\_max}$ of the specular reflection image used for normalization, thus synthesizing a super-resolution diffuse reflection image. Since the maximum luminance value $i_{sf\_max}$ of the specular reflection image used in normalization is stored in the memory by the albedo estimating section 206, the process can simply read out the stored information. Of course, in a case where normalization is done by using the maximum luminance value of the diffuse reflection image or the maximum luminance value of the input image, the process multiplies it by the maximum luminance value of the diffuse reflection image or the maximum luminance value of the input image used in normalization, instead of multiplying it by the maximum luminance value $i_{sf\_max}$ of the specular reflection image.

By the process described above, it is possible to synthesize a super-resolution diffuse reflection image. While the super-resolution process is performed by using an albedo image, the process may directly perform super-resolution of a diffuse reflection image rather than the albedo image. In such a case, the learning process may be performed by using the diffuse reflection image.

The shadow producing section 215 synthesizes a shadow image to be laid over the super-resolution diffuse reflection image and the super-resolution specular reflection image produced by a diffuse reflection image super-resolution section 209 and the specular reflection image super-resolution section 214 (step S413). This can be done by using ray tracing, which is used for the shadow removing section 205.

Herein, it is assumed that the super-resolution section 217 has knowledge on the three-dimensional shape of the object of image capturing. The shadow producing section 215 obtains the three-dimensional shape data of the object, and estimates the three-dimensional orientation and the three-dimensional position of the object based on the appearance of the object in the captured image. An example of estimating the three-dimensional position and the three-dimensional orientation from the appearance in a case where the object is a human eye cornea is disclosed in K. Nishino and S. K. Nayar, "The World In An Eye", in Proc. of Computer Vision and Pattern Recognition CVPR '04, vol. I, pp. 444-451, July, 2004. Although objects of which the three-dimensional position and the three-dimensional orientation can be estimated from the appearance are limited, a method of the above article can be applied to such an object.

Once the three-dimensional orientation and the three-dimensional position of the object are estimated, the object surface shape information can be calculated at any point on the object. The process described above is repeated for the captured images to calculate the object surface shape information. Moreover, it is possible to increase the density of the three-dimensional shape of the object by increasing the resolution of the object shape information by using the high-resolution shape information estimated by the shape information resolution increasing section 211. A high-resolution shadow image is estimated by performing ray tracing by using the high-resolution three-dimensional shape thus obtained and the parameters whose resolution has been increased by the parameter resolution increasing section 214.

The rendering section 216 produces a high-resolution image obtained by performing super-resolution of the original image by combining together the super-resolution diffuse reflection image synthesized by the diffuse reflection image super-resolution section 209, the super-resolution specular reflection image synthesized by the specular reflection image super-resolution section 214 and the shadow image synthesized by the shadow producing section 215 (step S414).

Figure 32:
FIG. 32 shows an image of an object with which the learning process was performed.
Figure 33A:
FIG. 33 shows results of an 8×8-times super-resolution process.
Figure 33B:
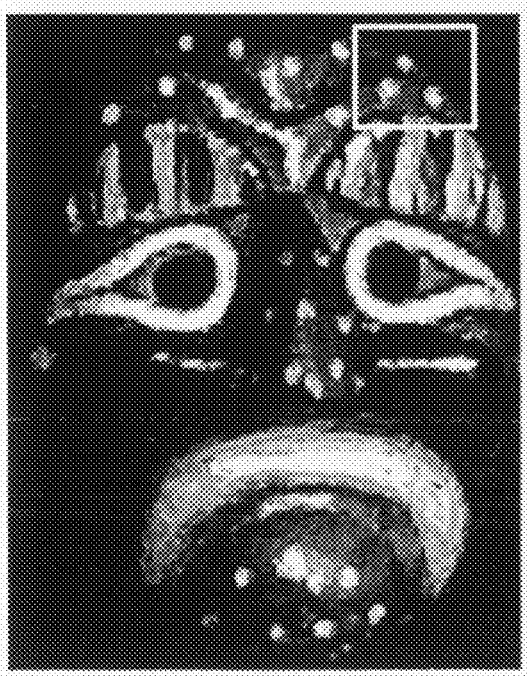
Figure 33C:
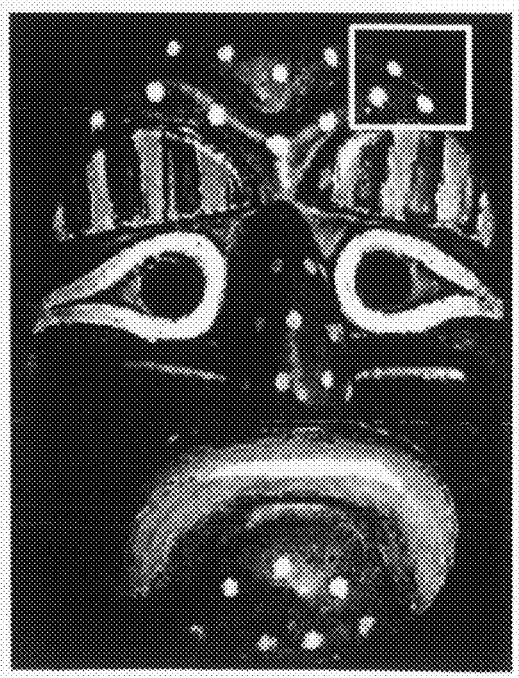
Figure 34A:
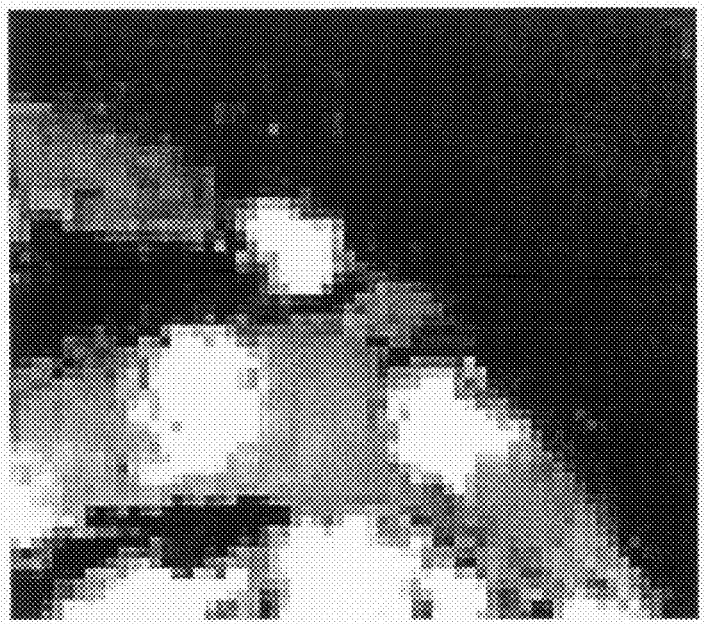
FIG. 34 shows results of an 8×8-times super-resolution process.
Figure 34B:
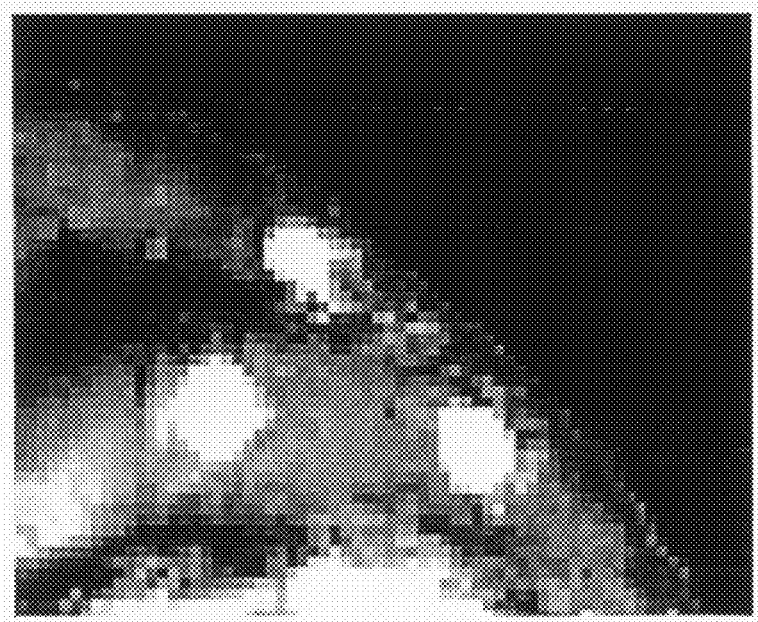

FIGS. 32 to 34 show the results of super-resolution of an image by a factor of 8×8 by a super-resolution method using a pseudo-albedo of the present embodiment. FIG. 32 shows an image used for the learning process. A mask was used as the object. The super-resolution of the image shown in FIG. 33(*a*) was performed by using the learned data. This image is of the same object as the learned data of FIG. 32 but with a different light source position.

For comparison, a texton-based super-resolution process, which was used in the albedo super-resolution section 207, was performed not on an albedo image but on the image captured by the image-capturing section 201. The result is shown in FIG. 33(*b*). FIG. 33(*c*) shows the result of the super-resolution process using a pseudo-albedo of the present embodiment. FIGS. 34(*a*) and (*b*) show, on an enlarged scale, upper-right rectangular regions of FIGS. 33(*b*) and (*c*), respectively. It can be seen from these results that it is possible with the super-resolution method of the present embodiment to perform super-resolution of an image by a factor of 8×8 without image quality deterioration.

Looking at the upper-right occluding edge of the object, it can be seen that the edge is blurred in FIG. 34(*a*). It can be assumed that the image quality is deteriorated as the process fails to distinguish between the background and the learned object because the light source environment during the learning process and that during the super-resolution process are different from each other. In contrast, with the super-resolution method of the present embodiment, in which the shape information is used, the occluding edge is rendered naturally. Thus, by using an albedo or pseudo-albedo image and the shape information of the object, it is possible to appropriately render an occluding edge and to thereby realize a more appropriate super-resolution process.

While super-resolution of only the specular reflection image is performed by using the parameter estimation in the above description, the parameter estimation may be performed also for the diffuse reflection image to perform super-resolution thereof.

This process will now be described. There are two unknown parameters of the diffuse reflection image as described above:

Diffuse reflection component coefficient $k_d$; and

Reflectance (albedo) $\rho_d$ of diffuse reflection component.

Figure 35:
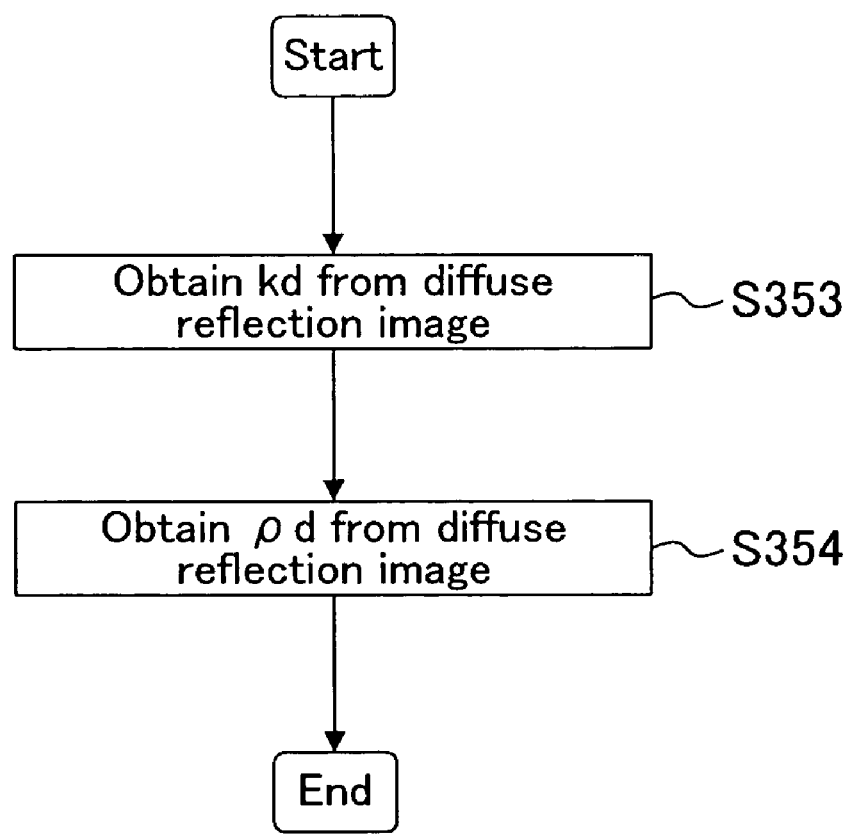
FIG. 35 is a diagram showing the flow of a parameter estimating process for a diffuse reflection image according to the first embodiment of the present invention.

Therefore, these parameters are estimated. FIG. 35 is a flow chart showing the flow of the parameter estimating process for the diffuse reflection image. After the process by the parameter estimating section 210 for the specular reflection image shown in FIG. 27, two further steps as follows are performed.

First, the process estimates $k_d$ as follows by using (Expression 49) and $k_s$ obtained by the parameter estimation for the specular reflection image (step S353).

[Formula 70]

$$k_d = 1 - k_s$$

Moreover, the reflectance (albedo) $\rho_d$ of the diffuse reflection image is estimated as follows by using (Expression 47) (step S354).

[Formula 71]

$$\rho_d = \frac{\pi K_D}{S_r E_i k_d}$$

By the process described above, it is possible to estimate all the unknown parameters. Super-resolution of the diffuse reflection image can be performed by increasing the resolution of the obtained parameters by a method similar to the parameter resolution increasing section 213.

While the light source information estimating section 203 obtains the light source information by using the mirror surface sphere, it may estimate the information directly from the image. This will be described in detail.

(Light Source Information Estimating Process)

Figure 36:
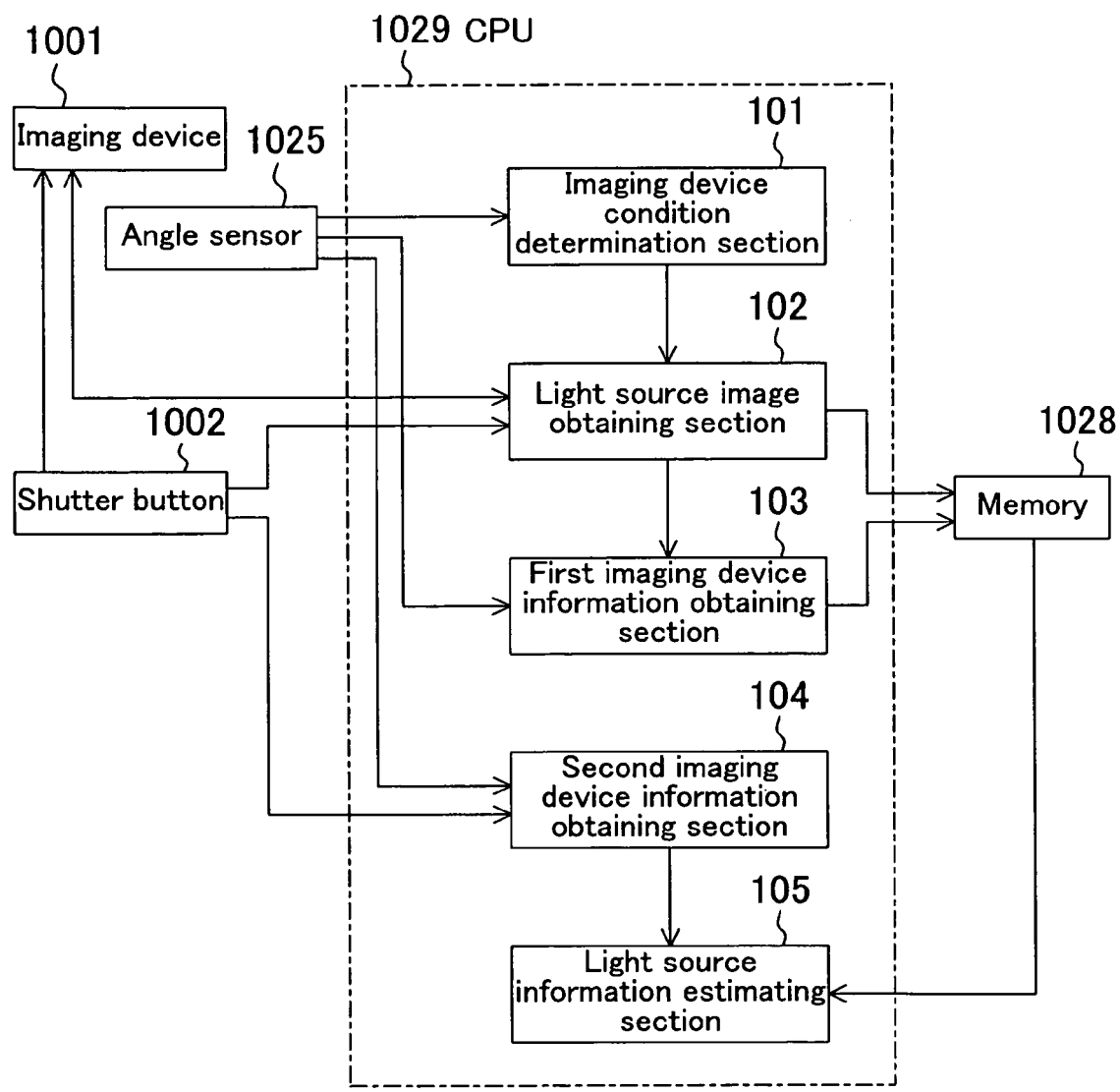
FIG. 36 is a block diagram showing a configuration of a light source estimation device for another light source information estimating process.

FIG. 36 is a block diagram showing a configuration of a light source estimation device for the present process. In FIG. 36, 1001 denotes an imaging device using CCDs, CMOSes, or the like, and 1002 a shutter button by which a cameraman, being a person who captures an image, instructs the imaging device 1001 to capture an image. The imaging device 1001 is provided with a 3-degree-of-freedom (3DOF) sensor 1025.

Moreover, 101 denotes an imaging device condition determination section for determining whether the condition of the imaging device 1001 is suitable for obtaining light source information, 102 a light source image obtaining section for capturing an image by the imaging device 1001 to obtain the captured image as a light source image when it is determined by the imaging device condition determination section 101 to be suitable, 103 a first imaging device information obtaining section for obtaining first imaging device information representing the condition of the imaging device 1001 when the light source image is obtained by the light source image obtaining section 102, 104 a second imaging device information obtaining section for obtaining second imaging device information representing the condition of the imaging device at the time of image capturing when the image is captured by the imaging device 1001 in response to a cameraman's operation, and 105 a light source information estimating section for estimating at least one of the direction and the position of the light source at the time of image capturing based on the light source image obtained by the light source image obtaining section 102, the first imaging device information obtained by the first imaging device information obtaining section 103, and the second imaging device information obtained by the second imaging device information obtaining section 104.

It is assumed herein that the imaging device condition determination section 101, the light source image obtaining section 102, the first imaging device information obtaining section 103, the second imaging device information obtaining section 104 and the light source information estimating section 105 are implemented as a program or programs executed by a CPU 1029. Note however that all or some of these functions may be implemented as hardware. A memory 1028 stores the light source image obtained by the light source image obtaining section 102, and the first imaging device information obtained by the first imaging device information obtaining section 103.

Figure 37:
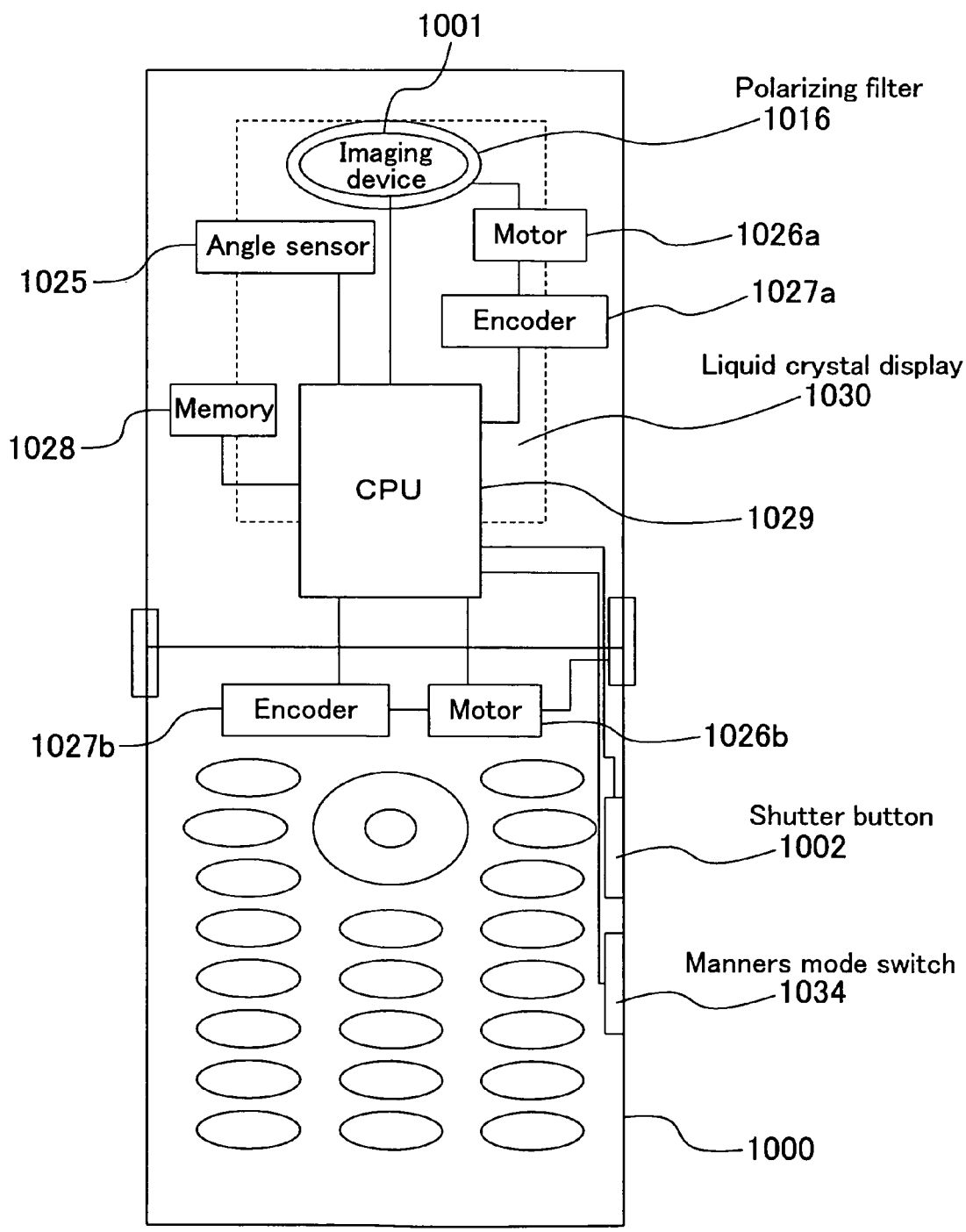
FIG. 37 is a schematic diagram showing a configuration of a mobile telephone provided with a light source estimation device for another light source information estimating process.

FIG. 37 shows an exemplary configuration of a folding-type camera-equipped mobile telephone 1000 provided with the light source estimation device for the present process. In FIG. 37, like elements to those shown in FIG. 36 are denoted by like reference numerals. In the folding-type camera-equipped mobile telephone 1000 of FIG. 37, the imaging device 1001 includes a polarizing filter 1016, and also includes a motor 1026a for rotating the polarizing filter 1016 and an encoder 1027a for detecting the angle of rotation thereof. A motor 1026b for driving the folding mechanism, and an encoder 1027b for detecting the angle of rotation thereof are also provided.

Figure 38:
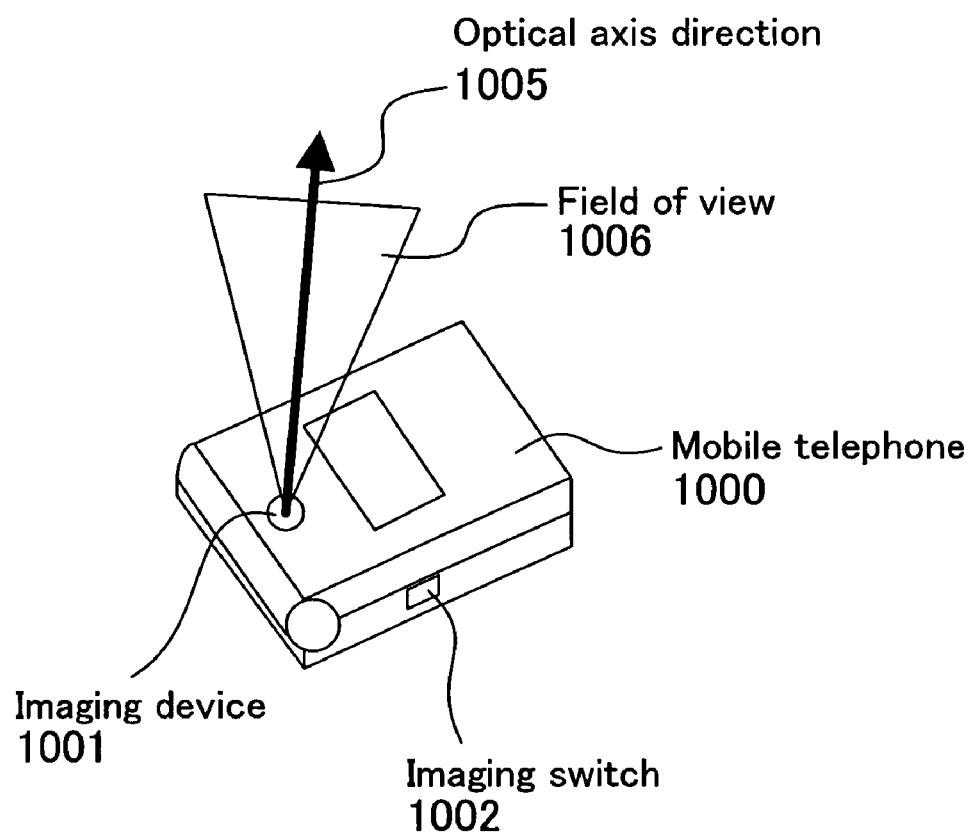
FIG. 38 is a diagram showing a camera-equipped mobile telephone in a folded position.

FIG. 38 is a diagram showing the folding-type camera-equipped mobile telephone 1000 of FIG. 37 in a folded position. In FIG. 38, 1005 denotes the optical axis direction of the imaging device 1001, and 1006 a field of view of the imaging device 1001.

The operation of each component of the light source estimation device for the present process will now be described.

The imaging device condition determination section 101 determines whether the condition of the imaging device 1001 is suitable for obtaining light source information. The most ordinary light source may be a lighting device in a house, and may be a streetlight or the sunlight in the outdoors. Therefore, if the imaging direction, i.e., the direction of the optical axis, of the imaging device 1001 is upward, it can be determined to be a suitable condition for the imaging device 1001 to obtain light source information. Thus, the imaging device condition determination section 101 uses the output of the angle sensor 1025 provided in the imaging device 1001 to detect the direction of the optical axis of the imaging device 1001 so as to determine that it is a suitable condition for obtaining light source information when the optical axis is pointing upward. Then, the imaging device condition determination section 101 sends an image-capturing prompting signal to the light source image obtaining section 102.

When an image-capturing prompting signal is received from the imaging device condition determination section 101, i.e., when it is determined by the imaging device condition determination section 101 that the condition of the imaging device 1001 is suitable for obtaining light source information, the light source image obtaining section 102 captures an image by the imaging device 1001 to obtain the captured image as a light source image. The obtained light source image is stored in the memory 1028.

In this process, it is preferred that the light source image obtaining section 102 obtains a light source image after confirming that an image is not being captured by a cameraman's operation. For example, a light source image may be captured after confirming that the shutter button 1002 is not being pressed.

The light source image obtaining section 102 captures a light source image in a period during which an image is not being captured, in view of the cameraman's intention of capturing an image. With the light source estimation device for the present process, a light source image is captured by using the imaging device 1001, which is used for imaging an object. Therefore, if the process of capturing a light source image is performed when the cameraman is about to image an object, the cameraman will not be able to image the object at the intended moment, thus neglecting the cameraman's intention of capturing an image.

Therefore, in the present process, in order to reflect the cameraman's intention of capturing an image, a light source image is captured in a period during which it can be assumed that the cameraman will not capture an image, e.g., in a period during which the device is left on a table, or the like. For example, when the folding-type camera-equipped mobile telephone 1000 of FIG. 38 is left on a table, or the like, it can be assumed that the optical axis direction 1005 is upward. Under this condition, it is possible to capture an optimal light source image.

Figure 39:
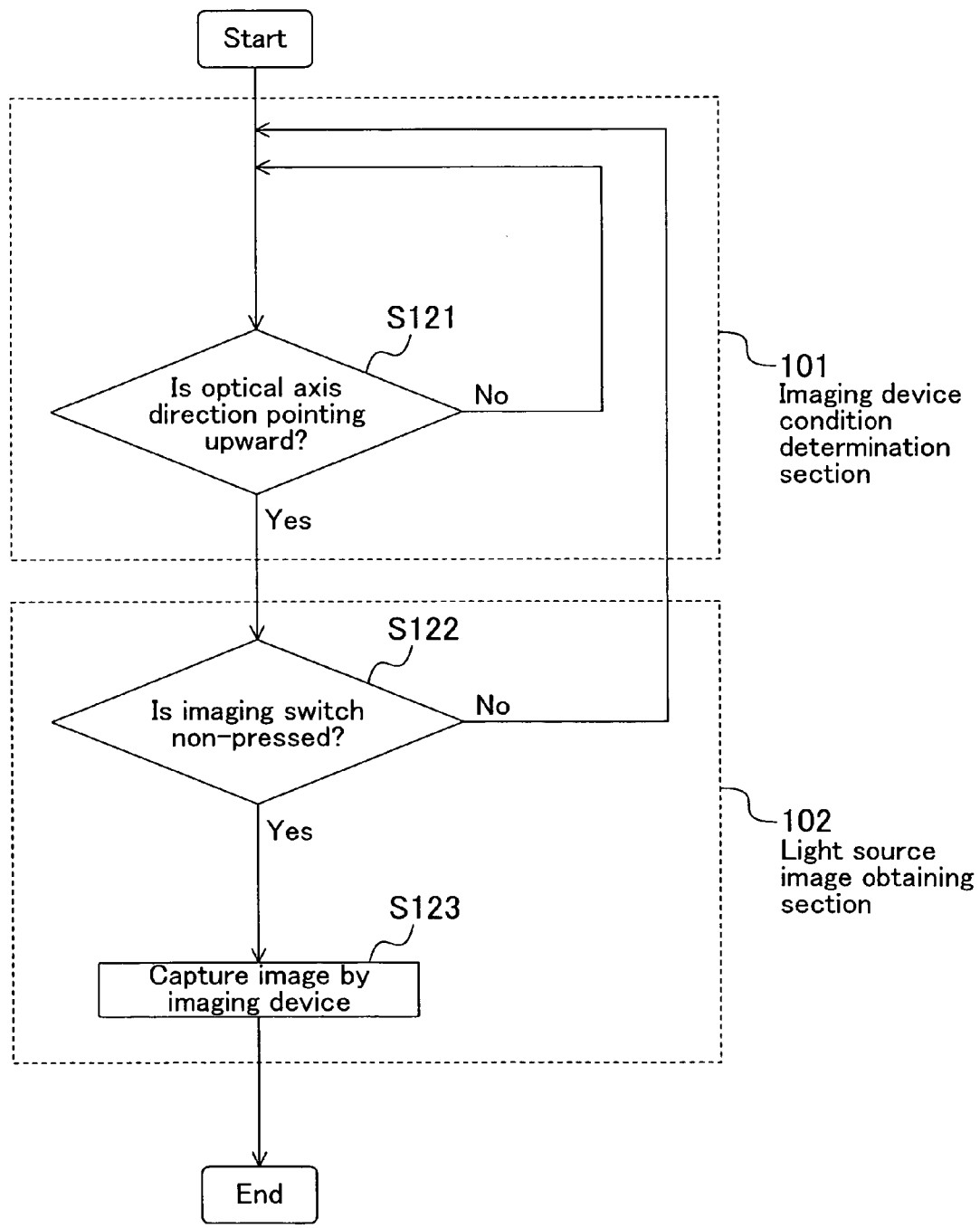
FIG. 39 is a flow chart showing the flow of the processes of an imaging device condition determination section and a light source image obtaining section.

FIG. 39 is a flow chart showing exemplary processes of the imaging device condition determination section 101 and the light source image obtaining section 102. First, the imaging device condition determination section 101 detects the optical axis direction of the imaging device 1001, and determines whether the optical axis direction is upward (step S121). If the optical axis direction is not upward (No in step S121), the optical axis direction is repeatedly checked until the optical axis direction is upward. If the optical axis direction is upward (Yes in step S122), the light source image obtaining section 102 checks the shutter button 1002 (step S122). When the shutter button 1002 is being pressed for performing a process such as auto-focusing (AF) (No in step S122), it is likely that an image is being captured, and therefore the process of capturing a light source image is not performed. When the shutter button 1002 is not being pressed (Yes in step S122), the light source image obtaining section 102 captures an image by the imaging device 1001 to obtain a light source image (step S123).

While whether an image is being captured by a cameraman's operation is herein determined by checking the shutter button, the method for determining whether a cameraman has an intention of capturing an image is not limited to this. For example, a message "Capturing an image?" for checking whether an image is being captured may be shown on the display, wherein it is determined that the cameraman has no intention of capturing an image if the cameraman expressly indicates "No" or if there is no response at all.

Alternatively, an acceleration sensor, or the like, may be used, wherein a light source image is obtained when the imaging device 1001 is stationary. Specifically, when the imaging device 1001 is stationary, it can be determined that the imaging device 1001 is not being held by the cameraman but is left on a table, or the like. Therefore, in such a case, it is likely that the cameraman is not capturing an image. When the cameraman is holding the imaging device 1001 for capturing an image, the acceleration sensor senses the camera shake. The light source image obtaining section 102 may be configured not to capture an image in such a case.

Figures 40, 41:
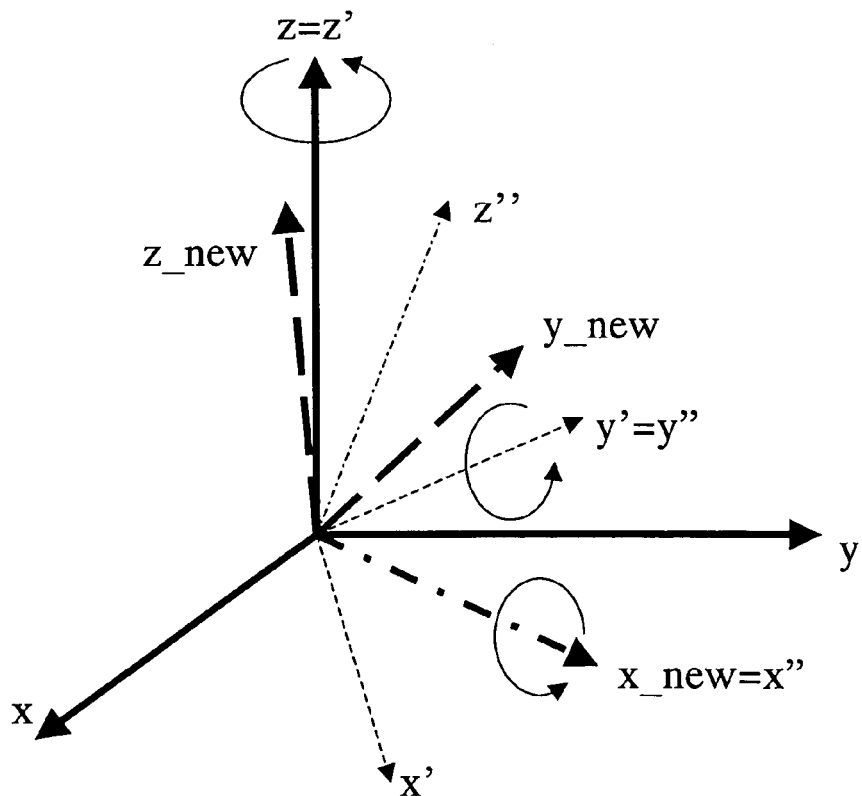
FIG. 40 is a schematic diagram showing a portion of information stored in a memory.
FIG. 41 is a schematic diagram illustrating a roll-pitch-yaw angle representation.

When a light source image is obtained by the light source image obtaining section 102, the first imaging device information obtaining section 103 obtains first imaging device information representing the condition of the imaging device 1001. Specifically, the output of the angle sensor 1025 and the focal distance information of the imaging device 1001 are obtained as the first imaging device information, for example. The obtained first imaging device information is stored in the memory 1028. FIG. 40 is a schematic diagram showing part of information stored in the memory 1028. The angle sensor output and the focal distance for a light source image are stored as the first imaging device information.

The orientation information of the imaging device 1001 is represented by the following 3×3 matrix Rlight by using the output of the angle sensor 1025.

[Formula 72]

$$R_{light} = \begin{bmatrix} r_{l0,0} & r_{l0,1} & r_{l0,2} \\ r_{l1,0} & r_{l1,1} & r_{l1,2} \\ r_{l2,0} & r_{l2,1} & r_{l2,2} \end{bmatrix} = R_x(\alpha)R_y(\beta)R_z(\gamma) \quad \text{(Expression 1)}$$

The 3×3 matrix Rlight representing the orientation information of the imaging device 1001 is referred to as a camera orientation matrix. In this expression, $(\alpha,\beta,\gamma)$ are values of the output from the sensor attached to the camera in a roll-pitch-yaw angle representation, each being expressed in terms of the amount of movement from a reference point. A roll-pitch-yaw angle representation is a representation where a rotation is represented by three rotations, including the roll being the rotation about the z axis, the pitch being the rotation about the new y axis, and the yaw being the rotation about the new x axis, as shown in FIG. 41.

$Rx(\alpha)$, $Ry(\beta)$ and $Rz(\gamma)$ are matrices for converting the roll-pitch-yaw angles to the x-axis rotation, the y-axis rotation and the z-axis rotation, and are expressed as follows.

[Formula 73]

$$R_x(\alpha) = \begin{bmatrix} 1 & 0 & 0 \\ 0 & \cos\alpha & -\sin\alpha \\ 0 & \sin\alpha & \cos\alpha \end{bmatrix}$$

$$R_y(\beta) = \begin{bmatrix} \cos\beta & 0 & \sin\beta \\ 0 & 1 & 0 \\ -\sin\beta & 0 & \cos\beta \end{bmatrix}$$

$$R_z(\gamma) = \begin{bmatrix} \cos\beta & -\sin\beta & 0 \\ \sin\beta & \cos\beta & 0 \\ 0 & 0 & 1 \end{bmatrix}$$

If the imaging device 1001 is capable of zooming, the zooming information is also obtained as the focal distance information. In a case where the imaging device 1001 is a fixed-focus device, the focal distance information is also obtained. The focal distance information can be obtained by performing a camera calibration operation as widely used in the field of image processing.

The method for obtaining the orientation information of the camera from the angle sensor or the angular velocity sensor attached to the camera may be an existing method (for example, Takayuki Okatani, "3D Shape Recovery By Fusion Of Mechanical And Image Sensors", Journal of Information Processing Society of Japan, 2005-CVIM-147, pp. 123-130, 2005).

At the time of image capturing when an image is captured by the imaging device 1001 in response to a cameraman's operation, the second imaging device information obtaining section 104 obtains second imaging device information representing the condition of the imaging device 1001. As with the first imaging device information obtaining section 103 described above, the output of the angle sensor 1025 and the focal distance information of the imaging device 1001 are obtained as the second imaging device information. In this process, the orientation matrix Rnow obtained from the output $(\alpha,\beta,\gamma)$ of the angle sensor 1025 is referred to as the current orientation matrix.

The light source information estimating section 105 estimates light source information at the time of image capturing in response to a cameraman's operation by using the light source image and the first imaging device information stored in the memory 1028, and the second imaging device information obtained by the second imaging device information obtaining section 104. It is assumed herein that the direction of the light source is estimated.

Figure 42:
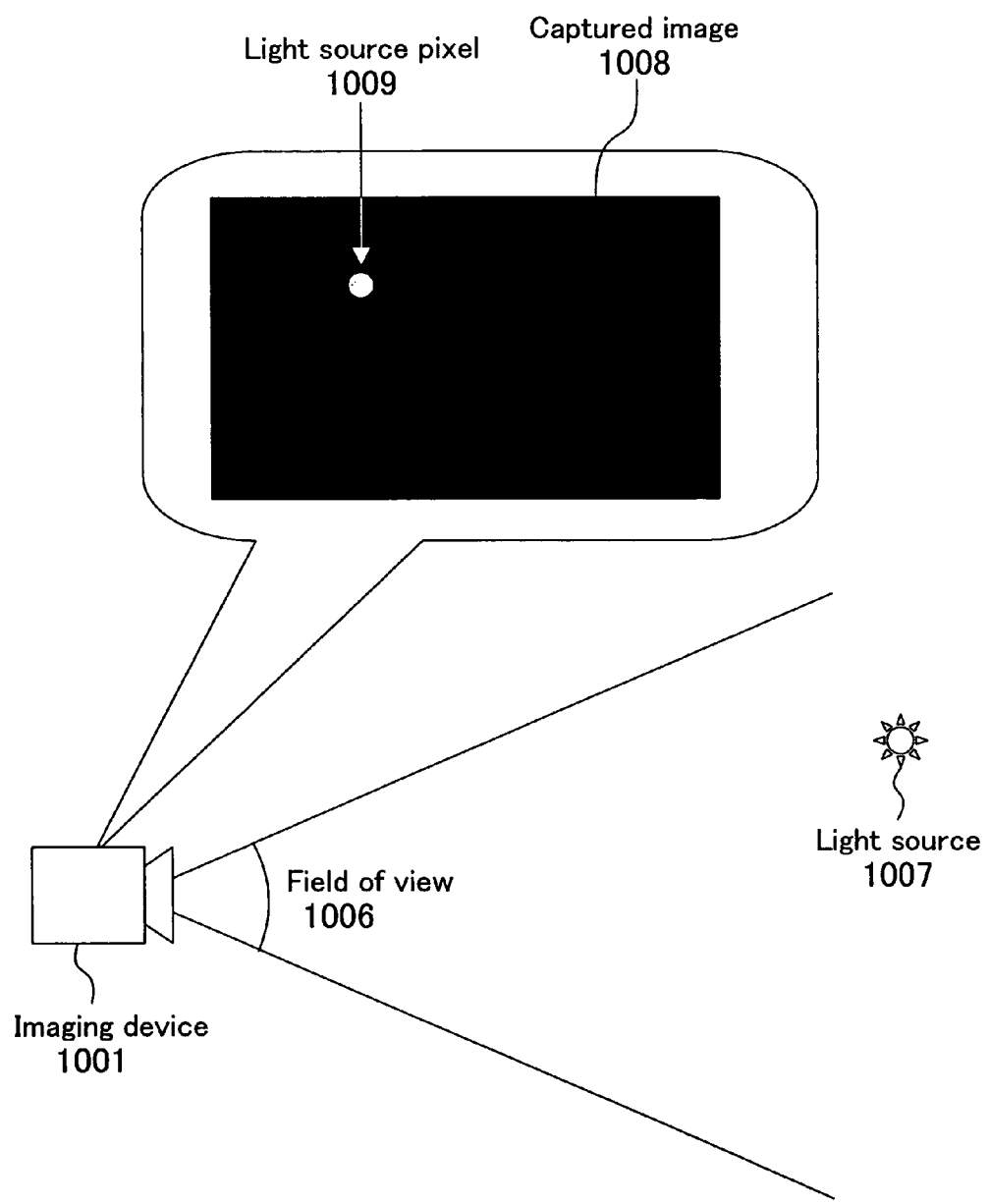
FIG. 42 is a schematic diagram illustrating the process of extracting a light source pixel.

First, a pixel in the light source image that has a sufficiently high luminance value is extracted as a pixel capturing the light source, i.e., a light source pixel. FIG. 42 is a schematic diagram illustrating this process. In FIG. 42, the imaging device 1001 having the field of view 1006 is imaging a light source 1007. In a captured image 1008, the luminance value of an area 1009 where the light source is imaged is very high. In view of this, a threshold operation is used, wherein a pixel having a luminance value higher than a predetermined threshold is extracted as the light source pixel.

The light source direction is estimated from the obtained light source pixel. This process requires the relationship between the pixel position (u,v) of the imaging device and the spatial position (xf,yf) on the imaging elements referred to as the image coordinate system. In view of the influence of the distortion of the lens, the relationship between the pixel position (u,v) and the spatial position (xf,yf) can be obtained as follows.

[Formula 74]

$$x_f = \frac{s \cdot u}{dx'} + C_x$$

$$y_f = \frac{v}{dy} + C_y$$

$$dx' = \frac{dx \cdot N_{cx}}{N_{fx}}$$

$$u_u = u + D_u$$

$$v_u = v + D_v$$

$$D_u = u(\kappa_1 r^2 + \kappa_2 r^4)$$

$$D_v = v(\kappa_1 r^2 + \kappa_2 r^4)$$

$$r = \sqrt{u^2 + v^2} \quad \text{(Expression 2)}$$

Note however that (Cx,Cy) is the pixel center position, s is the scale factor, (dx,dy) is the size [mm] of one pixel of an imaging element Ncx is the number of imaging elements in the x direction, Nfx is the number of effective pixels in the x direction, κ1 and κ2 are distortion parameters representing the distortion of the lens.

Figure 43:
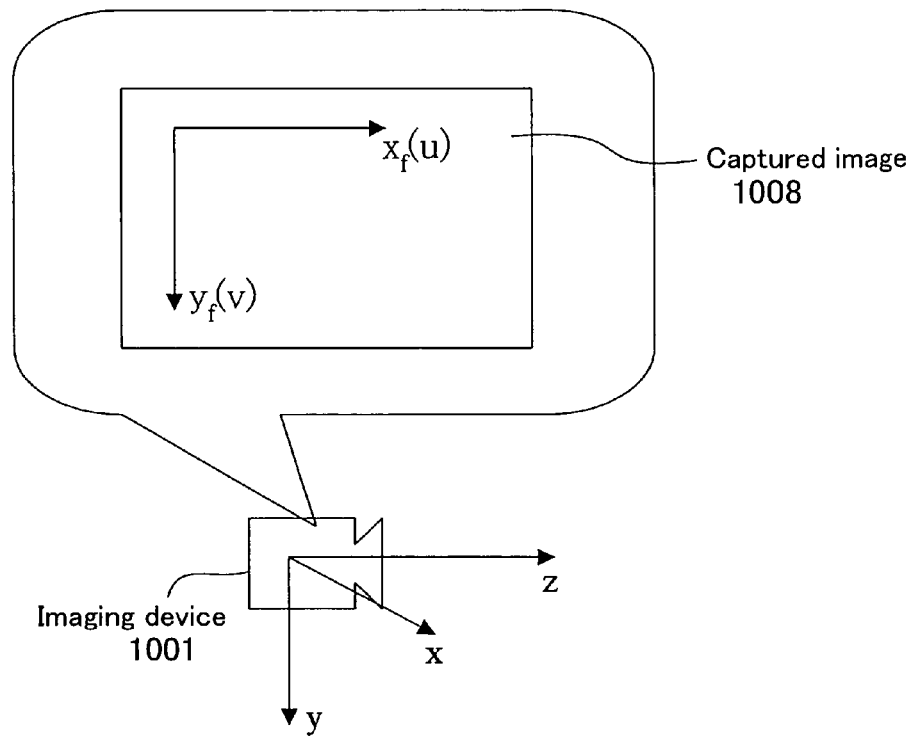
FIG. 43 is a schematic diagram illustrating the relationship between a camera coordinate system and an image coordinate system.

The relationship between the camera coordinate system (x,y,z) wherein the focal point of the imaging device is at the origin and the optical axis direction thereof is along the Z axis and the image coordinate system (xf,yf) as shown in FIG. 43 can be obtained as follows.

[Formula 75]

$$x_f = f\frac{x}{z}$$

$$y_f = f\frac{y}{z} \quad \text{(Expression 3)}$$

Herein, f represents the focal distance of the imaging device. Thus, if the camera parameters (Cx,Cy), s, (dx,dy), Ncx, Nfx, f, κ1 and κ2 are known, the pixel position (u,v) and the camera coordinate system (x,y,z) can be converted to each other by (Expression 2) and (Expression 3).

Normally, Ncx and Nfx can be known as long as the imaging elements can be identified, and (Cx,Cy), s, (dx,dy), κ1, κ2 and f can be known by performing a so-called "camera calibration" (for example, Roger Y. Tsai, "An Efficient And Accurate Camera Calibration Technique For 3D Machine Vision", Proceedings of IEEE Conference on Computer Vision and Pattern Recognition, Miami Beach, Fla., 1986, pp. 364-374). These parameters do not change even when the position or the orientation of the imaging device changes. These parameters are referred to as "internal camera parameters".

In view of this, before capturing an image, a camera calibration is performed to identify the internal camera parameters (Cx,Cy), s, (dx,dy), Ncx, Nfx, f, κ1 and κ2. The default values as of when the imaging device is purchased may be used as these values. In a case where the camera is not a fixed-focus camera but is capable of zooming, the focal distance f for each step of zooming may be obtained in advance so that they can be selectively used as necessary. Then, the focal distance f may be stored together with a captured image.

The light source direction is estimated from the light source pixel by using information as described above. Where the pixel position of the light source pixel is (ulight,vlight), the light source direction Llight can be expressed as follows.

[Formula 76]

$$L_{light} = \begin{bmatrix} l_x \\ l_y \\ l_z \end{bmatrix} = \frac{1}{\sqrt{(x_{f\_light})^2 + (y_{f\_light})^2 + f^2}} \begin{bmatrix} x_{f\_light} \\ y_{f\_light} \\ f \end{bmatrix}$$

[Formula 77]

$$x_{f\_light} = \frac{s \cdot u_{light}}{dx'} + C_x$$

$$y_{f\_light} = \frac{v_{light}}{dy} + C_y$$

Since Llight is represented by the camera coordinate system in which the light source image has been captured, it is converted to the current camera coordinate system Lnow. This can be expressed as follows.

[Formula 78]

$$L_{now} = R_{now}^{-1} \cdot R_{light} L_{light} \quad \text{(Expression 4)}$$

The light source vector Lnow is estimated by performing these processes. The direction of the light source is estimated as described above.

By utilizing the movement of the imaging device 1001, the process may also obtain the three-dimensional position of the light source in addition to the direction thereof.

Figure 44:
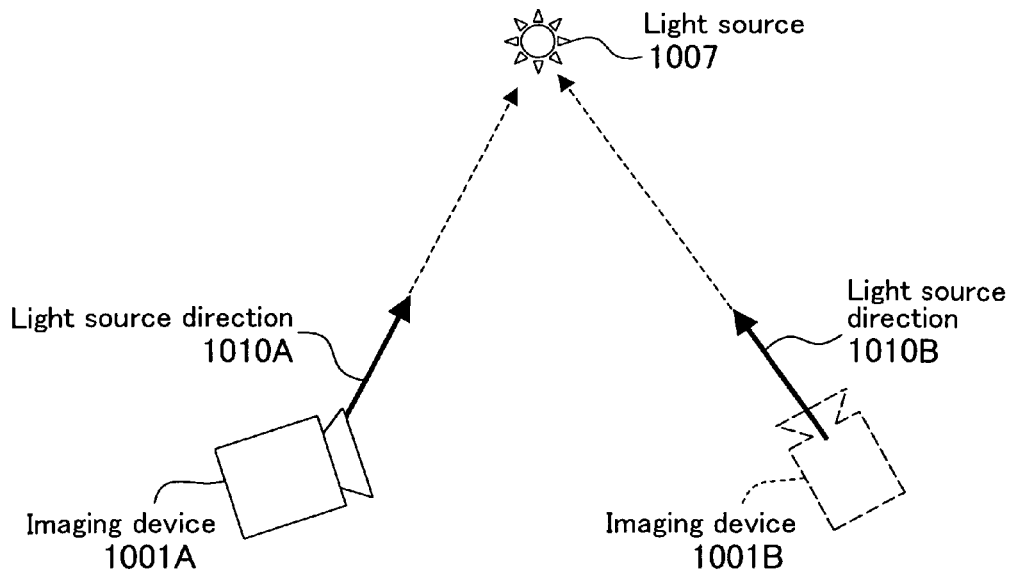
FIG. 44 is a schematic diagram illustrating the process of estimating a three-dimensional position of a light source by utilizing the movement of the imaging device.

FIG. 44 is a schematic diagram illustrating this process. In FIG. 44, 1001A and 1000A denote the imaging device and the estimated light source vector at time t=t1, and 1001B and 1001B denote the imaging device and the estimated light source vector at time t=t2. Where the relative positional relationship between the imaging device at time t1 and that at time t2 and the orientations thereof are known, the light source should exist at the intersection between the extensions of the light source vectors 1000A and 1010B. Thus, the three-dimensional position of the light source can be obtained as follows.

The orientation matrix of the imaging device, the relative three-dimensional position of the imaging device and the estimated light source vector at time t1 are denoted as R1, P1 and L1, respectively, and the orientation matrix of the imaging device and the estimated light source vector at time t2 are denoted as R2 and L2, respectively. Note however that the position of the imaging device at time t2 is assumed to be the origin O(0,0,0). Then, the light source position Plight satisfies the following expressions.

[Formula 79]

$$P_{light} = m \cdot R_2^{-1} \cdot R_1 \cdot L_1 + P_1 \quad \text{(Expression 5)}$$

[Formula 80]

$$P_{light} = s \cdot L_2 \quad \text{(Expression 6)}$$

Note that s and m are each a constant. If all estimated values are correct and there is no noise, the light source position Plight can be obtained by solving (Expression 5) and (Expression 6) as simultaneous equations in s and m. However, since there usually is noise, the light source position is obtained by using the method of least squares.

First, the following function f(m,s) is considered.

[Formula 81]

$$f(m,s) = \{(m \cdot R_2^{-1} \cdot R_1 \cdot L_1 + P_1) - s \cdot L_2\}^2$$

Herein, m and s satisfy the following relationship.

[Formula 82]

$$\frac{df}{dm} = 2 \cdot (R_2^{-1} \cdot R_1 \cdot L_1)^T \{(m \cdot R_2^{-1} \cdot R_1 \cdot L_1 + P_1) - s \cdot L_2\} = 0$$

[Formula 83]

$$\frac{df}{ds} = -2 \cdot (L_2)^T \{(m \cdot R_2^{-1} \cdot R_1 \cdot L_1 + P_1) - s \cdot L_2\} = 0$$

Hence,
[Formula 84]

$$(R_2^{-1} \cdot R_1 \cdot L_1)^2 \cdot m - (R_2^{-1} \cdot R_1 \cdot L_1)^T \cdot L_2 s + (R_2^{-1} \cdot R_1 \cdot L_1)^T \cdot P_1 = 0 \quad \text{(Expression 7)}$$

[Formula 85]

$$(L_2^T \cdot R_2^{-1} \cdot R_1 \cdot L_1) \cdot m - L_2^2 \cdot s + L_2^T \cdot P_1 = 0 \quad \text{(Expression 8)}$$

Thus, the light source position Plight is obtained by solving (Expression 7) and (Expression 8) as simultaneous equations in m and s, and substituting obtained s and m into (Expression 5) and (Expression 6). The position of the light source is estimated as described above.

The relative three-dimensional position P1 of the imaging device at time t1 (the relative positional relationship between the imaging device at time t1 and that at time t2) is obtained by using an optical flow. An optical flow is a vector extending between a point on an object in one image and the same point on the object in another temporally continuous image, i.e., a vector extending between corresponding points. A geometric constraint expression holds between the corresponding points and the camera movement. Thus, if the corresponding points satisfy certain conditions, the movement of the camera can be calculated.

A method called an "8-point method", for example, is known in the art (H. C. Longuet-Higgins, "A Computer Algorithm For Reconstructing A Scene From Two Projections", Nature, vol. 293, pp. 133-135, 1981) as a method for obtaining the relative positional relationship of the imaging device at different points in time from an optical flow. In this method, the camera movement is calculated from eight or more pairs of corresponding stationary points between two images. Methods for obtaining such corresponding points between two images are widely known, and will not herein be described in detail (for example, Carlo Tomasi and Takeo Kanade, "Detection And Tracking Of Point Features", Carnegie Mellon University Technical Report, CMU-CS-91-132, April 1991).

Moreover, the luminance or the color of the light source can be obtained by obtaining the luminance value or the RGB values of the light source pixel. Alternatively, the spectrum of the light source may be detected by obtaining an image by a multispectral camera. It is known that by thus obtaining the spectrum of the light source, it is possible to synthesize an image with high color reproducibility in the process of increasing the resolution of an image and in the augmented reality to be described later (for example, Toshio Uchiyama, Masaru Tshuchida, Masahiro Yamaguchi, Hideaki Haneishi, Nagaaki Ohyama "Capture Of Natural Illumination Environments And Spectral-Based Image Synthesis", Technical Report of the Institute of Electronics, Information and Communication Engineers, PRMU2005-138, pp. 7-12, 2006).

The light source information estimating section 105 may be configured to obtain the illuminance information of the light source as the light source information. This can be done by using an illuminance meter whose optical axis direction coincides with that of the imaging device 1001. The illuminance meter may be a photocell illuminance meter, or the like, for reading the photocurrent caused by the incident light, wherein a microammeter is connected to the photocell.

As described above, the light source estimation device for the present process obtains a light source image by the imaging device when it is determined that the condition of the imaging device is suitable for obtaining light source information, and estimates light source information at the time of image capturing by using the first imaging device information at the time of obtaining the light source image and the second imaging device information at the time of image capturing by a cameraman. Therefore, it is possible to estimate the light source information around the object with no additional imaging devices, in a camera-equipped mobile telephone, or the like.

In the process above, the output of the angle sensor 1025 is used for the imaging device condition determination section 101 to detect the optical axis direction of the imaging device 1001. However, the present invention is not limited to this, and other existing methods may be employed, e.g., a method using a weight and touch sensors (see Japanese Laid-Open Patent Publication No. 4-48879), and a method using an acceleration sensor (see Japanese Laid-Open Patent Publication No. 63-219281).

Figure 45A:
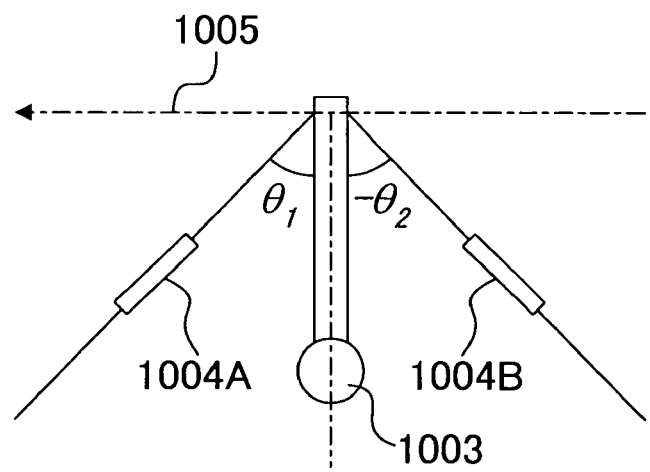
FIG. 45 is a schematic diagram illustrating a method for detecting an optical axis direction by using a weight and a touch sensor.
Figure 45B:
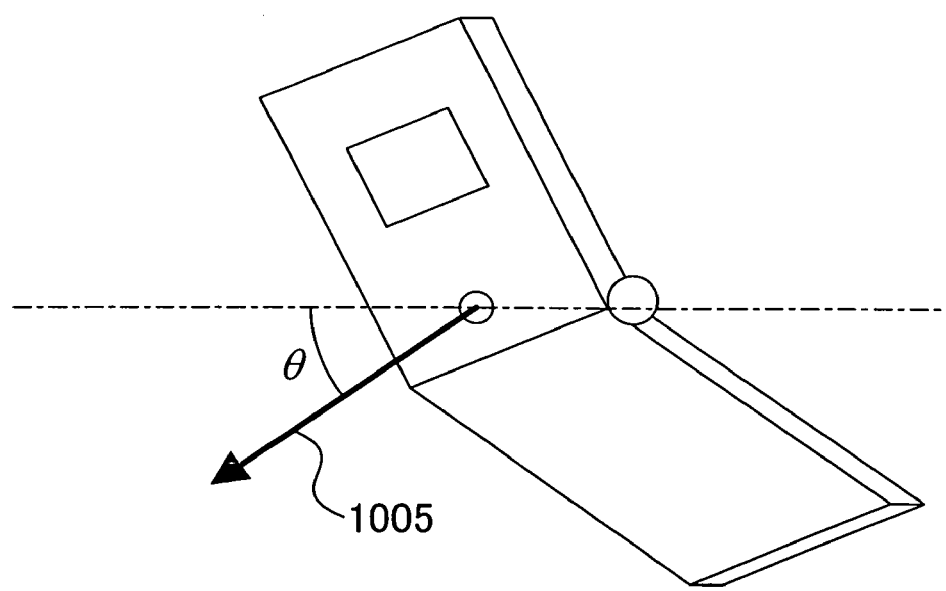

A method using a weight and touch sensors will now be described. FIG. 45 is a diagram showing a configuration of a weight and touch sensors. In FIG. 45(*a*), 1003 denotes a weight hanging down with the base portion thereof rotatably supported so as to always keep the perpendicular direction, and 1004A and 1004B touch sensors. Moreover, 1005 denotes the optical axis direction of the imaging device. As shown in FIG. 45(*b*), where the angle between the optical axis direction 1005 of the imaging device and the horizontal plane is θ, the touch sensors 1004A and 1004B come into contact with the weight 1003 when the optical axis direction 1005 is inclined from the horizontal position by predetermined angles θ1 and θ2.

Figure 46:
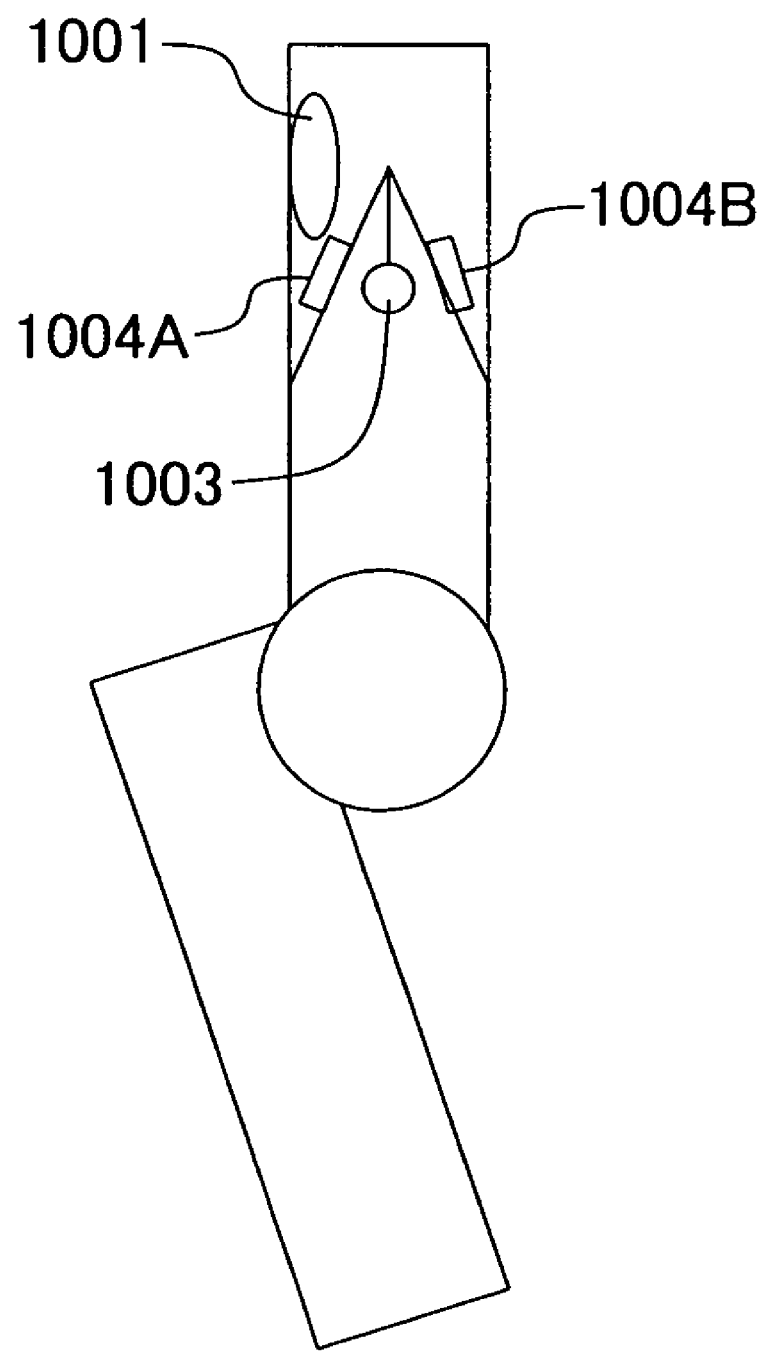
FIG. 46 is a schematic diagram showing a folding-type camera-equipped mobile telephone provided with a weight and a touch sensor.
Figure 47A:
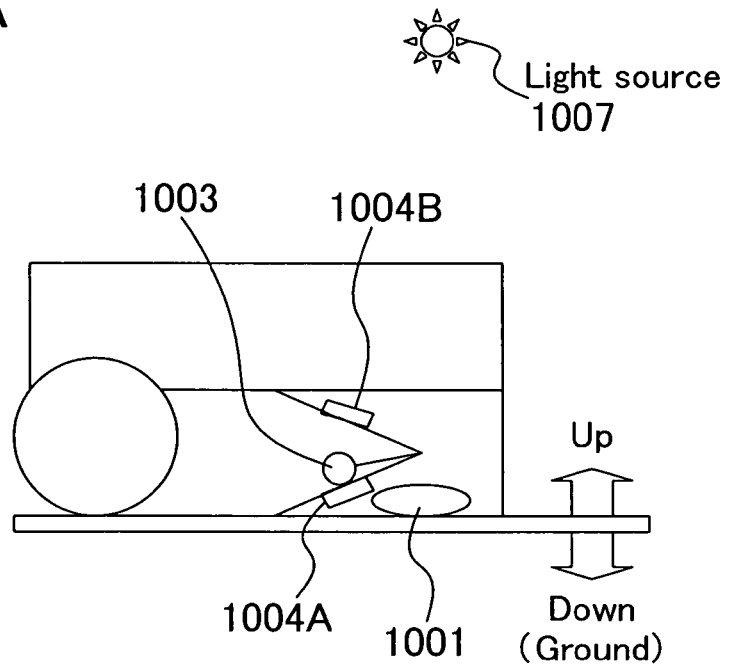
FIG. 47 is a schematic diagram showing a state where a folding-type camera-equipped mobile telephone of FIG. 46 is placed.
Figure 47B:
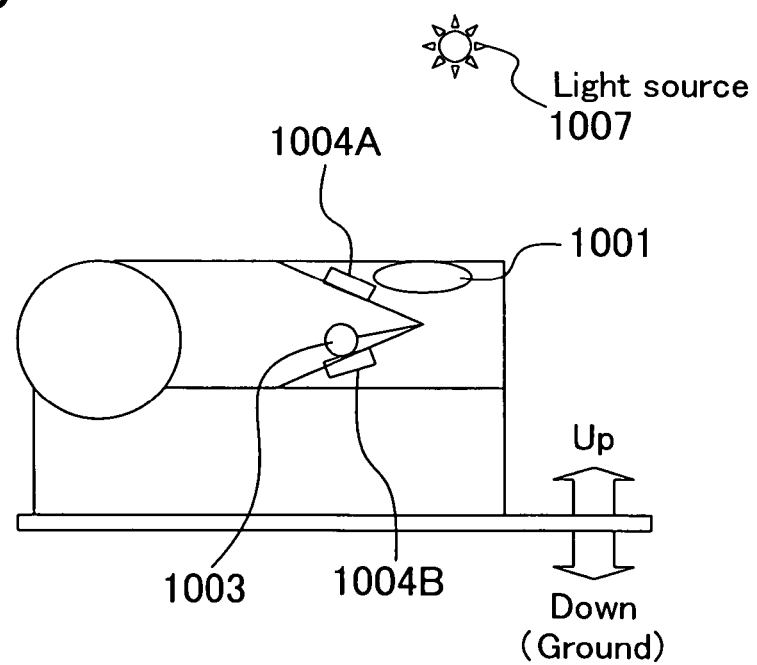

FIG. 46 shows an exemplary configuration where a weight and touch sensors of FIG. 45 are provided in a folding-type camera-equipped mobile telephone. When the folding-type camera-equipped mobile telephone of FIG. 46 is placed with the imaging device 1001 facing down, the weight 1003 comes into contact with the touch sensor 1004A, thus turning the touch sensor 1004A ON (FIG. 47(*a*)). When it is placed with the imaging device 1001 facing up, the weight 1003 comes into contact with the touch sensor 1004B, thus turning the touch sensor 1004B ON (FIG. 47(*b*)).

FIG. 48 is a diagram showing the relationship between the optical axis direction and the ON/OFF state of the touch sensors. Thus, when the touch sensor 1004A is ON and the touch sensor 1004B is OFF, it can be assumed that the optical axis is facing downward with an inclination of +θ1 or more from the horizontal direction. When the touch sensor 1004B is ON and the touch sensor 1004A is OFF, it can be assumed that the optical axis is facing upward with an inclination of −θ2 or more from the horizontal direction. When the touch sensors 1004A and 1004B are both OFF, −θ2<θ<θ1 holds, and it can be assumed that the optical axis direction is substantially horizontal.

Thus, it is possible to detect the optical axis direction of the imaging device 1001 by using a weight and touch sensors.

Figure 49A:
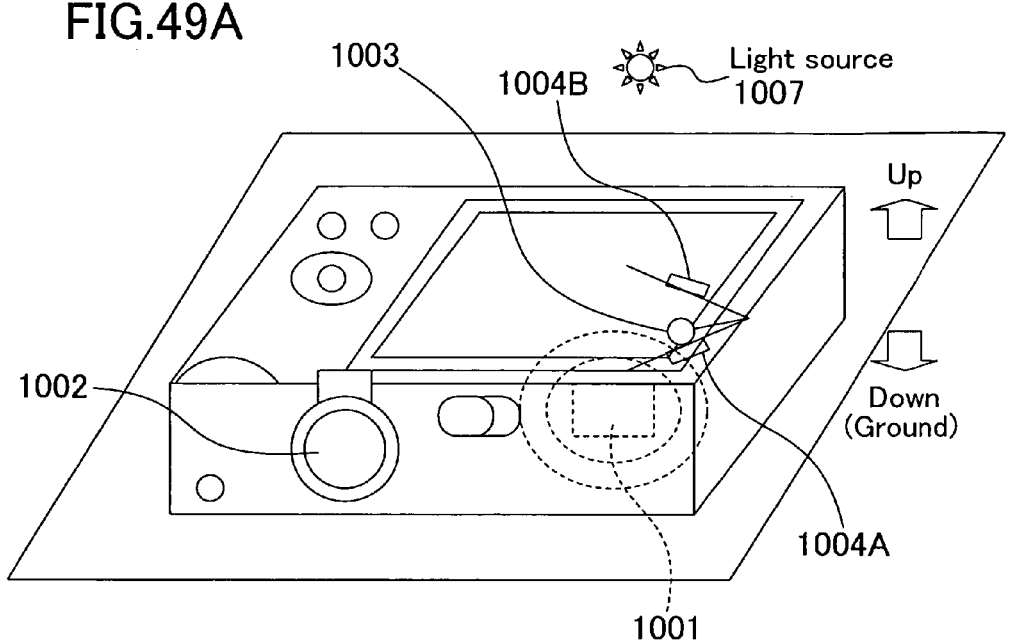
FIG. 49 is a schematic diagram showing a state where a digital still camera provided with a weight and a touch sensor is placed.
Figure 49B:
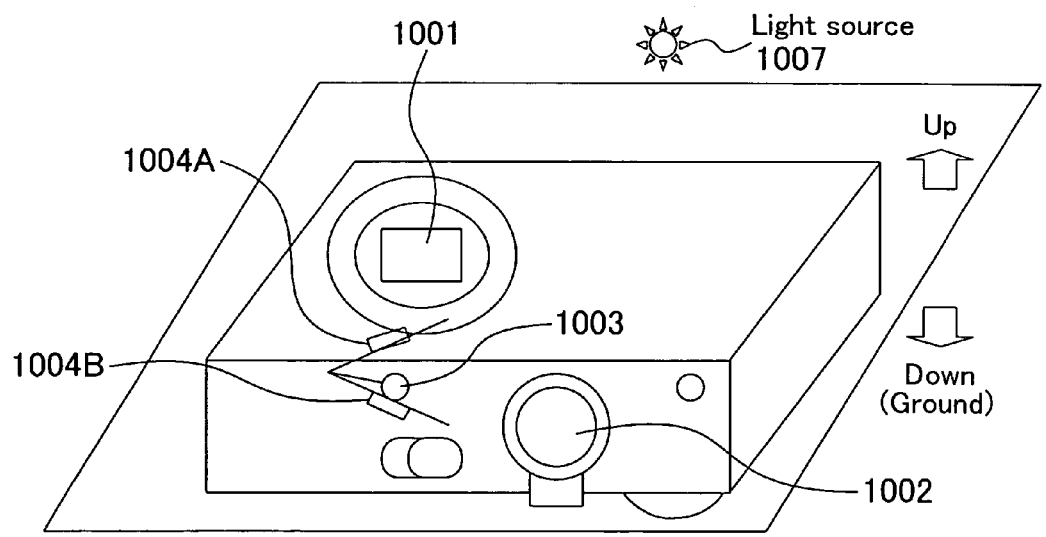

While the illustrated example is directed to a folding-type camera-equipped mobile telephone, the optical axis direction of an imaging device can of course be detected by using a weight and touch sensors even with digital still cameras or digital video cameras. FIG. 49 shows an exemplary configuration where a weight and touch sensors are provided in a digital still camera. As shown in FIG. 49(*a*), when the optical axis of the imaging device 1001 is facing downward, the weight 1003 is in contact with the touch sensor 1004A. As shown in FIG. 49(*b*), when the optical axis of the imaging device 1001 is facing upward, the weight 1003 is in contact with the touch sensor 1004B.

In the process above, the imaging device condition determination section 101 determines whether the condition of the imaging device 1001 is suitable for obtaining light source information by detecting the optical axis of the imaging device 1001. Instead of detecting the direction of the optical axis, the luminance value of the captured image may be detected, for example.

Where the light source is captured in the captured image, the pixel capturing the light source has a very high luminance value. In view of this, the imaging device 1001 may be used to capture an image, and if a luminance value greater than or equal to a threshold is present in the captured image, it can be determined that the light source is captured in the image and that the condition is suitable for obtaining light source information. In such a case, since it can be assumed that the light source has a very high luminance value, an image is preferably captured by the imaging device 1001 with as short an exposure time as possible.

Alternatively, whether there is a shading object within the range of viewing field of the camera may be detected so as to determine whether the condition of the imaging device 1001 is suitable for obtaining light source information. This is because if there is such a shading object, the light source will be shaded and it is likely that the light source cannot be captured.

The presence of a shading object can be detected by methods including a method using distance information and a method using image information. With the former, the output of a distance sensor used in auto-focusing of a camera, for example, may be used so that if an object is present within 1 m, for example, the object is determined to be a shading object. With the latter method of using image information, an image is captured by the imaging device 1001, and a human is detected from within the image by an image process, for example. If a human is in the captured image, it is determined that the human is a shading object. This is because it can be assumed that a most ordinary object that shades the light source in the vicinity of the camera is a human. The detection of a human from within an image can be done by using image recognition techniques widely known in the art, e.g., by detecting a skin-colored region by using the color information.

When the light source image obtaining section 102 obtains a light source image, it is preferred that the image is captured without using a flashlight. This is because if an object that causes specular reflection such as a mirror is present within the viewing field of the imaging device 1001, the flashlight may be reflected, which may be erroneously assumed to be a light source pixel. Therefore, it is preferred to use an imaging device capable of capturing an image over a wide dynamic range, such as a cooled CCD camera or a multiple-exposure imaging. When the light source image obtaining section 102 obtains a light source image, if the amount of exposure is not sufficient, the exposure time may be elongated. This is particularly effective in a case where a light source image is obtained only when the imaging device 1001 is stationary by using an acceleration sensor, or the like.

As described above, the present embodiment provides a super-resolution process using a database, capable of realizing a super-resolution process while suppressing the image quality deterioration even with an input object whose light source environment is different from that when the database is produced.

Second Embodiment

Figure 50:
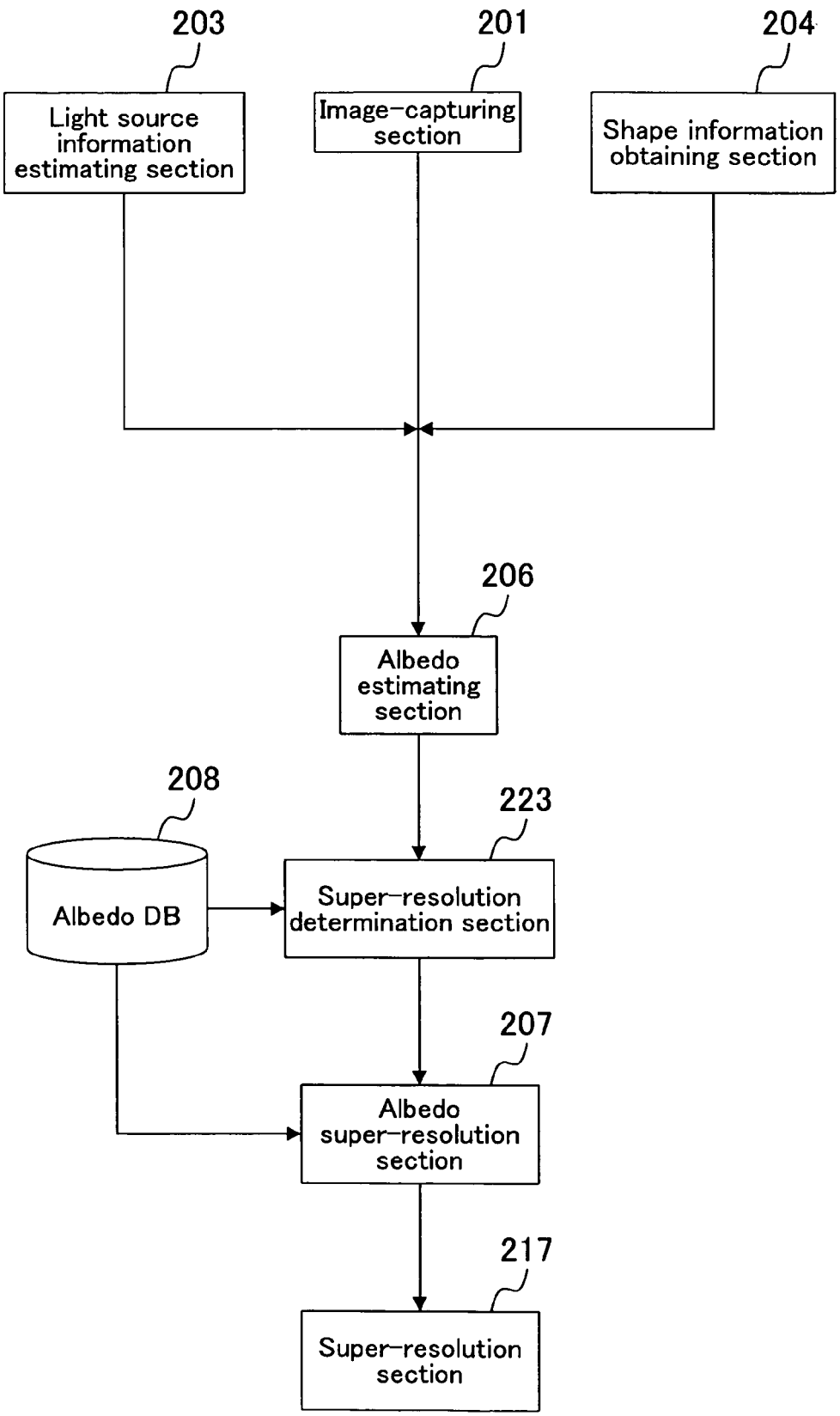
FIG. 50 is a block diagram showing a configuration of a super-resolution device according to the second embodiment of the present invention.

FIG. 50 shows a configuration of a super-resolution device of the present embodiment. In FIG. 50, like elements to those shown in FIG. 1 are denoted by like reference numerals, and will not be further described below. FIG. 4 shows an exemplary configuration of a camera provided with a super-resolution device of the present embodiment, as in the first embodiment.

A difference from the first embodiment is the provision of a super-resolution determination section 223. The super-resolution determination section 223 evaluates the reliability of the super-resolution process when performed according to the conversion rule stored in the albedo DB 208 on the albedo image produced by the albedo estimating section 221. When the reliability is evaluated to be low by the super-resolution determination section 223, the albedo super-resolution section 207 performs the super-resolution process for albedo images without using the conversion rule stored in the albedo DB 208. Specifically, where the reliability of the high-resolution albedo image when the albedo DB 208 is used is low, the albedo super-resolution process is switched from one to another.

Figure 51:
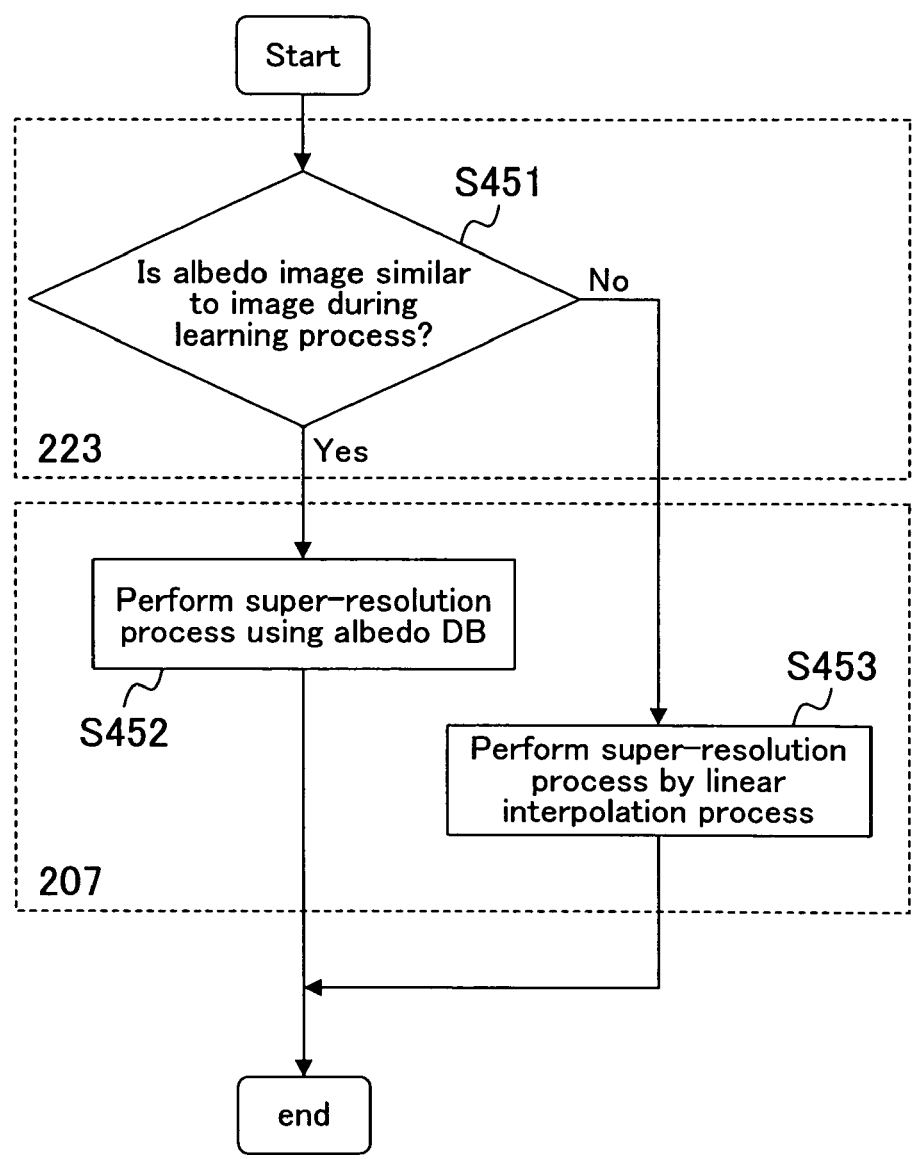
FIG. 51 is a flow chart showing the flow of the process of a super-resolution determination section and an albedo super-resolution section according to the second embodiment of the present invention.

FIG. 51 is a flow chart showing the flow of the process by the super-resolution determination section 223 and the albedo super-resolution section 207 according to the present embodiment. The super-resolution determination section 223 determines whether the albedo image produced by the albedo estimating section 221 is similar to the learned data obtained when producing the albedo DB 208 (step S451). The image similarity calculation may be performed by using the distance between a texton obtained by textonizing an input albedo image and a texton vector of the shortest distance within the cluster C. If the texton distance is less than the threshold Th_TX (Yes in step S451), the resolution of the albedo image is increased by obtaining the conversion rule from the albedo DB 208 as in the first embodiment (step S452). If the texton distance is greater than the threshold Th_TX (No in step S451), it is determined that the super-resolution process cannot be performed with a high precision with the conversion rule stored in the albedo DB 208, and a super-resolution process based on a simple linear interpolation, for example, is performed (step S453). Such a threshold Th_TX may be determined experimentally, and may be set to 0.01 when the input image is a color image with 256 gray levels for each color, for example.

Of course, the processing method where there is no sufficiently similar learned data is not limited to linear interpolation, but may be, for example, a bicubic method or a spline interpolation.

The image similarity calculation herein is not limited to the method using the distance between a texton obtained by textonizing an input albedo image and a texton vector of the shortest distance within the cluster C, but may use the luminance histogram comparison, for example. In such a case, the albedo image used in the learning process is also stored in the albedo DB 208, in addition to the cluster C and the conversion matrix CMat learned. With the above method using the distance between textons, the albedo super-resolution process is switched from one to another for each pixel, whereas with this method, the albedo super-resolution process is switched from one to another for each pixel.

The super-resolution determination section 223 may use a high-resolution albedo image whose resolution has been increased by the albedo super-resolution section 207, instead of using an albedo image, in order to evaluate the reliability of the high-resolution albedo image produced by the albedo super-resolution section 207. In such a case, the process may evaluate the similarity between an image obtained by reducing the resolution of a high-resolution albedo image whose resolution has been increased by the albedo super-resolution section 207 and an albedo image produced by the albedo estimating section 221. The resolution-decreasing process herein may be performed by sub-sampling the high-resolution albedo image through a low-pass filter.

These two albedo images will be the same image if the super-resolution process has been performed with a high precision, and will be different images if the super-resolution process has failed. Thus, if the similarity between these two albedo images is sufficiently high, the process obtains the conversion rule from the albedo DB 208 to perform super-resolution of the albedo image as in the first embodiment. If the similarity between these two albedo images is not sufficiently high, it is determined that the super-resolution process cannot be performed with a high precision with the conversion rule stored in the albedo DB 208, and a super-resolution process based on a simple linear interpolation, for example, is performed.

As described above, the process of the present embodiment does not use the conversion rule stored in the albedo DB, but performs a simple linear interpolation, for example, for an object that is not similar to the learned data, thus realizing a super-resolution process in which the image quality deterioration is suppressed.

Third Embodiment

Figure 52:
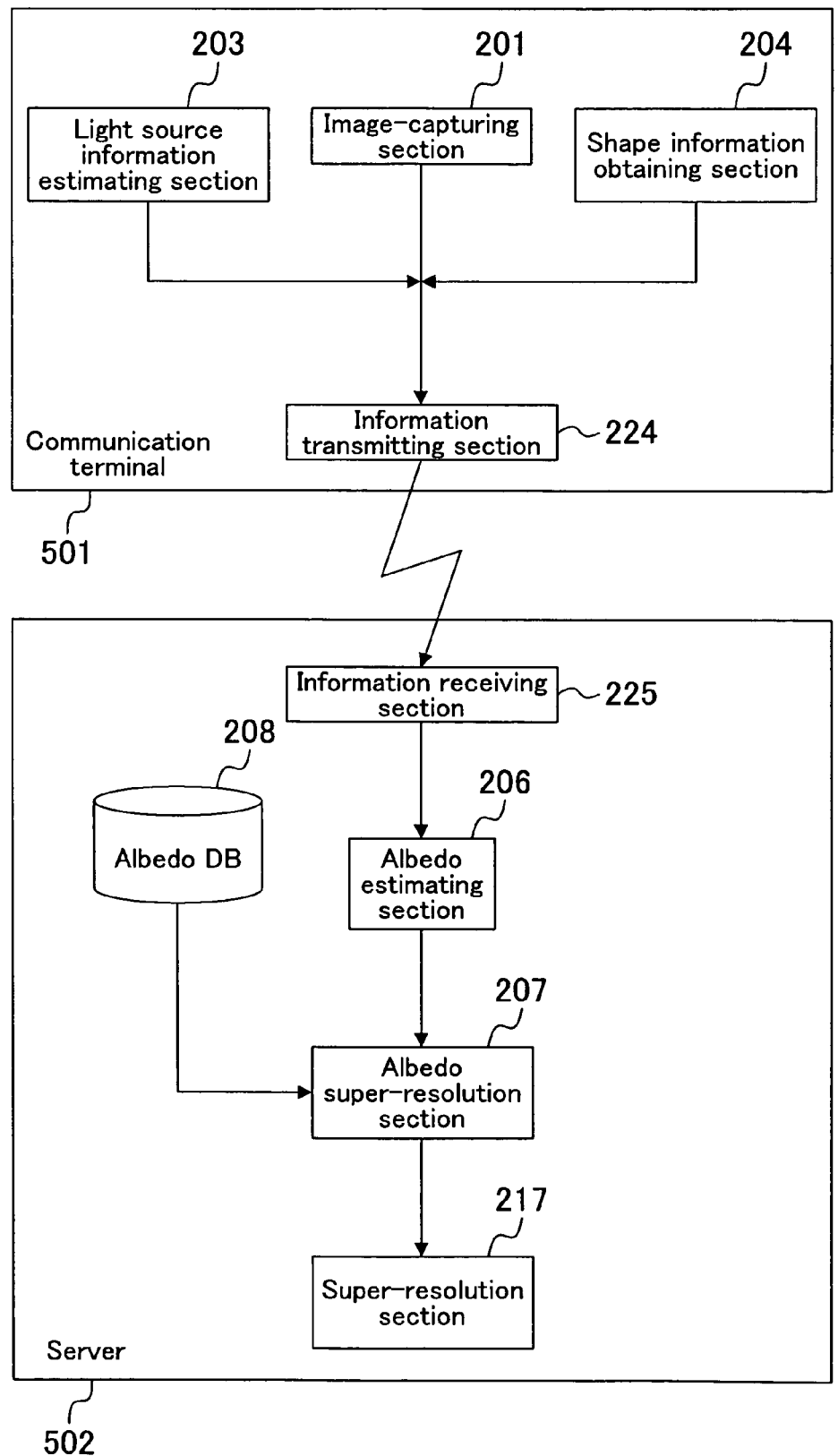
FIG. 52 is a block diagram showing a configuration of a super-resolution system according to a third embodiment of the present invention.

FIG. 52 is a block diagram showing a configuration of a super-resolution system according to a third embodiment of the present invention. In FIG. 52, like elements to those shown in FIG. 1 are denoted by like reference numerals, and will not be further described below.

In FIG. 52, a communication terminal 501 being a camera-equipped mobile telephone, for example, is provided with the image-capturing section 201, the light source information estimating section 203 and the shape information obtaining section 204, among other elements shown in FIG. 1. The albedo estimating section 206, the albedo DB 208, the albedo super-resolution section 207 and the super-resolution section 217 are provided in a server 502, which is an external device away from the communication terminal 501 and connected to the communication terminal 501 via a network. Thus, in the present embodiment, the communication terminal 501 does not perform all of the processes but only performs the process of capturing an image and the process of obtaining the light source information and the shape information, with the super-resolution process being performed by the server 502.

In the communication terminal 501, an original image is captured by the image-capturing section 201, the light source information is estimated by the light source information estimating section 203, and the shape information of the object is obtained by the shape information obtaining section 204, as described above in the first embodiment. The original image, the light source information and the shape information are transmitted by an information transmitting section 224.

In the server 502, an information receiving section 225 receives information that is transmitted from the communication terminal 501 via a network, i.e., the original image, the light source information and the shape information. The original image, the light source information and the shape information received are given to the albedo estimating section 206. The albedo estimating section 206 produces an albedo image of the object from the original image by using the light source information and the shape information as described above in the first embodiment. The albedo super-resolution section 207 obtains the conversion rule from the albedo DB 208, which stores the conversion rule for converting a low-resolution albedo image to a high-resolution albedo image, to perform super-resolution of the albedo image. The super-resolution section 217 produces a high-resolution image obtained by performing super-resolution of the original image by using the high-resolution albedo image obtained by the albedo super-resolution section 207 and the light source information and the shape information.

Thus, as the albedo estimating section 206, the albedo DB 208, the albedo super-resolution section 207 and the super-resolution section 217 are provided in the server 502 so as to perform the super-resolution process, it is possible to reduce the computational burden on the communication terminal 501.

In the second and third embodiments above, the process may of course separate an original image into a diffuse reflection image and a specular reflection image, wherein the diffuse reflection image is subjected to a super-resolution process using an albedo image and the specular reflection image is subjected to a super-resolution process not using an albedo image, as described above in the first embodiment.

The super-resolution method of each embodiment above may be implemented, for example, as a program recorded on a computer-readable recording medium being executed by a computer.

INDUSTRIAL APPLICABILITY

The super-resolution device of the present invention provides a super-resolution process using a database, capable of realizing a super-resolution process while suppressing the image quality deterioration even with an input object whose light source environment is different from that when the database is produced. Therefore, the present invention is useful in performing a digital zooming process of a digital camera, for example.

What is claimed is:

1. A super-resolution device, comprising:
   an image-capturing section for imaging an object by an imaging device;
   a light source information estimating section for estimating light source information including at least one of an illuminance, a direction and a position of a light source illuminating the object;
   a shape information obtaining section for obtaining, as shape information, surface normal information or three-dimensional position information of the object;
   an albedo estimating section for producing an albedo image of the object from an original image captured by the image-capturing section by using the light source information and the shape information;
   an albedo database storing a conversion rule for converting a low-resolution albedo image to a high-resolution albedo image;
   an albedo super-resolution section for obtaining the conversion rule from the albedo database to perform super-resolution of the albedo image produced by the albedo estimating section according to the conversion rule; and
   a super-resolution section for producing a high-resolution image resolution-increased from the original image by using the high-resolution albedo image obtained by the albedo super-resolution section, the light source information and the shape information.

2. The super-resolution device of claim 1, comprising a diffuse reflection/specular reflection separating section for separating the original image into a diffuse reflection image and a specular reflection image,
   wherein the albedo estimating section produces an albedo image from the diffuse reflection image separated by the diffuse reflection/specular reflection separating section, instead of the original image.

3. The super-resolution device of claim 1, comprising a diffuse reflection/specular reflection separating section for separating the original image into a diffuse reflection image and a specular reflection image, wherein:
   the image-capturing section obtains a polarization state of the object; and
   the diffuse reflection/specular reflection separating section performs the separation by using the polarization state obtained by the image-capturing section.

4. The super-resolution device of claim 1, wherein the conversion rule stored in the albedo database is obtained by a learning process using an albedo image having the same resolution as the original image and an albedo image having a higher resolution than the original image.

5. The super-resolution device of claim 1, comprising a super-resolution determination section for estimating a reliability of a super-resolution process according to the conversion rule stored in the albedo database for an albedo image produced by the albedo estimating section,
   wherein when the reliability is evaluated to be low by the super-resolution determination section, the albedo super-resolution section performs super-resolution of the albedo image without using the conversion rule stored in the albedo database.

6. An super-resolution device, comprising:
   an image-capturing section for imaging an object by an imaging device;
   a light source information estimating section for estimating light source information including at least one of a direction and a position of a light source illuminating the object;

a shape information obtaining section for obtaining, as shape information, surface normal information or three-dimensional position information of the object;

an albedo estimating section for producing a pseudo-albedo image of the object from an original image captured by the image-capturing section by using the light source information and the shape information;

an albedo database storing a conversion rule for converting a low-resolution pseudo-albedo image to a high-resolution pseudo-albedo image;

an albedo super-resolution section for obtaining the conversion rule from the albedo database to increase a resolution of the pseudo-albedo image produced by the albedo estimating section according to the conversion rule; and a super-resolution section for producing a high-resolution image resolution-increased from the original image by using the high-resolution pseudo-albedo image obtained by the albedo super-resolution section, the light source information and the shape information.

7. The super-resolution device of claim 6, comprising a diffuse reflection/specular reflection separating section for separating the original image into a diffuse reflection image and a specular reflection image, wherein the albedo estimating section produces a pseudo-albedo image from the diffuse reflection image separated by the diffuse reflection/specular reflection separating section, instead of the original image.

8. The super-resolution device of claim 6, comprising a diffuse reflection/specular reflection separating section for separating the original image into a diffuse reflection image and a specular reflection image, wherein:

the image-capturing section obtains a polarization state of the object; and the diffuse reflection/specular reflection separating section performs the separation by using the polarization state obtained by the image-capturing section.

9. The super-resolution device of claim 6, wherein the conversion rule stored in the albedo database is obtained by a learning process using a pseudo-albedo image having the same resolution as the original image and a pseudo-albedo image having a higher resolution than the original image.

10. The super-resolution device of claim 6, comprising a super-resolution determination section for estimating a reliability of a super-resolution process according to the conversion rule stored in the albedo database for a pseudo-albedo image produced by the albedo estimating section, wherein when the reliability is evaluated to be low by the super-resolution determination section, the albedo super-resolution section performs super-resolution of the pseudo-albedo image without using the conversion rule stored in the albedo database.

11. The super-resolution device of claim 1 or 6, comprising a diffuse reflection/specular reflection separating section for separating the original image into a diffuse reflection image and a specular reflection image, wherein:

the super-resolution section performs super-resolution of the specular reflection image separated by the diffuse reflection/specular reflection separating section; and the super-resolution section produces the high-resolution image by using the super-resolution specular reflection image.

12. The super-resolution device of claim 11, wherein the super-resolution section performs super-resolution of the specular reflection image by using a process of increasing a resolution of the shape information.

13. A super-resolution method, comprising:

a first step of obtaining an original image by imaging an object;

a second step of estimating light source information including at least one of an illuminance, a direction and a position of a light source illuminating the object;

a third step of obtaining, as shape information, surface normal information or three-dimensional position information of the object;

a fourth step of producing an albedo image of the object from the original image by using the light source information and the shape information;

a fifth step of obtaining a conversion rule from an albedo database storing a conversion rule for converting a low-resolution albedo image to a high-resolution albedo image to perform super-resolution of the albedo image according to the conversion rule; and a sixth step of producing a high-resolution image resolution-increased from the original image by using the high-resolution albedo image obtained in the fifth step, the light source information and the shape information.

14. A non-transitory computer-readable recording medium for storing therein a super-resolution program for instructing a computer to perform:

a first step of producing an albedo image of an object from an original image obtained by imaging the object by using light source information including at least one of an illuminance, a direction and a position of a light source illuminating the object, and shape information being surface normal information or three-dimensional position information of the object;

a second step of obtaining a conversion rule from an albedo database storing a conversion rule for converting a low-resolution albedo image to a high-resolution albedo image to perform super-resolution of the albedo image according to the conversion rule; and a third step of producing a high-resolution image resolution-increased from the original image by using the high-resolution albedo image obtained in the second step, the light source information and the shape information.

* * * * *

UNITED STATES PATENT AND TRADEMARK OFFICE
CERTIFICATE OF CORRECTION

PATENT NO. : 7,688,363 B2 Page 1 of 1
APPLICATION NO. : 12/080230
DATED : March 30, 2010
INVENTOR(S) : Satoshi Sato et al.

It is certified that error appears in the above-identified patent and that said Letters Patent is hereby corrected as shown below:

In column 50, line 61, claim 6, "An super-resolution device" should read -- A super-resolution device --

Signed and Sealed this

Thirty-first Day of August, 2010

David J. Kappos
*Director of the United States Patent and Trademark Office*